United States Patent
Guo et al.

(10) Patent No.: US 11,597,674 B2
(45) Date of Patent: Mar. 7, 2023

(54) COLORED GLASS ARTICLES HAVING IMPROVED MECHANICAL DURABILITY

(71) Applicant: CORNING INCORPORATED, Corning, NY (US)

(72) Inventors: Xiaoju Guo, Pittsford, NY (US); Jill Marie Hall, Elmira, NY (US); Karl William Koch, III, Elmira, NY (US); Jesse Kohl, Horseheads, NY (US); Liping Xiong Smith, Painted Post, NY (US); Nicole Taylor Wiles, Horseheads, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 17/677,345

(22) Filed: Feb. 22, 2022

(65) Prior Publication Data

US 2022/0402805 A1 Dec. 22, 2022

Related U.S. Application Data

(60) Provisional application No. 63/304,807, filed on Jan. 31, 2022, provisional application No. 63/212,191, filed on Jun. 18, 2021.

(51) Int. Cl.
*C03C 3/093* (2006.01)
*C03C 4/02* (2006.01)

(52) U.S. Cl.
CPC .............. *C03C 3/093* (2013.01); *C03C 4/02* (2013.01)

(58) Field of Classification Search
CPC ......... C03C 3/085; C03C 3/087; C03C 3/091; C03C 3/093; C03C 4/02
See application file for complete search history.

(56) References Cited

U.S. PATENT DOCUMENTS

| | | | |
|---|---|---|---|
| 3,902,881 | A | 9/1975 | Pirooz |
| 8,232,218 | B2 | 7/2012 | Dejneka et al. |
| 9,701,570 | B2 | 7/2017 | Mauro et al. |
| 9,790,124 | B2 | 10/2017 | Dejneka et al. |
| 10,246,371 | B1 | 4/2019 | Dejneka et al. |
| 10,656,454 | B2 | 5/2020 | Bazemore et al. |
| 11,059,739 | B2 | 7/2021 | Wolfinger et al. |
| 11,072,557 | B2 | 7/2021 | Weiss et al. |
| 11,267,748 | B2 | 3/2022 | Siebers et al. |
| 2013/0128434 | A1 | 5/2013 | Yamamoto et al. |
| 2013/0136909 | A1 | 5/2013 | Mauro et al. |
| 2014/0066285 | A1 | 3/2014 | Beall et al. |
| 2014/0087194 | A1 | 3/2014 | Dejneka et al. |
| 2014/0243183 | A1 | 8/2014 | Beall et al. |
| 2014/0285956 | A1 | 9/2014 | Russell-Clarke et al. |
| 2015/0064474 | A1 | 3/2015 | Dejneka et al. |
| 2015/0368149 | A1 | 12/2015 | Guo et al. |
| 2016/0090321 | A1 | 3/2016 | Bookbinder et al. |
| 2016/0168023 | A1 | 6/2016 | Baum et al. |
| 2017/0217825 | A1 | 8/2017 | Hasegawa et al. |
| 2017/0355636 | A1 | 12/2017 | Borrelli et al. |
| 2018/0162768 | A1 | 6/2018 | Boek et al. |
| 2018/0362390 | A1 | 12/2018 | Claireaux et al. |
| 2019/0071345 | A1 | 3/2019 | Mauro et al. |
| 2019/0263713 | A1 | 8/2019 | Murayama et al. |
| 2020/0140322 | A1 | 5/2020 | Comte et al. |
| 2020/0377404 | A1 | 12/2020 | Beall et al. |
| 2021/0155530 | A1 | 5/2021 | Cui et al. |

FOREIGN PATENT DOCUMENTS

| | | |
|---|---|---|
| CN | 107935410 A | 4/2018 |
| CN | 108715510 A | 10/2018 |
| CN | 109970362 A | 7/2019 |
| CN | 110255896 A | 9/2019 |
| EP | 3390311 B1 | 8/2019 |
| GB | 1124001 A | 8/1968 |
| JP | 2003-306348 A | 10/2003 |
| JP | 4192232 B2 | 12/2008 |
| RU | 2645687 C1 | 2/2018 |
| WO | 2013/099994 A1 | 7/2013 |
| WO | 2019/064280 A1 | 4/2019 |

OTHER PUBLICATIONS

"Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992),".
"Reddy, K. P. R. et al, "Fracture Toughness Measurement of Glass and Ceramic Materials Using Chevron-Notched Specimens," J. Am. Ceram. Soc., 71 [6], C-310-C-313 (1988)".
ASTM C1351M-96(2017) "Standard Test Method for Measurement of Viscosity of Glass Between 104 Pas and 108 Pas by Viscous Compression of a Solid Right Cylinder".
ASTM C829-81 (2015), titled "Standard Practice for Measurement of Liquidus Temperature of Glass by the Gradient Furnace Method".
ASTM E228-85 (1989), "Standard Test Method for Linear Thermal Expansion of Solid Materials With a Vitreous Silica Dilatometer".
ASTM standard C770-16, entitled "Standard Test Method for Measurement of Glass Stress-Optical Coefficient,".
Hirao et al., "Crystallization effect on non-linear optical response of silicate glass and glass-ceramics containing gold nanoparticles." Journal of non-crystalline solids, vol. 290, No. 1, 2001, pp. 49-56.
Stookey, S. D. "Coloration of glass by gold, silver, and copper." Journal of the American Ceramic Society, vol. 32, No. 8, 1949, pp. 246-249.
Yazawa, et al., "Nanosized gold clusters formation in selected areas of soda-lime silicate glass." Journal of non-crystalline solids, vol. 324, No. 3, 2003, pp. 295-299.

*Primary Examiner* — Elizabeth A. Bolden
(74) *Attorney, Agent, or Firm* — Russell Magaziner

(57) ABSTRACT

A colored glass article includes from 40 mol % to 70 mol % $SiO_2$; from 8 mol % to 20 mol % $Al_2O_3$; from 1 mol % to 10 mol % $B_2O_3$; from 1 mol % to 20 mol % $Li_2O$; from 1 mol % to 15 mol % $Na_2O$; from 0 mol % to 8 mol % MgO; from 0 mol % to 5 mol % ZnO; and from 0.0005 mol % to 1 mol % Au. MgO+ZnO is from 0.1 mol % to 6 mol %.

20 Claims, 7 Drawing Sheets

COLORED GLASS ARTICLES HAVING
IMPROVED MECHANICAL DURABILITY

This application claims the benefit of priority under 35 U.S.C. § 119 of U.S. Provisional Application Ser. No. 63/304,807 filed on Jan. 31, 2022, and U.S. Provisional Application Ser. No. 63/212,191 filed on Jun. 18, 2021, the content of each is relied upon and incorporated herein by reference in its entirety.

FIELD

The present specification generally relates to glass compositions and glass articles and, in particular, to glass compositions and ion-exchangeable, colored glass articles formed therefrom.

TECHNICAL BACKGROUND

Aluminosilicate glass articles may exhibit superior ion-exchangeability and drop performance. Various industries, including the consumer electronics industry, desire colored materials with the same or similar strength and fracture toughness properties. However, simply including colorants in conventional aluminosilicate glass compositions may not produce the desired color.

Accordingly, a need exists for an alternative colored glass articles having high strength and fracture toughness.

SUMMARY

According to a first aspect A1, a colored glass article may comprise: greater than or equal to 40 mol % and less than or equal to 70 mol % $SiO_2$; greater than or equal to 8 mol % and less than or equal to 20 mol % $Al_2O_3$; greater than or equal to 1 mol % and less than or equal to 10 mol % $B_2O_3$; greater than or equal to 1 mol % and less than or equal to 20 mol % $Li_2O$; greater than or equal to 1 mol % and less than or equal to 15 mol % $Na_2O$; greater than or equal to 0 mol % and less than or equal to 8 mol % MgO; greater than or equal to 0 mol % and less than or equal to 5 mol % ZnO; and greater than or equal to 0.0005 mol % and less than or equal to 1 mol % Au, wherein: MgO+ZnO is greater than or equal to 0.1 mol % and less than or equal to 6 mol %.

A second aspect A2 includes the colored glass article according to the first aspect A1, wherein MgO+ZnO is greater than or equal to 0.5 mol % and less than or equal to 5.5 mol %.

A third aspect A3 includes the colored glass article according to the first aspect A1 or second aspect A2, wherein the colored glass article comprises greater than or equal to 0.5 mol % and less than or equal to 7 mol % MgO.

A fourth aspect A4 includes the colored glass article according to any one of the first aspect A1 to third aspect A3, wherein the colored glass article comprises greater than or equal to 0.1 mol % and less than or equal to 4 mol % ZnO.

A fifth aspect A5 includes the colored glass article according to any one of the first aspect A1 to fourth aspect A4, wherein the colored glass article comprises 0.001 mol % and less than or equal to 0.5 mol % Au.

A sixth aspect A6 includes the colored glass article according to any one of the first aspect A1 to fifth aspect A5, wherein $R_2O$—$Al_2O_3$ is greater than or equal to −3 mol % and less than or equal to 2 mol %.

A seventh aspect A7 includes the colored glass article according to any one of the first aspect A1 to sixth aspect A6, wherein the colored glass article comprises greater than or equal to 0.1 mol % and less than or equal to 2 mol % $ZrO_2$.

An eighth aspect A8 includes the colored glass article according to the seventh aspect A7, wherein the colored glass article comprises greater than or equal to 0.25 mol % and less than or equal to 1.5 mol % $ZrO_2$.

A ninth aspect A9, includes the colored glass article according to any one of the first aspect A1 to eighth aspect A8, wherein the colored glass article comprises greater than or equal to 0.1 mol % and less than or equal to 1 mol % $Fe_2O_3$.

A tenth aspect A10 includes the colored glass article according to any one of the first aspect A1 to ninth aspect A9, wherein 5.72*$Al_2O_3$ (mol %)—21.4*ZnO (mol %)—2.5*$P_2O_5$ (mol %)—35*$Li_2O$ (mol %)—16.6*$B_2O_3$ (mol %)—20.5*MgO (mol %)—23.3*$Na_2O$ (mol %)-27.9*SrO (mol %)—18.5*$K_2O$ (mol %)—26.3*CaO (mol %) is greater than −609 mol %.

An eleventh aspect A11 includes the colored glass article according to any one of the first aspect A1 to tenth aspect A10, wherein the colored glass article comprises greater than or equal to 0.01 mol % and less than or equal to 1 mol % $SnO_2$.

A twelfth aspect A12 includes the colored glass article according to the eleventh aspect A11, wherein the colored glass article comprises greater than or equal to 0.05 mol % and less than or equal to 0.75 mol % $SnO_2$.

A thirteenth aspect A13 includes the colored glass article according to any one of the first aspect A1 to twelfth aspect A12, wherein the colored glass article comprises greater than or equal to 0.01 mol % and less than or equal to 1 mol % $Sb_2O_3$.

A fourteenth aspect A14 includes the colored glass article according to any one of the first aspect A1 to thirteenth aspect A13, wherein the colored glass article comprises greater than or equal to 0.01 mol % and less than or equal to 1 mol % $Bi_2O_3$.

A fifteenth aspect A15 includes the colored glass article according to any one of the first aspect A1 to fourteenth aspect A14, wherein the colored glass article comprises greater than or equal to 0.1 mol % and less than or equal to 1 mol % $P_2O_5$.

A sixteenth aspect A16 includes the colored glass article according to any one of the first aspect A1 to fourteenth aspect A14, wherein the colored glass article is substantially free of $P_2O_5$.

A seventeenth aspect A17 includes the colored glass article according to any one of the first aspect A1 to sixteenth aspect A16, wherein $R_2O$ is greater than or equal to 2 mol % and less than or equal to 35 mol %, wherein $R_2O$ is the sum of $Li_2O$, $Na_2O$, and $K_2O$.

An eighteenth aspect A18 includes the colored glass article according to any one of the first aspect A1 to seventeenth aspect A17, wherein the colored glass article comprises greater than or equal to 10 mol % and less than or equal to 18 mol % $Al_2O_3$.

A nineteenth aspect A19 includes the colored glass article according to any one of the first aspect A1 to eighteenth aspect A18, wherein the colored glass article comprises greater than or equal to 10 mol % and less than or equal to 18 mol % $Al_2O_3$.

A twentieth aspect A20 includes the colored glass article according to any one of the first aspect A1 to nineteenth aspect A19, wherein the colored glass article comprises greater than or equal to 3 mol % and less than or equal to 17 mol % $Li_2O$.

A twenty-first aspect A21 includes the colored glass article according to any one of the first aspect A1 to twentieth aspect A20, wherein the colored glass article comprises greater than or equal to 2 mol % and less than or equal to 10 mol % $Na_2O$.

A twenty-second aspect A22 includes the colored glass article according to any one of the first aspect A1 to twenty-first aspect A21, wherein the colored glass article comprises greater than or equal to 2 mol % and less than or equal to 8 mol % $B_2O_3$.

A twenty-third aspect A23 includes the colored glass article according to any one of the first aspect A1 to twenty-second aspect A22, wherein the colored glass article comprises greater than or equal to 45 mol % and less than or equal to 67 mol % $SiO_2$.

A twenty-fourth aspect A24 includes the colored glass article according to any one of the first aspect A1 to twenty-third aspect A23, wherein the colored glass article has a transmittance color coordinate in the CIELAB color space of: L* greater than or equal to 65 and less than or equal to 97; a* greater than or equal to −5 and less than or equal to 25; and b* greater than or equal to −20 and less than or equal to 5.

According to a twenty-fifth aspect A25, a glass composition may comprise: greater than or equal to 40 mol % and less than or equal to 70 mol % $SiO_2$; greater than or equal to 8 mol % and less than or equal to 20 mol % $Al_2O_3$; greater than or equal to 1 mol % and less than or equal to 10 mol % $B_2O_3$; greater than or equal to 1 mol % and less than or equal to 20 mol % $Li_2O$; greater than or equal to 1 mol % and less than or equal to 15 mol % $Na_2O$; greater than or equal to 0 mol % and less than or equal to 8 mol % MgO; greater than or equal to 0 mol % and less than or equal to 5 mol % ZnO; and greater than or equal to 0.0005 mol % and less than or equal to 1 mol % Au, wherein: MgO+ZnO is greater than or equal to 0.1 mol % and less than or equal to 6 mol %.

A twenty-sixth aspect A26 includes the glass composition according to the twenty-fifth aspect A25, wherein the glass composition has a melting point less than or equal to 1550° C.

A twenty-seventh aspect A27 includes the glass composition according to the twenty-fifth aspect A25 or twenty-sixth aspect A26, wherein MgO+ZnO is greater than or equal to 1 mol % and less than or equal to 5 mol %.

A twenty-eighth aspect A28 includes the glass composition according to any one of the twenty-fifth aspect A25 to twenty-seventh aspect A27, wherein the glass composition comprises greater than or equal to 1 mol % and less than or equal to 6 mol % MgO.

A twenty-ninth aspect A29 includes the glass composition according to any one of the twenty-fifth aspect A25 to twenty-eighth aspect A28, wherein the glass composition comprises greater than or equal to 0.1 mol % and less than or equal to 3 mol % ZnO.

A thirtieth aspect A30 includes the glass composition according to any one of the twenty-fifth aspect A25 to twenty-ninth aspect A29, wherein the glass composition comprises 0.001 mol % and less than or equal to 0.5 mol % Au.

A thirty-first aspect A31 includes a glass composition according to any one of the twenty-fifth aspect A25 to thirtieth aspect A30, wherein $R_2O$—$Al_2O_3$ is greater than or equal to −3 mol % and less than or equal to 2 mol %.

A thirty-second aspect A32 includes the glass composition according to any one of the twenty-fifth aspect A25 to thirty-first aspect A31, wherein the glass composition comprises greater than or equal to 0.1 mol % and less than or equal to 2 mol % $ZrO_2$.

A thirty-third aspect A33 includes the glass composition according to the thirty-second aspect A32, wherein the glass composition comprises greater than or equal to 0.25 mol % and less than or equal to 1.5 mol % $ZrO_2$.

A thirty-fourth aspect A34 includes the glass composition according to any one of the twenty-fifth aspect A25 to thirty-third aspect A33, wherein the glass composition comprises greater than or equal to 0.1 mol % and less than or equal to 1 mol % $Fe_2O_3$.

A thirty-fifth aspect A35 includes the glass composition according to any one of the twenty-fifth aspect A25 to thirty-fourth aspect A34, wherein 5.72*$Al_2O_3$ (mol %)—21.4*ZnO (mol %)—2.5*$P_2O_5$ (mol %)-35*$Li_2O$ (mol %)-16.6*$B_2O_3$ (mol %)-20.5*MgO (mol %)-23.3*$Na_2O$ (mol %)-27.9*SrO (mol %)-18.5*$K_2O$ (mol %)-26.3*CaO (mol %) is greater than −609 mol %.

A thirty-sixth aspect A36 includes the glass composition according to any one of the twenty-fifth aspect A25 to thirty-fifth aspect A35, wherein the glass composition comprises greater than or equal to 0.01 mol % and less than or equal to 1 mol % $SnO_2$.

A thirty-seventh aspect A37 includes the glass composition according to the thirty-sixth aspect A36, wherein the glass composition comprises greater than or equal to 0.05 mol % and less than or equal to 0.5 mol % $SnO_2$.

A thirty-eighth aspect A38 includes the glass composition according to any one of the twenty-fifth aspect A25 to thirty-seventh aspect A37, wherein the glass composition comprises greater than or equal to 0.01 mol % and less than or equal to 1 mol % $Sb_2O_3$.

A thirty-ninth aspect A39 includes the glass composition according to any one of the twenty-fifth aspect A25 to thirty-eighth aspect A38, wherein the glass composition comprises greater than or equal to 0.01 mol % and less than or equal to 1 mol % $Bi_2O_3$.

A fortieth aspect A40 includes the glass composition according to any one of the twenty-fifth aspect A25 to thirty-ninth aspect A39, wherein the glass composition comprises greater than or equal to 0.1 mol % and less than or equal to 1 mol % $P_2O_5$.

A forty-first aspect A41 includes the glass composition according to any one of the twenty-fifth aspect A25 to fortieth aspect A40, wherein the glass composition is substantially free of $P_2O_5$.

A forty-second aspect A42 includes the glass composition according to any one of the twenty-fifth aspect A25 to forty-first aspect A41, wherein the glass composition comprises greater than or equal to 0.1 mol % and less than or equal to 1 mol % $K_2O$.

A forty-third aspect A43 includes the glass composition according to any one of the twenty-fifth aspect A25 to forty-second aspect A42, wherein $R_2O$ is greater than or equal to 2 mol % and less than or equal to 35 mol %, wherein $R_2O$ is the sum of $Li_2O$, $Na_2O$, and $K_2O$.

A forty-fourth aspect A44 includes the glass composition according to any one of the twenty-fifth aspect A25 to forty-third aspect A43, wherein the glass composition comprises greater than or equal to 10 mol % and less than or equal to 18 mol % $Al_2O_3$.

A forty-fifth aspect A45 includes the glass composition according to any one of the twenty-fifth aspect A25 to forty-fourth aspect A44, wherein the glass composition comprises greater than or equal to 3 mol % and less than or equal to 17 mol % $Li_2O$.

A forty-sixth aspect A46 includes the glass composition according to any one of the twenty-fifth A25 to forty-fifth aspect A45, wherein the glass composition comprises greater than or equal to 2 mol % and less than or equal to 10 mol % $Na_2O$.

A forty-seventh aspect A47 includes the glass composition according to any one of the twenty-fifth aspect A25 to forty-sixth aspect A46, wherein the glass composition comprises greater than or equal to 2 mol % and less than or equal to 8 mol % $B_2O_3$.

A forty-eighth aspect A48 includes the glass composition according to any one of the twenty-fifth aspect A25 to forty-seventh aspect A47, wherein the glass composition comprises greater than or equal to 45 mol % and less than or equal to 67 mol % $SiO_2$.

A forty-ninth aspect A49 includes the glass composition according to any one of the twenty-fifth aspect A25 to forty-eighth aspect A48, wherein the glass composition comprises greater than or equal to 0 mol % and less than or equal to 1 mol % of a cation "M", wherein "M" is at least one of F, Cl, Br, Ti, V, Cr, Mn, Fe, Co, Ni, Cu, Se, Nb, Mo, Ru, Rh, Pd, Ag, Cd, In, Te, W, Ir, Pt, Ce, Pr, Nd, Sm, Eu, Gd, Tb, Dy, Ho, and Er.

According to a fiftieth aspect A50, a colored glass article may comprise: greater than or equal to 40 mol % and less than or equal to 70 mol % $SiO_2$; greater than or equal to 8 mol % and less than or equal to 20 mol % $Al_2O_3$; greater than or equal to 1 mol % and less than or equal to 10 mol % $B_2O_3$; greater than or equal to 1 mol % and less than or equal to 20 mol % $Li_2O$; greater than or equal to 1 mol % and less than or equal to 15 mol % $Na_2O$; greater than or equal to 0 mol % and less than or equal to 6 mol % MgO; greater than or equal to 0 mol % and less than or equal to 5 mol % ZnO; and greater than or equal to $1 \times 10^{-6}$ mol % and less than or equal to 1 mol % Au, wherein: MgO+ZnO is greater than or equal to 0.1 mol % and less than or equal to 6 mol %.

A fifty-first aspect A51 includes the glass article according to the fiftieth aspect A50, wherein MgO+ZnO is greater than or equal to 0.5 mol % and less than or equal to 5.5 mol %.

A fifty-second aspect A52 includes the glass article according to the fiftieth aspect A50 or fifty-first aspect A51, wherein the colored glass article comprises greater than or equal to 0.1 mol % and less than or equal to 5 mol % MgO.

A fifty-third aspect A53 includes the glass article according to any one of the fiftieth aspect A50 to fifty-second aspect A52, wherein the colored glass article comprises greater than or equal to 0.1 mol % and less than or equal to 4 mol % ZnO.

A fifty-fourth aspect A54 includes the glass article according to any one of the fiftieth aspect A50 to fifty-third aspect A53, wherein the colored glass article comprises greater than or equal to $1 \times 10^{-6}$ mol % and less than or equal to 0.01 mol % Au.

A fifty-fifth aspect A55 includes the glass article according to any one of the fiftieth aspect A50 to fifty-fourth aspect, wherein $R_2O$—$Al_2O_3$ is greater than or equal to −3 mol % and less than or equal to 2 mol %.

A fifty-sixth aspect A56 includes the article according to any one of the fiftieth aspect A50 to fifty-fifth aspect A55, wherein the colored glass article comprises greater than or equal to 0.1 mol % and less than or equal to 2 mol % $ZrO_2$.

A fifty-seventh aspect A57 includes the article, wherein a colored glass article comprises greater than or equal to 0.25 mol % and less than or equal to 1.5 mol % $ZrO_2$.

A fifty-eighth aspect A58 includes the article according to any one of the fiftieth aspect A50 to fifty-seventh aspect A57, wherein the colored glass article comprises greater than or equal to 0.1 mol % and less than or equal to 1 mol % $Fe_2O_3$.

A fifty-ninth aspect A59 includes the article according to any one of the fiftieth aspect A50 to fifty-eighth aspect A58, wherein $5.72*Al_2O_3$ (mol %)-$21.4*ZnO$ (mol %)-$2.5*P_2O_5$ (mol %)-$35*Li_2O$ (mol %)-$16.6*B_2O_3$ (mol %)-$20.5*MgO$ (mol %)-$23.3*Na_2O$ (mol %)-$27.9*SrO$ (mol %)-$18.5*K_2O$ (mol %)-$26.3*CaO$ (mol %) is greater than −609 mol %.

A sixtieth aspect A60 includes the article according to any one of the fiftieth aspect A50 to fifty-ninth aspect A59, wherein the colored glass article comprises greater than or equal to 0.01 mol % and less than or equal to 1 mol % $SnO_2$.

A sixty-first aspect A61 includes the article according to the sixtieth aspect A60, wherein the colored glass article comprises greater than or equal to 0.05 mol % and less than or equal to 0.75 mol % $SnO_2$.

A sixty-second aspect A62 includes the article according to any one of the fiftieth aspect A50 to sixty-first aspect A61, wherein the colored glass article comprises greater than or equal to 0.01 mol % and less than or equal to 1 mol % $Sb_2O_3$.

A sixty-third aspect A63 includes the article according to any one of the fiftieth aspect A50 to sixty-second aspect A62, wherein the colored glass article comprises greater than or equal to 0.01 mol % and less than or equal to 1 mol % $Bi_2O_3$.

A sixty-fourth aspect A64 includes the article according to any one of the fiftieth aspect A50 to sixty-third aspect A63, wherein the colored glass article comprises greater than or equal to 0.1 mol % and less than or equal to 1 mol % $P_2O_5$.

A sixty-fifth aspect A65 includes the article according to any one of the fiftieth aspect A50 to sixty-third aspect A63, wherein the colored glass article is substantially free of $P_2O_5$.

A sixty-sixth aspect A66 includes the article according to any one of the fiftieth aspect A50 to sixty-fifth aspect A65, wherein the colored glass article comprises greater than or equal to 0.1 mol % and less than or equal to 1 mol % $K_2O$.

A sixty-seventh aspect A67 includes the article according to any one of the fiftieth aspect A50 to sixty-sixty aspect A66, wherein $R_2O$ is greater than or equal to 2 mol % and less than or equal to 35 mol %, wherein $R_2O$ is the sum of $Li_2O$, $Na_2O$, and $K_2O$.

A sixty-eighth aspect A68 includes the article according to any one of the fiftieth aspect A50 to sixty-seventh aspect A67, wherein the colored glass article comprises greater than or equal to 10 mol % and less than or equal to 18 mol % $Al_2O_3$.

A sixty-ninth aspect A69 includes the article according to any one of the fiftieth aspect A50 to sixty-eighth aspect A68, wherein the colored glass article comprises greater than or equal to 3 mol % and less than or equal to 17 mol % $Li_2O$.

A seventieth aspect A70 includes the article according to any one of the fiftieth aspect A50 to sixty-ninth aspect A69, wherein the colored glass article comprises greater than or equal to 2 mol % and less than or equal to 10 mol % $Na_2O$.

A seventy-first aspect A71 includes the article according to any one of the fiftieth aspect A50 to seventieth aspect A70, wherein the colored glass article comprises greater than or equal to 2 mol % and less than or equal to 8 mol % $B_2O_3$.

A seventy-second aspect A72 includes the article according to any one of the fiftieth aspect A50 to seventy-first aspect A71, wherein the colored glass article comprises greater than or equal to 45 mol % and less than or equal to 67 mol % $SiO_2$.

A seventy-third aspect A73 includes the article according to any one of the fiftieth aspect A50 to seventy-second aspect A72, wherein the colored glass article has a transmittance color coordinate in the CIELAB color space as measured at an article thickness of 1.33 mm under F2 illumination and a 100 standard observer angle of: L* greater than or equal to 65 and less than or equal to 98; a* greater than or equal to −10 and less than or equal to 25; and b* greater than or equal to −20 and less than or equal to 5.

A seventy-fourth aspect A74 includes the article according to any one of the fiftieth aspect A50 to seventy-third aspect A73, wherein the colored glass article has a thickness greater than or equal to 250 μm and less than or equal to 6 mm.

A seventy-fifth aspect A75 includes the article according to any one of the fiftieth aspect A50 to seventy-fourth aspect A74, wherein the colored glass article is an ion-exchanged colored glass article.

A seventy-sixth aspect A76 includes the article according to the seventh-fifth aspect A75, wherein the ion-exchanged colored glass article has a depth of compression 3 μm or greater.

A seventy-seventh aspect A77 includes the article according to any one of the seventy-fifth aspect A75 or seventy-sixth aspect A76, wherein the ion-exchanged colored glass article has a thickness "t" and a depth of compression greater than or equal to 0.15 t.

A seventy-eighth aspect A78 includes the article according to any one of the seventy-fifth aspect A75 to seventy-seventh aspect A77, wherein the ion-exchanged colored glass article has a surface compressive stress greater than or equal to 300 MPa.

A seventy-ninth aspect A79 includes the article according to any one of the seventy-fifth aspect A75 to seventy-eighth aspect A78, wherein the ion-exchanged colored glass article has a maximum central tension greater than or equal to 40 MPa.

According to the eightieth aspect A80, a consumer electronic device may comprise: a housing having a front surface, a back surface, and side surfaces; and electrical components provided at least partially within the housing, the electrical components including at least a controller, a memory, and a display, the display being provided at or adjacent the front surface of the housing; wherein the housing comprises the colored glass article of according to the fiftieth aspect A50.

According to the eighty-first aspect A81, a glass composition may comprise: greater than or equal to 40 mol % and less than or equal to 70 mol % $SiO_2$; greater than or equal to 8 mol % and less than or equal to 20 mol % $Al_2O_3$; greater than or equal to 1 mol % and less than or equal to 10 mol % $B_2O_3$; greater than or equal to 1 mol % and less than or equal to 20 mol % $Li_2O$; greater than or equal to 1 mol % and less than or equal to 15 mol % $Na_2O$; greater than or equal to 0 mol % and less than or equal to 6 mol % MgO; greater than or equal to 0 mol % and less than or equal to 5 mol % ZnO; and greater than or equal to $1\times10^{-6}$ mol % mol % and less than or equal to 1 mol % Au, wherein: MgO+ZnO is greater than or equal to 0.1 mol % and less than or equal to 6 mol %.

An eighty-second aspect A82 includes the composition according to the eighty-first aspect A81, wherein the glass composition has a melting point less than or equal to 1550° C.

An eighty-third aspect A83 includes the composition according to the eighty-first A81 or eighty-second A82, wherein MgO+ZnO is greater than or equal to 0.5 mol % and less than or equal to 5.5 mol %.

An eighty-fourth aspect A84 includes the composition according to any one of the eighty-first aspect A81 to eighty-third aspect A83, wherein the glass composition comprises greater than or equal to 0.1 mol % and less than or equal to 5 mol % MgO.

An eighty-fifth aspect A85 includes the composition according to any one of the eight-first aspect A81 to eighty-fourth aspect A84, wherein the glass composition comprises greater than or equal to 0.1 mol % and less than or equal to 3 mol % ZnO.

An eighty-sixth aspect A86 includes the composition according to any one of the eighty-first aspect A81 to eighty-fifth aspect A85, wherein the glass composition comprises greater than or equal to $1\times10^{-6}$ mol % and less than or equal to 0.01 mol % Au.

An eighty-seventh aspect A87 includes the composition according to any one of the eighty-first aspect A81 to eighty-sixth aspect A86, wherein $R_2O$—$Al_2O_3$ is greater than or equal to −3 mol % and less than or equal to 2 mol %.

An eighty-eighth aspect A88 includes the composition according to any one of the eighty-first aspect A81 to eighty-seventh aspect A87, wherein the glass composition comprises greater than or equal to 0.1 mol % and less than or equal to 2 mol % $ZrO_2$.

An eighty-ninth aspect A89 includes the composition according to the eighty-eighth aspect A88, wherein the glass composition comprises greater than or equal to 0.25 mol % and less than or equal to 1.5 mol % $ZrO_2$.

A ninetieth aspect A90 includes the composition according to any one of the eighty-first aspect A81 to eighty-ninth aspect A89, wherein the glass composition comprises greater than or equal to 0.1 mol % and less than or equal to 1 mol % $Fe_2O_3$.

A ninety-first aspect A91 includes the composition according to any one of the eighty-first aspect A81 to ninetieth aspect A90, wherein 5.72*$Al_2O_3$ (mol %)-21.4*ZnO (mol %)-2.5*$P_2O_5$ (mol %)-35*$Li_2O$ (mol %)-16.6*$B_2O_3$ (mol %)-20.5*MgO (mol %)-23.3*$Na_2O$ (mol %)-27.9*SrO (mol %)-18.5*$K_2O$ (mol %)-26.3*CaO (mol %) is greater than −609 mol %.

A ninety-second aspect A92 includes the composition according to any one of the eighty-first aspect A81 to ninety-first aspect A91, wherein the glass composition comprises greater than or equal to 0.01 mol % and less than or equal to 1 mol % $SnO_2$.

A ninety-third aspect A93 includes the composition according to the ninety-second aspect A92, wherein the glass composition comprises greater than or equal to 0.05 mol % and less than or equal to 0.5 mol % $SnO_2$.

A ninety-fourth aspect A94 includes the composition according to any one of the eighty-first aspect A81 to ninety-third aspect A93, wherein the glass composition comprises greater than or equal to 0.01 mol % and less than or equal to 1 mol % $Sb_2O_3$.

A ninety-fifth aspect A95 includes the composition according to any one of the eighty-first A81 to ninety-fourth aspect A94, wherein the glass composition comprises greater than or equal to 0.01 mol % and less than or equal to 1 mol % $Bi_2O_3$.

A ninety-sixth aspect A96 includes the composition according to any one of the eighty-first aspect A81 to ninety-fifth aspect A95, wherein the glass composition comprises greater than or equal to 0.1 mol % and less than or equal to 1 mol % $P_2O_5$.

A ninety-seventh aspect A97 includes the composition according to any one of the eighty-first aspect A81 to ninety-fifth aspect A95, wherein the glass composition is substantially free of $P_2O_5$.

A ninety-eighth aspect A98 includes the composition according to any one of the eighty-first aspect A81 to ninety-seventh aspect A97, wherein the glass composition comprises greater than or equal to 0.1 mol % and less than or equal to 1 mol % $K_2O$.

A ninety-ninth aspect A99 includes the composition according to any one of the eighty-first aspect A81 to ninety-eighth aspect A98, wherein $R_2O$ is greater than or equal to 2 mol % and less than or equal to 35 mol %, wherein $R_2O$ is the sum of $Li_2O$, $Na_2O$, and $K_2O$.

A one-hundredth aspect A100 includes the composition according to any one of the eighty-first aspect A81 to ninety-ninth aspect A99, wherein the glass composition comprises greater than or equal to 10 mol % and less than or equal to 18 mol % $Al_2O_3$.

A one-hundred-first aspect A101 includes the composition according to any one of the eighty-first aspect A81 to one-hundredth aspect A100, wherein the glass composition comprises greater than or equal to 3 mol % and less than or equal to 17 mol % $Li_2O$.

A one-hundred-second aspect A102 includes the composition according to any one of the eighty-first aspect A81 to one-hundred-first aspect A101, wherein the glass composition comprises greater than or equal to 2 mol % and less than or equal to 10 mol % $Na_2O$.

A one-hundred-third aspect A103 includes the composition according to any one of the eighty-first aspect A81 to one-hundred-second aspect A102, wherein the glass composition comprises greater than or equal to 2 mol % and less than or equal to 8 mol % $B_2O_3$.

A one-hundred-fourth aspect A104 includes the composition according to any one of the eighty-first aspect A81 to one-hundred-third aspect A103, wherein the glass composition comprises greater than or equal to 45 mol % and less than or equal to 67 mol % $SiO_2$.

A one-hundred-fifth aspect A105 includes the composition according to any one of the eighty-first aspect A81 to one-hundred-fourth aspect A104, wherein the glass composition comprises greater than or equal to 0 mol % and less than or equal to 1 mol % of a cation "M", wherein "M" is at least one of F, Cl, Br, Ti, V, Cr, Mn, Fe, Co, Ni, Cu, Se, Nb, Mo, Ru, Rh, Pd, Ag, Cd, In, Te, W, Ir, Pt, Ce, Pr, Nd, Sm, Eu, Gd, Tb, Dy, Ho, and Er.

According to the one-hundred-sixth aspect A106, a method of forming a colored glass article may comprise: heat treating a glass composition to form a glass article, the glass composition comprising: greater than or equal to 40 mol % and less than or equal to 70 mol % $SiO_2$; greater than or equal to 8 mol % and less than or equal to 20 mol % $Al_2O_3$; greater than or equal to 1 mol % and less than or equal to 10 mol % $B_2O_3$; greater than or equal to 1 mol % and less than or equal to 20 mol % $Li_2O$; greater than or equal to 1 mol % and less than or equal to 15 mol % $Na_2O$; greater than or equal to 0 mol % and less than or equal to 6 mol % MgO; greater than or equal to 0 mol % and less than or equal to 5 mol % ZnO; and greater than or equal to $1\times10^{-6}$ mol % and less than or equal to 1 mol % Au, wherein: MgO+ZnO is greater than or equal to 0.1 mol % and less than or equal to 6 mol %; and, subjecting the glass article to a heat treatment cycle at a temperature greater than or equal to 500° C. and less than or equal to 800° C. and a duration greater than or equal to 0.25 hour and less than or equal to 24 hours to produced the colored glass article.

A one-hundred-seventh aspect A107 includes the method according to the one-hundred-sixth aspect A106, wherein the temperature of the heat treatment cycle is greater than or equal to 550° C. and less than or equal to 775° C.

A one-hundred-eighth aspect A108 includes the method according to the one-hundred and sixth aspect A106 or one-hundred-seventh aspect A107, wherein the duration of the heat treatment cycle is greater than or equal to 0.5 hour and less than or equal to 16 hours.

A one-hundred-ninth aspect A109 includes the method according to any one of the one-hundred-sixth aspect A106 to one-hundred-eighth aspect A108, further comprising strengthening the colored glass article in an ion exchange bath at a temperature greater than or equal to 350° C. to less than or equal to 500° C. for a time period greater than or equal to 2 hours to less than or equal to 12 hours to form an ion exchanged glass-ceramic article.

A one-hundred-tenth aspect A110 includes the method according to the one-hundred-ninth aspect A109, wherein the ion exchange bath comprises $KNO_3$.

A one-hundred-eleventh aspect A11 includes the method according to the one-hundred-tenth aspect A110, wherein the ion exchange bath comprises $NaNO_3$.

Additional features and advantages of the colored glass articles described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
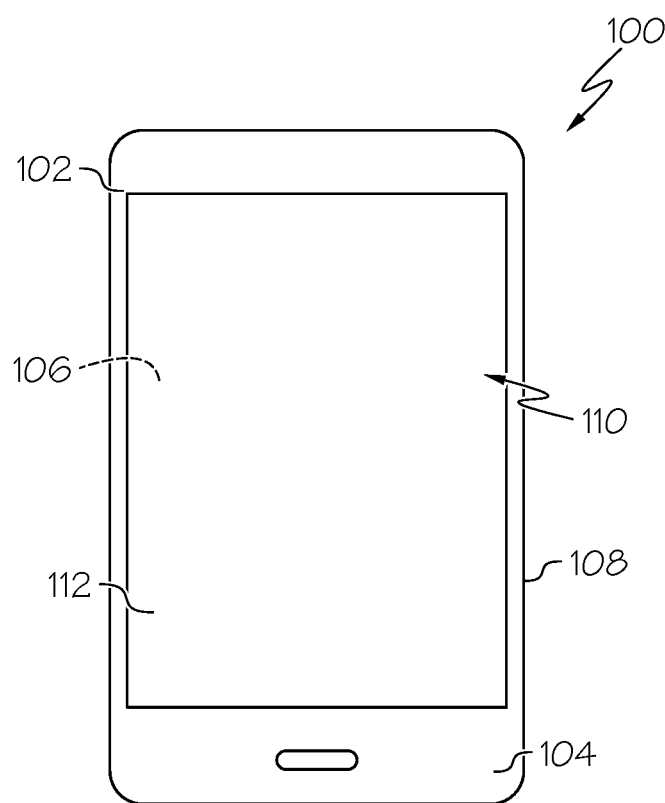
FIG. 1 is a plan view of an electronic device incorporating any of the colored glass articles according to one or more embodiments described herein.

Reference will now be made in detail to various embodiments of glass compositions and colored glass articles formed therefrom having a desired color. According to embodiments, a colored glass article includes greater than or equal to 40 mol % and less than or equal to 70 mol % $SiO_2$; greater than or equal to 8 mol % and less than or equal to 20 mol % $Al_2O_3$; greater than or equal to 1 mol % and less than or equal to 10 mol % $B_2O_3$; greater than or equal to 1 mol % and less than or equal to 20 mol % $Li_2O$; greater than or equal to 1 mol % and less than or equal to 15 mol % $Na_2O$; greater than or equal to 0 mol % and less than or equal to 8 mol % MgO; greater than or equal to 0 mol % and less than or equal to 5 mol % ZnO; and greater than or equal to 0.0005 mol % and less than or equal to 1 mol % Au. MgO+ZnO is greater than or equal to 0.1 mol % and less than or equal to 6 mol %.

According to other embodiments, a colored glass article includes greater than or equal to 40 mol % and less than or equal to 70 mol % $SiO_2$; greater than or equal to 8 mol % and less than or equal to 20 mol % $Al_2O_3$; greater than or equal to 1 mol % and less than or equal to 10 mol % $B_2O_3$; greater than or equal to 1 mol % and less than or equal to 20 mol % $Li_2O$; greater than or equal to 1 mol % and less than or equal to 15 mol % $Na_2O$; greater than or equal to 0 mol % and less than or equal to 6 mol % MgO; greater than or equal to 0 mol % and less than or equal to 5 mol % ZnO; and greater than or equal to $1 \times 10^{-6}$ mol % and less than or equal to 1 mol % Au. MgO+ZnO is greater than or equal to 0.1 mol % and less than or equal to 6 mol %.

Various embodiments of colored glass articles and methods of making the same will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the embodiments of the glass compositions and the resultant colored glass articles described herein, the concentrations of constituent components in oxide form (e.g., $SiO_2$, $Al_2O_3$, and the like) are specified in mole percent (mol %) on an oxide basis, unless otherwise specified.

In embodiments of the glass compositions and the resultant colored glass articles described herein, the concentration of Au is specified in mole percent (mol %), unless otherwise specified.

In embodiments of the glass compositions and the resultant colored glass articles described herein, the concentration of a cation "M" is specified in mole percent (mol %), unless otherwise specified.

The terms "0 mol %," "free," and "substantially free," when used to describe the concentration and/or absence of a particular constituent component in a glass composition and the resultant colored glass article, means that the constituent component is not intentionally added to the glass composition and the resultant colored glass article. However, the glass composition and the resultant colored glass article may contain traces of the constituent component as a contaminant or tramp in amounts of less than 0.01 mol %.

The term "fracture toughness," as used herein, refers to the $K_{IC}$ value, and is measured by the chevron notched short bar method. The chevron notched short bar (CNSB) method is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that Y*m is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992).

The viscosity of the glass composition, as described herein, is measured according to ASTM C965-96.

The term "melting point," as used herein, refers to the temperature at which the viscosity of the glass composition is 200 poise.

The term "softening point," as used herein, refers to the temperature at which the viscosity of the glass composition is $1\times10^{7.6}$ poise. The softening point is measured according to the parallel plate viscosity method which measures the viscosity of inorganic glass from $10^7$ to $10^9$ poise as a function of temperature, similar to ASTM C1351M.

The terms "annealing point" as used herein, refer to the temperature at which the viscosity of the glass composition is $1\times10^{13.18}$ poise.

The term "strain point," as used herein, refers to the temperature at which the viscosity of the glass composition is $1\times10^{14.68}$ poise.

The term "linear coefficient of thermal expansion" and "CTE," as described herein, is measured in accordance with ASTM E228-85 over the temperature range of 25° C. to 300° C. and is expressed in terms of "$\times10^7$/C" as an average over the temperature range.

The term "liquidus viscosity," as used herein, refers to the viscosity of the glass composition at the onset of devitrification (i.e., at the liquidus temperature as determined with the gradient furnace method according to ASTM C829-81).

The term "liquidus temperature," as used herein, refers to the temperature at which the glass composition begins to devitrify as determined with the gradient furnace method according to ASTM C829-81.

Surface compressive stress is measured with a surface stress meter (FSM) such as commercially available instruments such as the FSM-6000, manufactured by Orihara Industrial Co., Ltd. (Japan). Surface stress measurements rely upon the measurement of the stress optical coefficient (SOC), which is related to the birefringence of the glass article. SOC, in turn, is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM. The maximum central tension (CT) values are measured using a scattered light polariscope (SCALP) technique known in the art.

The term "depth of compression" (DOC), as used herein, refers to the position in the article where compressive stress transitions to tensile stress.

The term "CIELAB color space," as used herein, refers to a color space defined by the International Commission on Illumination (CIE) in 1976. It expresses color as three values: L* for the lightness from black (0) to white (100), a* from green (−) to red (+), and B* from blue (−) to yellow (+).

The term "color gamut," as used herein, refers to the pallet of colors that may be achieved by the colored glass articles within the CIELAB color space.

The "optical transmission spectra," as shown herein, were obtained using an Agilent Cary 60 spectrophotometer with a scan range of 250 nm to 800 nm, a scan step of 2 nm, a signal average of 0.5 s, and a spot size of 2 mm. The optical transmission data obtained were used to plot coordinates in the CIELAB color space as described in R. S. Berns, *Billmeyer and Saltzman's Principles of Color Technology*, 3rd. Ed., John Wiley & Sons, New York (2000).

Colorants have been added to conventional aluminosilicate glass compositions to achieve a colored glass article having a desired color and improved mechanical properties. For example, gold (Au) doped glass articles are red, orange, purple, or blue. However, simply including colorants in aluminosilicate glass compositions may not produce the desired color. For example, Au evaporates at temperatures greater than 1400° C. Conventional aluminosilicate glass compositions may have a melting point greater than 1500° C., which results in poor Au retention during processing. The low Au retention limits the color gamut that may be achieved and may, at most, result in a glass article having a faint red hue.

Disclosed herein are glass compositions and colored glass articles formed therefrom that mitigate the aforementioned problems such that Au may be added to aluminosilicate glass compositions to produce colored glass articles having the desired color while retaining the superior ion-exchangeability and drop performance of the colored glass articles. Specifically, the glass compositions disclosed herein improve Au retention by including MgO and/or ZnO. Increasing the retention of Au expands the color gamut that may be achieved by the resultant colored glass articles and helps lower the amount of Au needed to be batched, which significantly reduces batch costs. Moreover, the concentration of certain constituent components may be adjusted to achieve a desired color and to prevent formation of Au particles.

The glass compositions and colored glass articles described herein may be described as aluminoborosilicate glass compositions and colored glass articles and comprise $SiO_2$, $Al_2O_3$, and $B_2O_3$. In addition to $SiO_2$, $Al_2O_3$, and $B_2O_3$, the glass compositions and colored glass articles described herein include Au to produce colored glass articles having the desired color. The glass compositions and colored glass articles described herein also include alkali oxides, such as $Li_2O$ and $Na_2O$, to enable the ion-exchangeability of the colored glass articles. The glass compositions and colored glass articles described herein further include MgO and/or ZnO to improve Au retention and produce colored glass articles having the desired color. Additionally, the difference between $R_2O$ and $Al_2O_3$ (i.e. $R_2O$ (mol %)-$Al_2O_3$ (mol %)) in the glass compositions and resultant colored glass articles described herein may be adjusted to produce a desired observable color (e.g., pink, purple, red, orange, or blue). Furthermore, the viscosity of the glass composition may be adjusted to prevent devitrification of the glass composition and formation of Au particles before melting that may limit the color gamut that may be achieved.

$SiO_2$ is the primary glass former in the glass compositions described herein and may function to stabilize the network structure of the colored glass articles. The concentration of $SiO_2$ in the glass compositions and resultant colored glass articles should be sufficiently high (e.g., greater than or equal to 40 mol %) to enhance the chemical durability of the glass composition and, in particular, the resistance of the glass composition to degradation upon exposure to acidic solutions, basic solutions, and in water. The amount of $SiO_2$ may be limited (e.g., to less than or equal to 70 mol %) to control the melting point of the glass composition, as the melting point of pure $SiO_2$ or high $SiO_2$ glasses is undesirably high. Thus, limiting the concentration of $SiO_2$ may aid in improving the meltability and the formability of the resultant colored glass article.

In embodiments, the glass composition and the resultant colored glass article may comprise greater than or equal to 40 mol % and less than or equal to 70 mol % $SiO_2$. In embodiments, the glass composition and the resultant colored glass article may comprise greater than or equal to 45 mol % and less than or equal to 67 mol % $SiO_2$. In embodiments, the concentration of $SiO_2$ in the glass composition and the resultant colored glass article may be greater than or equal to 40 mol %, greater than or equal to 45 mol %, greater than or equal to 50 mol %, greater than or equal to 53 mol %, greater than or equal to 55 mol %, or even greater than or equal to 57 mol %. In embodiments, the concentration of $SiO_2$ in the glass composition and the colored resultant glass article may be less than or equal to 70 mol %, less than or equal to 67 mol %, less than or equal to 65 mol %, less than or equal to 63 mol %, less than or equal to 62 mol %, less than or equal to 61 mol %, or even less than or equal to 60 mol %. In embodiments, the concentration of $SiO_2$ in the glass composition and the resultant colored glass article may be greater than or equal to 40 mol % and less than or equal to 70 mol %, greater than or equal to 40 mol % and less than or equal to 67 mol %, greater than or equal to 40 mol % and less than or equal to 65 mol % greater than or equal to 40 mol % and less than or equal to 63 mol %, greater than or equal to 40 mol % and less than or equal to 62 mol %, greater than or equal to 40 mol % and less than or equal to 61 mol %, greater than or equal to 40 mol % and less than or equal to 60 mol %, greater than or equal to 45 mol % and less than or equal to 70 mol %, greater than or equal to 45 mol % and less than or equal to 67 mol %, greater than or equal to 45 mol % and less than or equal to 65 mol % greater than or equal to 45 mol % and less than or equal to 63 mol %, greater than or equal to 45 mol % and less than or equal to 62 mol %, greater than or equal to 45 mol % and less than or equal to 61 mol %, greater than or equal to 45 mol % and less than or equal to 60 mol %, greater than or equal to 50 mol % and less than or equal to 70 mol %, greater than or equal to 50 mol % and less than or equal to 67 mol %, greater than or equal to 50 mol % and less than or equal to 65 mol % greater than or equal to 50 mol % and less than or equal to 63 mol %, greater than or equal to 50 mol % and less than or equal to 62 mol %, greater than or equal to 50 mol % and less than or equal to 61 mol %, greater than or equal to 50 mol % and less than or equal to 60 mol %, greater than or equal to 53 mol % and less than or equal to 70 mol %, greater than or equal to 53 mol % and less than or equal to 67 mol %, greater than or equal to 53 mol % and less than or equal to 65 mol % greater than or equal to 53 mol % and less than or equal to 63 mol %, greater than or equal to 53 mol % and less than or equal to 62 mol %, greater than or equal to 53 mol % and less than or equal to 61 mol %, greater than or equal to 53 mol % and less than or equal to 60 mol %, greater than or equal to 55 mol % and less than or equal to 70 mol %, greater than or equal to 55 mol % and less than or equal to 67 mol %, greater than or equal to 55 mol % and less than or equal to 65 mol % greater than or equal to 55 mol % and less than or equal to 63 mol %, greater than or equal to 55 mol % and less than or equal to 62 mol %, greater than or equal to 55 mol % and less than or equal to 61 mol %, greater than or equal to 55 mol % and less than or equal to 60 mol %, greater than or equal to 57 mol % and less than or equal to 70 mol %, greater than or equal to 57 mol % and less than or equal to 67 mol %, greater than or equal to 57 mol % and less than or equal to 65 mol % greater than or equal to 57 mol % and less than or equal to 63 mol %, greater than or equal to 57 mol % and less than or equal to 62 mol %, greater than or equal to 57 mol % and less than or equal to 61 mol %, or even greater than or equal to 57 mol % and less than or equal to 60 mol %, or any and all sub-ranges formed from any of these endpoints.

Like $SiO_2$, $Al_2O_3$ may also stabilize the glass network and additionally provides improved mechanical properties and chemical durability to the glass composition and the resultant colored glass article. The amount of $Al_2O_3$ may also be tailored to control the viscosity of the glass composition. $Al_2O_3$ may be included such that the resultant glass composition has the desired fracture toughness (e.g., greater than or equal to 0.7 $MPa \cdot m^{1/2}$). However, if the amount of $Al_2O_3$ is too high (e.g., greater than 20 mol %), the viscosity of the melt may increase, thereby diminishing the formability of the colored glass article.

Accordingly, in embodiments, the glass composition and the resultant colored glass article may comprise greater than or equal to 8 mol % and less than or equal to 20 mol % $Al_2O_3$. In embodiments, the glass composition and the resultant colored glass article may comprise greater than or equal to 10 mol % and less than or equal to 18 mol % $Al_2O_3$. In embodiments, the concentration of $Al_2O_3$ in the glass composition and the resultant colored glass article may be greater than or equal to 8 mol %, greater than or equal to 10 mol %, greater than or equal to 12 mol %, greater than or equal to 12.5 mol %, greater than or equal to 13 mol %, greater than or equal to 13.5 mol %, or even greater than or equal to 14 mol %. In embodiments, the concentration of $Al_2O_3$ in the glass composition and the resultant colored glass article may be less than or equal to 20 mol %, less than or equal to 18 mol %, less than or equal to 17.5 mol %, or even less than or equal to 17 mol %. In embodiments, the concentration of $Al_2O_3$ in the glass composition and the resultant colored glass article may be greater than or equal to 8 mol % and less than or equal to 20 mol %, greater than or equal to 8 mol % and less than or equal to 18 mol % greater than or equal to 8 mol % and less than or equal to 17.5 mol %, greater than or equal to 8 mol % and less than or equal to 17 mol %, greater than or equal to 10 mol % and less than or equal to 20 mol %, greater than or equal to 10 mol % and less than or equal to 18 mol % greater than or equal to 10 mol % and less than or equal to 17.5 mol %, greater than or equal to 10 mol % and less than or equal to 17 mol %, greater than or equal to 12 mol % and less than or equal to 20 mol %, greater than or equal to 12 mol % and less than or equal to 18 mol % greater than or equal to 12 mol % and less than or equal to 17.5 mol %, greater than or equal to 12 mol % and less than or equal to 17 mol %, greater than or equal to 12.5 mol % and less than or equal to 20 mol %, greater than or equal to 12.5 mol % and less than or equal to 18 mol % greater than or equal to 12.5 mol % and less than or equal to 17.5 mol %, greater than or equal to 12.5 mol % and less than or equal to 17 mol %, greater than or equal to 13 mol % and less than or equal to 20 mol %, greater than or equal to 13 mol % and less than or equal to 18 mol % greater than or equal to 13 mol % and less than or equal to 17.5 mol %, greater than or equal to 13 mol % and less than or equal to 17 mol %, greater than or equal to 13.5 mol % and less than or equal to 20 mol %, greater than or equal to 13.5 mol % and less than or equal to 18 mol % greater than or equal to 13.5 mol % and less than or equal to 17.5 mol %, greater than or equal to 13.5 mol % and less than or equal to 17 mol %, greater than or equal to 14 mol % and less than or equal to 20 mol %, greater than or equal to 14 mol % and less than or equal to 18 mol % greater than or equal to 14 mol % and less than or equal to 17.5 mol %, or even greater than or equal to 14 mol % and less than or equal to 17 mol %, or any and all sub-ranges formed from any of these endpoints.

$B_2O_3$ decreases the melting point of the glass composition, which may help improve Au retention. $B_2O_3$ may also improve the damage resistance of the resultant colored glass article. In addition, $B_2O_3$ is added to reduce the formation of non-bridging oxygen, the presence of which may reduce fracture toughness. The concentration of $B_2O_3$ should be sufficiently high (e.g., greater than or equal to 1 mol %) to reduce the melting point of the glass composition, improve the formability, and increase the fracture toughness of the colored glass article. However, if $B_2O_3$ is too high (e.g., greater than 10 mol %), the annealing point and strain point may decrease, which increases stress relaxation and reduces the overall strength of the colored glass article.

In embodiments, the glass composition and the resultant colored glass article may comprise greater than or equal to 1 mol % and less than or equal to 10 mol % $B_2O_3$. In embodiments, the glass composition and the resultant colored glass article may comprise greater than or equal to 2 mol % and less than or equal to 8 mol % $B_2O_3$. In embodiments, the concentration of $B_2O_3$ in the glass composition and the resultant colored glass article may be greater than or equal to 1 mol %, greater than or equal to 2 mol %, greater than or equal to 3 mol %, greater than or equal to 4 mol %, greater than or equal to 4.5 mol %, greater than or equal to 5 mol %, or even greater than or equal to 5.5 mol %. In embodiments, the concentration of $B_2O_3$ in the glass composition and the resultant colored glass article may be less than or equal to 10 mol %, less than or equal to 9 mol %, less than or equal to 8 mol %, less than or equal to 7.5 mol %, less than or equal to 7 mol %, or even less than or equal to 6.5 mol %. In embodiments, the concentration of $B_2O_3$ in the glass composition and the resultant colored glass article may be greater than or equal to 1 mol % and less than or equal to 10 mol %, greater than or equal to 1 mol % and less than or equal to 9 mol %, greater than or equal to 1 mol % and less than or equal to 8 mol %, greater than or equal to 1 mol % and less than or equal to 7.5 mol %, greater than or equal to 1 mol % and less than or equal to 7 mol %, greater than or equal to 1 mol % and less than or equal to 6.5 mol %, greater than or equal to 2 mol % and less than or equal to 10 mol %, greater than or equal to 2 mol % and less than or equal to 9 mol %, greater than or equal to 2 mol % and less than or equal to 8 mol %, greater than or equal to 2 mol % and less than or equal to 7.5 mol %, greater than or equal to 2 mol % and less than or equal to 7 mol %, greater than or equal to 2 mol % and less than or equal to 6.5 mol %, greater than or equal to 3 mol % and less than or equal to 10 mol %, greater than or equal to 3 mol % and less than or equal to 9 mol %, greater than or equal to 3 mol % and less than or equal to 8 mol %, greater than or equal to 3 mol % and less than or equal to 7.5 mol %, greater than or equal to 3 mol % and less than or equal to 7 mol %, greater than or equal to 3 mol % and less than or equal to 6.5 mol %, greater than or equal to 4 mol % and less than or equal to 10 mol %, greater than or equal to 4 mol % and less than or equal to 9 mol %, greater than or equal to 4 mol % and less than or equal to 8 mol %, greater than or equal to 4 mol % and less than or equal to 7.5 mol %, greater than or equal to 4 mol % and less than or equal to 7 mol %, greater than or equal to 4 mol % and less than or equal to 6.5 mol %, greater than or equal to 4.5 mol % and less than or equal to 10 mol %, greater than or equal to 4.5 mol % and less than or equal to 9 mol %, greater than or equal to 4.5 mol % and less than or equal to 8 mol %, greater than or equal to 4.5 mol % and less than or equal to 7.5 mol %, greater than or equal to 4.5 mol % and less than or equal to 7 mol %, greater than or equal to 4.5 mol % and less than or equal to 6.5 mol %, greater than or equal to 5 mol % and less than or equal to 10 mol %, greater than or equal to 5 mol % and less than or equal to 9 mol %, greater than or equal to 5 mol % and less than or equal to 8 mol %, greater than or equal to 5 mol % and less than or equal to 7.5 mol %, greater than or equal to 5 mol % and less than or equal to 7 mol %, greater than or equal to 5 mol % and less than or equal to 6.5 mol %, greater than or equal to 5.5 mol % and less than or equal to 10 mol %, greater than or equal to 5.5 mol % and less than or equal to 9 mol %, greater than or equal to 5.5 mol % and less than or equal to 8 mol %, greater than or equal to 5.5 mol % and less than or equal to 7.5 mol %, greater than or equal to 5.5 mol % and less than or equal to 7 mol %, or even greater than or equal to 5.5 mol % and less than or equal to 6.5 mol %, or any and all sub-ranges formed from any of these endpoints.

As described hereinabove, the glass compositions and the resultant colored glass articles may contain alkali oxides, such as $Li_2O$ and $Na_2O$, to enable the ion-exchangeability of the colored glass articles.

$Li_2O$ aids in the ion-exchangeability of the colored glass article and also reduces the softening point of the glass composition, thereby increasing the formability of the colored glass articles. In addition, $Li_2O$ decreases the melting point of the glass composition, which may help improve Au retention. The concentration of $Li_2O$ in the glass compositions and resultant colored glass articles should be sufficiently high (e.g., greater than or equal to 1 mol %) to reduce the melting point of the glass composition and achieve the desired maximum central tension (e.g., greater than or equal to 40 MPa). However, if the amount of $Li_2O$ is too high (e.g., greater than 20 mol %), the liquidus temperature may increase, thereby diminishing the manufacturability of the colored glass article.

In embodiments, the glass composition and the resultant colored glass article may comprise greater than or equal to 1 mol % and less than or equal to 20 mol % $Li_2O$. In embodiments, the glass composition and the resultant colored glass article may comprise greater than or equal to 3 mol % and less than or equal to 17 mol % $Li_2O$. In embodiments, the concentration of $Li_2O$ in the glass composition and the resultant colored glass article may be greater than or equal to 1 mol %, greater than or equal to 3 mol %, greater than or equal to 5 mol %, greater than or equal to 7 mol %, greater than or equal to 7.5 mol %, greater than or equal to 8 mol %, greater than or equal to 8.5 mol %, or even greater than or equal to 9 mol %. In embodiments, the concentration of $Li_2O$ in the glass composition and the resultant colored glass article may be less than or equal to 20 mol %, less than or equal to 17 mol %, less than or equal to 15 mol %, less than or equal to 13 mol %, less than or equal to 12.5 mol %, less than or equal to 12 mol %, less than or equal to 11.5 mol %, or even less than or equal to 11 mol %. In embodiments, the concentration of $Li_2O$ in the glass composition and the resultant colored glass article may be greater than or equal to 1 mol % and less than or equal to 20 mol %, greater than or equal to 1 mol % and less than or equal to 17 mol %, greater than or equal to 1 mol % and less than or equal to 15 mol %, greater than or equal to 1 mol % and less than or equal to 13 mol %, greater than or equal to 1 mol % and less than or equal to 12.5 mol %, greater than or equal to 1 mol % and less than or equal to 12 mol %, greater than or equal to 1 mol % and less than or equal 11.5 mol %, greater than or equal to 1 mol % and less than or equal to 11 mol %, greater than or equal to 3 mol % and less than or equal to 20 mol %, greater than or equal to 3 mol % and less than or equal to 17 mol %, greater than or equal to 3 mol % and less than or equal to 15 mol %, greater than or equal to 3 mol % and less than or equal to 13 mol %, greater than or equal to 3 mol % and less than or equal to 12.5 mol %, greater than or equal to 3 mol % and less than or equal to 12 mol %, greater than or equal to 3 mol % and less than or equal 11.5 mol %, greater than or equal to 3 mol % and less than or equal to 11 mol %, greater than or equal to 5 mol % and less than or equal to 20 mol %, greater than or equal to 5 mol % and less than or equal to 17 mol %, greater than or equal to 5 mol % and less than or equal to 15 mol %, greater than or equal to 5 mol % and less than or equal to 13 mol %, greater than or equal to 5 mol % and less than or equal to 12.5 mol %, greater than or equal to 5 mol % and less than or equal to 12 mol %, greater than or equal to 5 mol % and less than or equal 11.5 mol %, greater than or equal to 5 mol % and less than or equal to 11 mol %, greater than or equal to 7 mol % and less than or equal to 20 mol %, greater than or equal to 7 mol % and less than or equal to 17 mol %, greater than or equal to 7 mol % and less than or equal to 15 mol %, greater than or equal to 7 mol % and less than or equal to 13 mol %, greater than or equal to 7 mol % and less than or equal to 12.5 mol %, greater than or equal to 7 mol % and less than or equal to 12 mol %, greater than or equal to 7 mol % and less than or equal 11.5 mol %, greater than or equal to 7 mol % and less than or equal to 11 mol %, greater than or equal to 7.5 mol % and less than or equal to 20 mol %, greater than or equal to 7.5 mol % and less than or equal to 17 mol %, greater than or equal to 7.5 mol % and less than or equal to 15 mol %, greater than or equal to 7.5 mol % and less than or equal to 13 mol %, greater than or equal to 7.5 mol % and less than or equal to 12.5 mol %, greater than or equal to 7.5 mol % and less than or equal to 12 mol %, greater than or equal to 7.5 mol % and less than or equal 11.5 mol %, greater than or equal to 7.5 mol % and less than or equal to 11 mol %, greater than or equal to 8 mol % and less than or equal to 20 mol %, greater than or equal to 8 mol % and less than or equal to 17 mol %, greater than or equal to 8 mol % and less than or equal to 15 mol %, greater than or equal to 8 mol % and less than or equal to 13 mol %, greater than or equal to 8 mol % and less than or equal to 12.5 mol %, greater than or equal to 8 mol % and less than or equal to 12 mol %, greater than or equal to 8 mol % and less than or equal 11.5 mol %, greater than or equal to 8 mol % and less than or equal to 11 mol %, greater than or equal to 8.5 mol % and less than or equal to 20 mol %, greater than or equal to 8.5 mol % and less than or equal to 17 mol %, greater than or equal to 8.5 mol % and less than or equal to 15 mol %, greater than or equal to 8.5 mol % and less than or equal to 13 mol %, greater than or equal to 8.5 mol % and less than or equal to 12.5 mol %, greater than or equal to 8.5 mol % and less than or equal to 12 mol %, greater than or equal to 8.5 mol % and less than or equal 11.5 mol %, greater than or equal to 8.5 mol % and less than or equal to 11 mol %, greater than or equal to 9 mol % and less than or equal to 20 mol %, greater than or equal to 9 mol % and less than or equal to 17 mol %, greater than or equal to 9 mol % and less than or equal to 15 mol %, greater than or equal to 9 mol % and less than or equal to 13 mol %, greater than or equal to 9 mol % and less than or equal to 12.5 mol %, greater than or equal to 9 mol % and less than or equal to 12 mol %, greater than or equal to 9 mol % and less than or equal 11.5 mol %, or even greater than or equal to 9 mol % and less than or equal to 11 mol %, or any and all sub-ranges formed from any of these endpoints.

Na$_2$O improves diffusivity of alkali ions in the glass and thereby reduces ion-exchange time and helps achieve the desired surface compressive stress (e.g., greater than or equal to 300 MPa). Na$_2$O also improves formability of the colored glass article. In addition, Na$_2$O decreases the melting point of the glass composition, which may help improve Au retention. However, if too much Na$_2$O is added to the glass composition, the melting point may be too low. As such, in embodiments, the concentration of Li$_2$O present in the glass composition and the resultant colored glass article may be greater than the concentration of Na$_2$O present in the glass composition and the resultant colored glass article.

In embodiments, the glass composition and the resultant colored glass article may comprise greater than or equal to 1 mol % and less than or equal to 15 mol % Na$_2$O. In embodiments, the glass composition and the resultant colored glass article may comprise greater than or equal to 2 mol % and less than or equal to 10 mol % Na$_2$O. In embodiments, the concentration of Na$_2$O in the glass composition and the resultant colored glass article may be greater than or equal to 1 mol %, greater than or equal to 2 mol %, greater than or equal to 3 mol %, greater than or equal to 3.5 mol %, greater than or equal to 4 mol %, or even greater than or equal to 4.5 mol %. In embodiments, the concentration of Na$_2$O in the glass composition and the resultant colored glass article may be less than or equal to 15 mol %, less than or equal to 10 mol %, less than or equal to 8 mol %, less than or equal to 7.5 mol %, less than or equal to less than or equal to 7 mol %, less than or equal to 6.5 mol %, less than or equal to 6 mol %, or even less than or equal to 5.5 mol %. In embodiments, the concentration of Na$_2$O in the glass composition and the resultant colored glass article may be greater than or equal to 1 mol % and less than or equal to 15 mol %, greater than or equal to 1 and less than or equal to 10 mol %, greater than or equal to 1 mol % and less than or equal to 8 mol %, greater than or equal to 1 mol % and less than or equal to 7.5 mol %, greater than or equal to 1 mol % and less than or equal to 7 mol %, greater than or equal to 1 mol % and less than or equal to 6.5 mol %, greater than or equal to 1 mol % and less than or equal to 6 mol %, greater than or equal to 1 mol % and less than or equal to 5.5 mol %, greater than or equal to 2 mol % and less than or equal to 15 mol %, greater than or equal to 2 and less than or equal to 10 mol %, greater than or equal to 2 mol % and less than or equal to 8 mol %, greater than or equal to 2 mol % and less than or equal to 7.5 mol %, greater than or equal to 2 mol % and less than or equal to 7 mol %, greater than or equal to 2 mol % and less than or equal to 6.5 mol %, greater than or equal to 2 mol % and less than or equal to 6 mol %, greater than or equal to 2 mol % and less than or equal to 5.5 mol %, greater than or equal to 3 mol % and less than or equal to 15 mol %, greater than or equal to 3 and less than or equal to 10 mol %, greater than or equal to 3 mol % and less than or equal to 8 mol %, greater than or equal to 3 mol % and less than or equal to 7.5 mol %, greater than or equal to 3 mol % and less than or equal to 7 mol %, greater than or equal to 3 mol % and less than or equal to 6.5 mol %, greater than or equal to 3 mol % and less than or equal to 6 mol %, greater than or equal to 3 mol % and less than or equal to 5.5 mol %, greater than or equal to 3.5 mol % and less than or equal to 15 mol %, greater than or equal to 3.5 and less than or equal to 10 mol %, greater than or equal to 3.5 mol % and less than or equal to 8 mol %, greater than or equal to 3.5 mol % and less than or equal to 7.5 mol %, greater than or equal to 3.5 mol % and less than or equal to 7 mol %, greater than or equal to 3.5 mol % and less than or equal to 6.5 mol %, greater than or equal to 3.5 mol % and less than or equal to 6 mol %, greater than or equal to 3.5 mol % and less than or equal to 5.5 mol %, greater than or equal to 4 mol % and less than or equal to 15 mol %, greater than or equal to 4 and less than or equal to 10 mol %, greater than or equal to 4 mol % and less than or equal to 8 mol %, greater than or equal to 4 mol % and less than or equal to 7.5 mol %, greater than or equal to 4 mol % and less than or equal to 7 mol %, greater than or equal to 4 mol % and less than or equal to 6.5 mol %, greater than or equal to 4 mol % and less than or equal to 6 mol %, greater than or equal to 4 mol % and less than or equal to 5.5 mol %, greater than or equal to 4.5 mol % and less than or equal to 15 mol %, greater than or equal to 4.5 and less than or equal to 10 mol %, greater than or equal to 4.5 mol % and less than or equal to 8 mol %, greater than or equal to 4.5 mol % and less than or equal to 7.5 mol %, greater than or equal to 4.5 mol % and less than or equal to 7 mol %, greater than or equal to 4.5 mol % and less than or equal to 6.5 mol %, greater than or equal to 4.5 mol % and less than or equal to 6 mol %, or even greater than or equal to 4.5 mol % and less than or equal to 5.5 mol %, or any and all sub-ranges formed from any of these endpoints.

The glass compositions and the resultant colored glass articles described herein may optionally further comprise alkali metal oxides other than $Li_2O$ and $Na_2O$, such as $K_2O$. $K_2O$, when included, promotes ion-exchange and may increase the depth of compression and decrease the melting point to improve the formability of the colored glass article. However, adding too much $K_2O$ may cause the surface compressive stress and melting point to be too low. Accordingly, in embodiments, the amount of $K_2O$ added to the glass composition may be limited.

In embodiments, the glass composition and the resultant colored glass article may optionally comprise greater than or equal to 0.1 mol % and less than or equal to 1 mol % $K_2O$. In embodiments, the concentration of $K_2O$ in the glass composition and the resultant colored glass article may be greater than or equal to 0 mol %, greater than or equal to 0.1 mol %, or even greater than or equal to 0.2 mol %. In embodiments, the concentration of $K_2O$ in the glass composition and the resultant colored glass article may be less than or equal to 1 mol %, less than or equal to 0.5 mol %, or even less than or equal to 0.5 mol %. In embodiments, the concentration of $K_2O$ in the glass composition and the resultant colored glass article may be greater than or equal to 0 mol % and less than or equal to 1 mol %, greater than or equal to 0 mol % and less than or equal to 0.7 mol %, greater than or equal to 0 mol % and less than or equal to 0.5 mol %, greater than or equal to 0.1 mol % and less than or equal to 1 mol %, greater than or equal to 0.1 mol % and less than or equal to 0.7 mol %, greater than or equal to 0.1 mol % and less than or equal to 0.5 mol %, greater than or equal to 0.2 mol % and less than or equal to 1 mol %, greater than or equal to 0.2 mol % and less than or equal to 0.7 mol %, or even greater than or equal to 0.2 mol % and less than or equal to 0.5 mol %, or any and all sub-ranges formed from any of these endpoints. In embodiments, the glass composition and the resultant colored glass article may be substantially free or free of $K_2O$.

The sum of all alkali oxides is expressed herein as $R_2O$. Specifically, $R_2O$ is the sum (in mol %) of $Li_2O$, $Na_2O$, and $K_2O$ present in the glass composition and the resultant colored glass article (i.e., $R_2O=Li_2O$ (mol %)+$Na_2O$ (mol %)+$K_2O$ (mol %). Like $B_2O_3$, the alkali oxides aid in decreasing the softening point and molding temperature of the glass composition, thereby offsetting the increase in the softening point and molding temperature of the glass composition due to higher amounts of $SiO_2$ in the glass composition, for example. The softening point and molding temperature may be further reduced by including combinations of alkali oxides (e.g., two or more alkali oxides) in the glass composition, a phenomenon referred to as the "mixed alkali effect." However, it has been found that if the amount of alkali oxide is too high, the average coefficient of thermal expansion of the glass composition increases to greater than $100\times10^7/°$ C., which may be undesirable.

In embodiments, the concentration of $R_2O$ in the glass composition and the resultant colored glass article may be greater than or equal to 2 mol % and less than or equal to 35 mol %. In embodiments, the concentration of $R_2O$ in the glass composition and the resultant colored glass article may be greater than or equal to 2 mol %, greater than or equal to 4 mol %, greater than 6 mol %, greater than or equal to 8 mol %, greater than or equal to 10 mol %, greater than or equal to 12 mol %, or even greater than or equal to 14 mol %. In embodiments, the concentration of $R_2O$ in the glass composition and the resultant colored glass article may be less than or equal to 35 mol %, less than or equal to 30 mol %, less than or equal to 25 mol %, less than or equal to 20 mol %, less than or equal to 19 mol %, less than or equal to 18 mol %, less than or equal to 17 mol %, or even less than or equal to 16 mol %. In embodiments, the concentration of $R_2O$ in the glass composition and the resultant colored glass article may be greater than or equal to 2 mol % and less than or equal to 35 mol %, greater than or equal to 2 mol % and less than or equal to 30 mol %, greater than or equal to 2 mol % and less than or equal to 25 mol %, greater than or equal to 2 mol % and less than or equal to 20 mol %, greater than or equal to 2 mol % and less than or equal to 19 mol %, greater than or equal to 2 mol % and less than or equal to 18 mol %, greater than or equal to 2 mol % and less than or equal to 17 mol %, greater than or equal to 2 mol % and less than or equal to 16 mol %, greater than or equal to 4 mol % and less than or equal to 35 mol %, greater than or equal to 4 mol % and less than or equal to 30 mol %, greater than or equal to 4 mol % and less than or equal to 25 mol %, greater than or equal to 4 mol % and less than or equal to 20 mol %, greater than or equal to 4 mol % and less than or equal to 19 mol %, greater than or equal to 4 mol % and less than or equal to 18 mol %, greater than or equal to 4 mol % and less than or equal to 17 mol %, greater than or equal to 4 mol % and less than or equal to 16 mol %, greater than or equal to 6 mol % and less than or equal to 35 mol %, greater than or equal to 6 mol % and less than or equal to 30 mol %, greater than or equal to 6 mol % and less than or equal to 25 mol %, greater than or equal to 6 mol % and less than or equal to 20 mol %, greater than or equal to 6 mol % and less than or equal to 19 mol %, greater than or equal to 6 mol % and less than or equal to 18 mol %, greater than or equal to 6 mol % and less than or equal to 17 mol %, greater than or equal to 6 mol % and less than or equal to 16 mol %, greater than or equal to 8 mol % and less than or equal to 35 mol %, greater than or equal to 8 mol % and less than or equal to 30 mol %, greater than or equal to 8 mol % and less than or equal to 25 mol %, greater than or equal to 8 mol % and less than or equal to 20 mol %, greater than or equal to 8 mol % and less than or equal to 19 mol %, greater than or equal to 8 mol % and less than or equal to 18 mol %, greater than or equal to 8 mol % and less than or equal to 17 mol %, greater than or equal to 8 mol % and less than or equal to 16 mol %, greater than or equal to 10 mol % and less than or equal to 35 mol %, greater than or equal to 10 mol % and less than or equal to 30 mol %, greater than or equal to 10 mol % and less than or equal to 25 mol %, greater than or equal to 10 mol % and less than or equal to 20 mol %, greater than or equal to 10 mol % and less than or equal to 19 mol %, greater than or equal to 10 mol % and less than or equal to 18 mol %, greater than or equal to 10 mol % and less than or equal to 17 mol %, greater than or equal to 10 mol % and less than or equal to 16 mol %, greater than or equal to 12 mol % and less than or equal to 35 mol %, greater than or equal to 12 mol % and less than or equal to 30 mol %, greater than or equal to 12 mol % and less than or equal to 25 mol %, greater than or equal to 12 mol % and less than or equal to 20 mol %, greater than or equal to 12 mol % and less than or equal to 19 mol %, greater than or equal to 12 mol % and less than or equal to 18 mol %, greater than or equal to 12 mol % and less than or equal to 17 mol %, greater than or equal to 12 mol % and less than or equal to 16 mol %, greater than or equal to 14 mol % and less than or equal to 35 mol %, greater than or equal to 14 mol % and less than or equal to 30 mol %, greater than or equal to 14 mol % and less than or equal to 25 mol %, greater than or equal to 14 mol % and less than or equal to 20 mol %, greater than or equal to 14 mol % and less than or equal to 19 mol %, greater than or equal to 14 mol % and less than or equal to 18 mol %, greater than or equal to 14 mol % and less than or equal to 17 mol %, or even greater than or equal to 14 mol % and less than or equal to 16 mol %, or any and all sub-ranges formed from any of these endpoints.

In embodiments, the difference between $R_2O$ and $Al_2O_3$ (i.e. $R_2O$ (mol %)-$Al_2O_3$ (mol %)) in the glass composition may be adjusted to produce a desired observable color (e.g., pink, purple, red, orange, or blue). Along with the temperature and time of the heat treatment, the analyzed $R_2O$—$Al_2O_3$ of the resultant colored glass article may correlate with the observable color of the colored glass article after heat treatment. In embodiments, $R_2O$—$Al_2O_3$ in the glass composition and the resultant colored glass article may be greater than or equal to −3 mol % and less than or equal to 2 mol %. In embodiments, $R_2O$—$Al_2O_3$ in the glass composition and the resultant colored glass article may be greater than or equal to −3 mol %, greater than or equal to −2.5, greater than or equal to −2, or even greater than or equal to −1.5. In embodiments, $R_2O$—$Al_2O_3$ in the glass composition and the resultant colored glass article may be less than or equal to 2 mol %, less than or equal to 1.5 mol %, less than or equal to 1 mol %, or even less than or equal to 0.5 mol %. In embodiments, $R_2O$—$Al_2O_3$ in the glass composition and the resultant colored glass article may be greater than or equal to −3 mol % and less than or equal to 2 mol %, greater than or equal to −3 mol % and less than or equal to 1.5 mol %, greater than or equal to −3 mol % and less than or equal to 1 mol %, greater than or equal to −3 mol % and less than or equal to 0.5 mol %, greater than or equal to −2.5 mol % and less than or equal to 2 mol %, greater than or equal to −2.5 mol % and less than or equal to 1.5 mol %, greater than or equal to −2.5 mol % and less than or equal to 1 mol %, greater than or equal to −2.5 mol % and less than or equal to 0.5 mol %, greater than or equal to −2 mol % and less than or equal to 2 mol %, greater than or equal to −2 mol % and less than or equal to 1.5 mol %, greater than or equal to −2 mol % and less than or equal to 1 mol %, greater than or equal to −2 mol % and less than or equal to 0.5 mol %, greater than or equal to −1.5 mol % and less than or equal to 2 mol %, greater than or equal to −1.5 mol % and less than or equal to 1.5 mol %, greater than or equal to −1.5 mol % and less than or equal to 1 mol %, or even greater than or equal to −1.5 mol % and less than or equal to 0.5 mol %, or any and all sub-ranges formed from any of these endpoints.

The glass compositions and the resultant colored glass articles described herein further include MgO and/or ZnO to improve Au retention by lowering the melting point of the glass composition. Decreasing the melting point of the glass composition may help improve Au retention because the glass compositions may be melted at relatively lower temperatures and Au evaporation may be reduced. While not wishing to be bound by theory, it is also believed that partially replacing $Li_2O$ and/or $Na_2O$ with MgO and/or ZnO may also help improve Au retention. Specifically, $Li_2O$ and/or $Na_2O$ is included in the batch glass composition as lithium carbonate and sodium carbonate, respectively. Upon melting the glass composition, carbonate gas is released from the glass composition. Au escapes from the glass composition within the carbonate gas. Therefore, the improved Au retention may be due to the reduced amount of carbonate.

Accordingly, in embodiments, the sum (in mol %) of MgO and ZnO present in the glass composition and the resultant colored glass article (i.e., MgO (mol %)+ZnO (mol %)) may be greater than or equal to 0.1 mol % and less than or equal to 6 mol %. In embodiments, the sum of MgO and ZnO in the glass composition and the resultant colored glass article may be greater than or equal to 0.5 mol % and less than or equal to 5.5 mol %. In embodiments, the sum of MgO and ZnO in the glass composition and the resultant colored glass article may be greater than or equal to 0.1 mol %, greater than or equal to 0.5 mol %, greater than or equal to 1 mol %, greater than or equal to 1.5 mol %, greater than or equal to 2 mol %, greater than or equal to 2.5 mol %, greater than or equal to 3 mol %, or even greater than or equal to 3.5 mol %. In embodiments, the sum of MgO and ZnO in the glass composition and the resultant colored glass article may be less than or equal to 6 mol %, less than or equal to 5.5 mol %, less than or equal to 5 mol %, or even less than or equal to 4.5 mol %. In embodiments, the sum of MgO and ZnO in the glass composition and the resultant colored glass article may be greater than or equal to 0.1 mol % and less than or equal to 6 mol %, greater than or equal to 0.1 mol % and less than or equal to 5.5 mol %, greater than or equal to 0.1 mol % and less than or equal to 5 mol %, greater than or equal to 0.1 mol % and less than or equal to 4.5 mol %, greater than or equal to 0.5 mol % and less than or equal to 6 mol %, greater than or equal to 0.5 mol % and less than or equal to 5.5 mol %, greater than or equal to 0.5 mol % and less than or equal to 5 mol %, greater than or equal to 0.5 mol % and less than or equal to 4.5 mol %, greater than or equal to 1 mol % and less than or equal to 6 mol %, greater than or equal to 1 mol % and less than or equal to 5.5 mol %, greater than or equal to 1 mol % and less than or equal to 5 mol %, greater than or equal to 1 mol % and less than or equal to 4.5 mol %, greater than or equal to 1.5 mol % and less than or equal to 6 mol %, greater than or equal to 1.5 mol % and less than or equal to 5.5 mol %, greater than or equal to 1.5 mol % and less than or equal to 5 mol %, greater than or equal to 1.5 mol % and less than or equal to 4.5 mol %, greater than or equal to 2 mol % and less than or equal to 6 mol %, greater than or equal to 2 mol % and less than or equal to 5.5 mol %, greater than or equal to 2 mol % and less than or equal to 5 mol %, greater than or equal to 2 mol % and less than or equal to 4.5 mol %, greater than or equal to 2.5 mol % and less than or equal to 6 mol %, greater than or equal to 2.5 mol % and less than or equal to 5.5 mol %, greater than or equal to 2.5 mol % and less than or equal to 5 mol %, greater than or equal to 2.5 mol % and less than or equal to 4.5 mol %, greater than or equal to 3 mol % and less than or equal to 6 mol %, greater than or equal to 3 mol % and less than or equal to 5.5 mol %, greater than or equal to 3 mol % and less than or equal to 5 mol %, greater than or equal to 3 mol % and less than or equal to 4.5 mol %, greater than or equal to 3.5 mol % and less than or equal to 6 mol %, greater than or equal to 3.5 mol % and less than or equal to 5.5 mol %, greater than or equal to 3.5 mol % and less than or equal to 5 mol %, or even greater than or equal to 3.5 mol % and less than or equal to 4.5 mol %, or any and all sub-ranges formed from any of these endpoints.

In addition to improving Au retention, MgO lowers the viscosity of the glass compositions, which enhances the formability, the strain point, and the Young's modulus, and may improve ion-exchangeability. However, when too much MgO is added to the glass composition, the diffusivity of sodium and potassium ions in the glass composition decreases which, in turn, adversely impacts the ion-exchange performance (i.e., the ability to ion-exchange) of the resultant colored glass article.

In embodiments, the glass composition and the resultant colored glass article may comprise greater than or equal to 0 mol % and less than or equal to 8 mol % MgO. In embodiments, the glass composition and the resultant colored glass article may comprise greater than or equal to 0.5 mol % and less than or equal to 7 mol % MgO. In embodiments, the concentration of MgO in the glass composition may be greater than or equal to 0 mol %, greater than or equal to 0.5 mol %, greater than or equal to 1 mol %, greater than or equal to 1.5 mol %, greater than or equal to 2 mol %, or even greater than or equal to 2.5 mol %. In embodiments, the concentration of MgO in the glass composition may be less than or equal to 8 mol %, less than or equal to 7 mol %, less than or equal to 6 mol %, less than or equal to 5.5 mol %, less than or equal to 5 mol %, less than or equal to 4.5 mol %, less than or equal to 4 mol %, or even less than or equal to 3.5 mol %. In embodiments, the concentration of MgO in the glass composition may be greater than or equal to 0 mol % and less than or equal to 8 mol %, greater than or equal to 0 mol % and less than or equal to 7 mol %, greater than or equal to 0 mol % and less than or equal to 6 mol %, greater than or equal to 0 mol % and less than or equal to 5.5 mol %, greater than or equal to 0 mol % and less than or equal to 5 mol %, greater than or equal to 0 mol % and less than or equal to 4.5 mol %, greater than or equal to 0 mol % and less than or equal to 4 mol %, greater than or equal to 0 mol % and less than or equal to 3.5 mol %, greater than or equal to 0.5 mol % and less than or equal to 8 mol %, greater than or equal to 0.5 mol % and less than or equal to 7 mol %, greater than or equal to 0.5 mol % and less than or equal to 6 mol %, greater than or equal to 0.5 mol % and less than or equal to 5.5 mol %, greater than or equal to 0.5 mol % and less than or equal to 5 mol %, greater than or equal to 0.5 mol % and less than or equal to 4.5 mol %, greater than or equal to 0.5 mol % and less than or equal to 4 mol %, greater than or equal to 0.5 mol % and less than or equal to 3.5 mol %, greater than or equal to 1 mol % and less than or equal to 8 mol %, greater than or equal to 1 mol % and less than or equal to 7 mol %, greater than or equal to 1 mol % and less than or equal to 6 mol %, greater than or equal to 1 mol % and less than or equal to 5.5 mol %, greater than or equal to 1 mol % and less than or equal to 5 mol %, greater than or equal to 1 mol % and less than or equal to 4.5 mol %, greater than or equal to 1 mol % and less than or equal to 4 mol %, greater than or equal to 1 mol % and less than or equal to 3.5 mol %, greater than or equal to 1.5 mol % and less than or equal to 8 mol %, greater than or equal to 1.5 mol % and less than or equal to 7 mol %, greater than or equal to 1.5 mol % and less than or equal to 6 mol %, greater than or equal to 1.5 mol % and less than or equal to 5.5 mol %, greater than or equal to 1.5 mol % and less than or equal to 5 mol %, greater than or equal to 1.5 mol % and less than or equal to 4.5 mol %, greater than or equal to 1.5 mol % and less than or equal to 4 mol %, greater than or equal to 1.5 mol % and less than or equal to 3.5 mol %, greater than or equal to 2 mol % and less than or equal to 8 mol %, greater than or equal to 2 mol % and less than or equal to 7 mol %, greater than or equal to 2 mol % and less than or equal to 6 mol %, greater than or equal to 2 mol % and less than or equal to 5.5 mol %, greater than or equal to 2 mol % and less than or equal to 5 mol %, greater than or equal to 2 mol % and less than or equal to 4.5 mol %, greater than or equal to 2 mol % and less than or equal to 4 mol %, greater than or equal to 2 mol % and less than or equal to 3.5 mol %, greater than or equal to 0 mol % and less than or equal to 8 mol %, greater than or equal to 2.5 mol % and less than or equal to 7 mol %, greater than or equal to 2.5 mol % and less than or equal to 6 mol %, greater than or equal to 2.5 mol % and less than or equal to 5.5 mol %, greater than or equal to 2.5 mol % and less than or equal to 5 mol %, greater than or equal to 2.5 mol % and less than or equal to 4.5 mol %, greater than or equal to 2.5 mol % and less than or equal to 4 mol %, or even greater than or equal to 2.5 mol % and less than or equal to 3.5 mol %, or any and all sub-ranges formed from any of these endpoints. In embodiments, the glass composition and the resultant colored glass article may be substantially free or free of MgO.

In embodiments, the glass composition and the resultant colored glass article may comprise greater than or equal to 0 mol % and less than or equal to 6 mol % MgO. In embodiments, the glass composition and the resultant colored glass article may comprise greater than or equal to 0.1 mol % and less than or equal to 5 mol % MgO. In embodiments, the concentration of MgO in the glass composition may be greater than or equal to 0 mol %, greater than or equal to 0.1 mol %, or even greater than or equal to 0.5 mol %. In embodiments, the concentration of MgO in the glass composition may be less than or equal to 6 mol %, less than or equal to 5 mol %, less than or equal to 4 mol %, less than or equal to 3 mol %, less than or equal to 2 mol %, or even less than or equal to 1 mol %. In embodiments, the concentration of MgO in the glass composition may be greater than or equal to 0 mol % and less than or equal to 6 mol %, greater than or equal to 0 mol % and less than or equal to 5 mol %, greater than or equal to 0 mol % and less than or equal to 4 mol %, greater than or equal to 0 mol % and less than or equal to 3 mol %, greater than or equal to 0 mol % and less than or equal to 2 mol %, greater than or equal to 0 mol % and less than or equal to 1 mol %, greater than or equal to 0.1 mol % and less than or equal to 6 mol %, greater than or equal to 0.1 mol % and less than or equal to 5 mol %, greater than or equal to 0.1 mol % and less than or equal to 4 mol %, greater than or equal to 0.1 mol % and less than or equal to 3 mol %, greater than or equal to 0.1 mol % and less than or equal to 2 mol %, greater than or equal to 0.1 mol % and less than or equal to 1 mol %, greater than or equal to 0.5 mol % and less than or equal to 6 mol %, greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 0.5 mol % and less than or equal to 2 mol %, or even greater than or equal to 0.5 mol % and less than or equal to 1 mol %, or any and all sub-ranges formed from any of these endpoints. In embodiments, the glass composition and the resultant colored glass article may be substantially free or free of MgO.

In addition to improving Au retention, ZnO lowers the viscosity of the glass compositions, which enhances the formability, the strain point, and the Young's modulus, and may improve ion-exchangeability. However, when too much ZnO is added to the glass composition, the diffusivity of sodium and potassium ions in the glass composition decreases which, in turn, adversely impacts the ion-exchange performance (i.e., the ability to ion-exchange) of the resultant colored glass article.

In embodiments, the glass composition and the resultant colored glass article may comprise greater than or equal to 0 mol % and less than or equal to 5 mol % ZnO. In embodiments, the glass composition and the resultant colored glass article may comprise greater than or equal to 0.1 mol % and less than or equal to 4 mol % ZnO. In embodiments, the concentration of ZnO in the glass composition may be greater than or equal to 0 mol %, greater than or equal to 0.1 mol %, greater than or equal to 0.25 mol %, greater than or equal to 0.5 mol %, or even greater than or equal to 0.75 mol %. In embodiments, the concentration of ZnO in the glass composition may be less than or equal to 5 mol %, less than or equal to 4 mol %, less than or equal to 3 mol %, less than or equal to 2.5 mol %, less than or equal to 2 mol %, less than or equal to 1.75 mol %, less than or equal to 1.5 mol %, or even less than or equal to 1.25 mol %. In embodiments, the concentration of ZnO in the glass composition may be greater than or equal to 0 mol % and less than or equal to 5 mol %, greater than or equal to 0 mol % and less than or equal to 4 mol %, greater than or equal to 0 mol % and less than or equal to 3 mol %, greater than or equal to 0 mol % and less than or equal to 2.5 mol %, greater than or equal to 0 mol % and less than or equal to 2 mol %, greater than or equal to 0 mol % and less than or equal to 1.75 mol %, greater than or equal to 0 mol % and less than or equal to 1.5 mol %, greater than or equal to 0 mol % and less than or equal to 1.25 mol %, greater than or equal to 0.1 mol % and less than or equal to 5 mol %, greater than or equal to 0.1 mol % and less than or equal to 4 mol %, greater than or equal to 0.1 mol % and less than or equal to 3 mol %, greater than or equal to 0.1 mol % and less than or equal to 2.5 mol %, greater than or equal to 0.1 mol % and less than or equal to 2 mol %, greater than or equal to 0.1 mol % and less than or equal to 1.75 mol %, greater than or equal to 0.1 mol % and less than or equal to 1.5 mol %, greater than or equal to 0.1 mol % and less than or equal to 1.25 mol %, greater than or equal to 0.25 mol % and less than or equal to 5 mol %, greater than or equal to 0.25 mol % and less than or equal to 4 mol %, greater than or equal to 0.25 mol % and less than or equal to 3 mol %, greater than or equal to 0.25 mol % and less than or equal to 2.5 mol %, greater than or equal to 0.25 mol % and less than or equal to 2 mol %, greater than or equal to 0.25 mol % and less than or equal to 1.75 mol %, greater than or equal to 0.25 mol % and less than or equal to 1.5 mol %, greater than or equal to 0.25 mol % and less than or equal to 1.25 mol %, greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 0.5 mol % and less than or equal to 2.5 mol %, greater than or equal to 0.5 mol % and less than or equal to 2 mol %, greater than or equal to 0.5 mol % and less than or equal to 1.75 mol %, greater than or equal to 0.5 mol % and less than or equal to 1.5 mol %, greater than or equal to 0.5 mol % and less than or equal to 1.25 mol %, greater than or equal to 0.75 mol % and less than or equal to 5 mol %, greater than or equal to 0.75 mol % and less than or equal to 4 mol %, greater than or equal to 0.75 mol % and less than or equal to 3 mol %, greater than or equal to 0.75 mol % and less than or equal to 2.5 mol %, greater than or equal to 0.75 mol % and less than or equal to 2 mol %, greater than or equal to 0.75 mol % and less than or equal to 1.75 mol %, greater than or equal to 0.75 mol % and less than or equal to 1.5 mol %, or even greater than or equal to 0.75 mol % and less than or equal to 1.25 mol %, or any and all sub-ranges formed from any of these endpoints. In embodiments, the glass composition and the resultant colored glass article may be substantially free or free of ZnO.

Like ZnO and the alkaline earth oxide MgO, other alkaline earth oxides, such as CaO, SrO and BaO, decrease the melting point of the glass composition. Accordingly, CaO, SrO, and/or BaO may be included in the glass composition and the resultant colored glass articles to lower the melting point of the glass composition, which may help improve Au retention.

In embodiments, the concentration of CaO in the glass composition and the resultant colored glass article may be greater than or equal to 0 mol %, greater than or equal to 0.25 mol %, greater than or equal to 0.5 mol %, or even greater than or equal to 0.75 mol %. In embodiments, the concentration of CaO in the glass composition and the resultant colored glass article may be less than or equal to 2 mol %, less than or equal to 1.75 mol %, less than or equal to 1.5 mol %, less than or equal to 1.25 mol %, or even less than or equal to 1 mol %. In embodiments, the concentration of CaO in the glass composition and the resultant colored glass article may be greater than or equal to 0 mol % and less than or equal to 2 mol %, greater than or equal to 0 mol % and less than or equal to 1.75 mol %, greater than or equal to 0 mol % and less than or equal to 1.5 mol %, greater than or equal to 0 mol % and less than or equal to 1.25 mol %, greater than or equal to 0 mol % and less than or equal to 1 mol %, greater than or equal to 0.25 mol % and less than or equal to 2 mol %, greater than or equal to 0.25 mol % and less than or equal to 1.75 mol %, greater than or equal to 0.25 mol % and less than or equal to 1.5 mol %, greater than or equal to 0.25 mol % and less than or equal to 1.25 mol %, greater than or equal to 0.25 mol % and less than or equal to 1 mol %, greater than or equal to 0.5 mol % and less than or equal to 2 mol %, greater than or equal to 0.5 mol % and less than or equal to 1.75 mol %, greater than or equal to 0.5 mol % and less than or equal to 1.5 mol %, greater than or equal to 0.5 mol % and less than or equal to 1.25 mol %, greater than or equal to 0.5 mol % and less than or equal to 1 mol %, greater than or equal to 0.75 mol % and less than or equal to 2 mol %, greater than or equal to 0.75 mol % and less than or equal to 1.75 mol %, greater than or equal to 0.75 mol % and less than or equal to 1.5 mol %, greater than or equal to 0.75 mol % and less than or equal to 1.25 mol %, or even greater than or equal to 0.75 mol % and less than or equal to 1 mol %, or any and all sub-ranges formed from any of these endpoints. In embodiments, the glass composition and the resultant colored glass article may be substantially free or free of CaO.

In embodiments, the concentration of SrO in the glass composition and the resultant colored glass article may be greater than or equal to 0 mol %, greater than or equal to 0.25 mol %, greater than or equal to 0.5 mol %, or even greater than or equal to 0.75 mol %. In embodiments, the concentration of SrO in the glass composition and the resultant colored glass article may be less than or equal to 2 mol %, less than or equal to 1.75 mol %, less than or equal to 1.5 mol %, less than or equal to 1.25 mol %, or even less than or equal to 1 mol %. In embodiments, the concentration of SrO in the glass composition and the resultant colored glass article may be greater than or equal to 0 mol % and less than or equal to 2 mol %, greater than or equal to 0 mol % and less than or equal to 1.75 mol %, greater than or equal to 0 mol % and less than or equal to 1.5 mol %, greater than or equal to 0 mol % and less than or equal to 1.25 mol %, greater than or equal to 0 mol % and less than or equal to 1 mol %, greater than or equal to 0.25 mol % and less than or equal to 2 mol %, greater than or equal to 0.25 mol % and less than or equal to 1.75 mol %, greater than or equal to 0.25 mol % and less than or equal to 1.5 mol %, greater than or equal to 0.25 mol % and less than or equal to 1.25 mol %, greater than or equal to 0.25 mol % and less than or equal to 1 mol %, greater than or equal to 0.5 mol % and less than or equal to 2 mol %, greater than or equal to 0.5 mol % and less than or equal to 1.75 mol %, greater than or equal to 0.5 mol % and less than or equal to 1.5 mol %, greater than or equal to 0.5 mol % and less than or equal to 1.25 mol %, greater than or equal to 0.5 mol % and less than or equal to 1 mol %, greater than or equal to 0.75 mol % and less than or equal to 2 mol %, greater than or equal to 0.75 mol % and less than or equal to 1.75 mol %, greater than or equal to 0.75 mol % and less than or equal to 1.5 mol %, greater than or equal to 0.75 mol % and less than or equal to 1.25 mol %, or even greater than or equal to 0.75 mol % and less than or equal to 1 mol %, or any and all sub-ranges formed from any of these endpoints. In embodiments, the glass composition and the resultant colored glass article may be substantially free or free of SrO.

In embodiments, the concentration of BaO in the glass composition and the resultant colored glass article may be greater than or equal to 0 mol %, greater than or equal to 0.25 mol %, greater than or equal to 0.5 mol %, or even greater than or equal to 0.75 mol %. In embodiments, the concentration of BaO in the glass composition and the resultant colored glass article may be less than or equal to 2 mol %, less than or equal to 1.75 mol %, less than or equal to 1.5 mol %, less than or equal to 1.25 mol %, or even less than or equal to 1 mol %. In embodiments, the concentration of BaO in the glass composition and the resultant colored glass article may be greater than or equal to 0 mol % and less than or equal to 2 mol %, greater than or equal to 0 mol % and less than or equal to 1.75 mol %, greater than or equal to 0 mol % and less than or equal to 1.5 mol %, greater than or equal to 0 mol % and less than or equal to 1.25 mol %, greater than or equal to 0 mol % and less than or equal to 1 mol %, greater than or equal to 0.25 mol % and less than or equal to 2 mol %, greater than or equal to 0.25 mol % and less than or equal to 1.75 mol %, greater than or equal to 0.25 mol % and less than or equal to 1.5 mol %, greater than or equal to 0.25 mol % and less than or equal to 1.25 mol %, greater than or equal to 0.25 mol % and less than or equal to 1 mol %, greater than or equal to 0.5 mol % and less than or equal to 2 mol %, greater than or equal to 0.5 mol % and less than or equal to 1.75 mol %, greater than or equal to 0.5 mol % and less than or equal to 1.5 mol %, greater than or equal to 0.5 mol % and less than or equal to 1.25 mol %, greater than or equal to 0.5 mol % and less than or equal to 1 mol %, greater than or equal to 0.75 mol % and less than or equal to 2 mol %, greater than or equal to 0.75 mol % and less than or equal to 1.75 mol %, greater than or equal to 0.75 mol % and less than or equal to 1.5 mol %, greater than or equal to 0.75 mol % and less than or equal to 1.25 mol %, or even greater than or equal to 0.75 mol % and less than or equal to 1 mol %, or any and all sub-ranges formed from any of these endpoints. In embodiments, the glass composition and the resultant colored glass article may be substantially free or free of BaO.

The glass compositions and the resultant colored glass articles described herein may further comprise $ZrO_2$. While not wishing to be bound by theory, it is believed that $ZrO_2$ may act as a multivalent species that serves as redox couples to supply oxygen to Au during relatively low-temperature heat treatment, which helps improve Au retention. $ZrO_2$ may also act as a colorant in addition to Au, producing colored glass articles that may be, for example, red in color. In embodiments, the glass composition and the resultant colored glass article may comprise greater than or equal to 0.1 mol % and less than or equal to 2 mol % $ZrO_2$. In embodiments, the glass composition and the resultant colored glass article may comprise greater than or equal to 0.25 mol % and less than or equal to 1.5 mol % $ZrO_2$. In embodiments, the concentration of $ZrO_2$ in the glass composition may be greater than or equal to 0 mol %, greater than or equal to 0.1 mol %, or even greater than or equal to 0.2 mol %. In embodiments, the concentration of $ZrO_2$ in the glass composition may be less than or equal to 2 mol %, less than or equal to 1.5 mol %, less than or equal to 1 mol %, less than or equal to 0.75 mol %, or even less than or equal to 0.5 mol %. In embodiments, the concentration of $ZrO_2$ in the glass composition may be greater than or equal to 0 mol % and less than or equal to 2 mol %, greater than or equal to 0 mol % and less than or equal to 1.5 mol %, greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0.1 mol % and less than or equal to 2 mol %, greater than or equal to 0.1 mol % and less than or equal to 1.5 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, greater than or equal to 0.2 mol % and less than or equal to 2 mol %, greater than or equal to 0.2 mol % and less than or equal to 1.5 mol %, greater than or equal to 0.2 mol % and less than or equal to 1 mol %, greater than or equal to 0.2 mol % and less than or equal to 0.75 mol %, or even greater than or equal to 0.2 mol % and less than or equal to 0.5 mol %, or any and all sub-ranges formed from any of these endpoints. In embodiments, the glass composition and the resultant colored glass article may be substantially free or free of $ZrO_2$.

The glass compositions and the resultant colored glass articles described herein may further comprise $Fe_2O_3$, which may help improve Au retention. $Fe_2O_3$ is a multivalent species that may serve as redox couples to supply oxygen to Au during relatively low-temperature heat treatment, which helps improve Au retention. $Fe_2O_3$ may also act as a colorant in addition to Au, producing colored glass articles that may, for example, be pink in color. In embodiments, the glass composition. In embodiments, the glass composition and the resultant colored glass article may comprise greater than or equal to 0.1 mol % and less than or equal to 1 mol % $Fe_2O_3$. In embodiments, the concentration of $Fe_2O_3$ in the glass composition may be greater than or equal to 0 mol % or even greater than or equal to 0.1 mol %. In embodiments, the concentration of $Fe_2O_3$ in the glass composition may be less than or equal to 1 mol %, less than or equal to 0.75 mol %, or even less than or equal to 0.5 mol %. In embodiments, the concentration of $Fe_2O_3$ in the glass composition may be greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0.1 mol % and less than or equal to 1 mol %, greater than or equal to 0.1 mol % and less than or equal to 0.75 mol %, or even greater than or equal to 0.1 mol % and less than or equal to 0.5 mol %, or any and all sub-ranges formed from any of these endpoints. In embodiments, the glass composition and the resultant colored glass article may be substantially free or free of $Fe_2O_3$.

The glass compositions and the resultant colored glass articles described herein may further comprise $SnO_2$, $Sb_2O_3$, and/or $Bi_2O_3$. Like MgO and ZnO, $SnO_2$, $Sb_2O_3$, and $Bi_2O_3$ may help lower the melting point of the glass composition. Accordingly, $SnO_2$, $Sb_2O_3$, and/or $Bi_2O_3$ may be included in the glass composition and the resultant colored glass articles to lower the melting point and improve Au retention.

In embodiments, the glass composition and the resultant colored glass article may comprise greater than or equal to 0.01 mol % and less than or equal to 1 mol % $SnO_2$. In embodiments, the glass composition and the resultant colored glass article may comprise greater than or equal to 0.05 mol % and less than or equal to 0.75 mol % $SnO_2$. In embodiments, the concentration of $SnO_2$ in the glass composition and the resultant colored glass article may be greater than or equal to 0 mol %, greater than or equal to 0.01 mol %, greater than or equal to 0.05 mol %, or even greater than or equal to 0.1 mol %. In embodiments, the concentration of $SnO_2$ in the glass composition and the resultant colored glass article may be less than or equal to 1 mol %, less than or equal to 0.75 mol %, less than or equal to 0.5 mol %, or even less than or equal to 0.25 mol %. In embodiments, the concentration of $SnO_2$ in the glass composition and the resultant colored glass article may be greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0 mol % and less than or equal to 0.25 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.01 mol % and less than or equal to 0.25 mol %, greater than or equal to 0.05 mol % and less than or equal to 1 mol %, greater than or equal to 0.05 mol % and less than or equal to 0.75 mol %, greater than or equal to 0.05 mol % and less than or equal to 0.5 mol %, greater than or equal to 0.05 mol % and less than or equal to 0.25 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, or even greater than or equal to 0.1 mol % and less than or equal to 0.25 mol %, or any and all sub-ranges formed from any of these endpoints. In embodiments, the glass composition and the resultant colored glass article may be substantially free or free of $SnO_2$.

In embodiments, the concentration of $Sb_2O_3$ in the glass composition and the resultant colored glass article may be greater than or equal to 0 mol %, greater than or equal to 0.01 mol %, greater than or equal to 0.05 mol %, or even greater than or equal to 0.1 mol %. In embodiments, the concentration of $Sb_2O_3$ in the glass composition and the resultant colored glass article may be less than or equal to 1 mol %, less than or equal to 0.75 mol %, less than or equal to 0.5 mol %, or even less than or equal to 0.25 mol %. In embodiments, the concentration of $Sb_2O_3$ in the glass composition and the resultant colored glass article may be greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0 mol % and less than or equal to 0.25 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.01 mol % and less than or equal to 0.25 mol %, greater than or equal to 0.05 mol % and less than or equal to 1 mol %, greater than or equal to 0.05 mol % and less than or equal to 0.75 mol %, greater than or equal to 0.05 mol % and less than or equal to 0.5 mol %, greater than or equal to 0.05 mol % and less than or equal to 0.25 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, or even greater than or equal to 0.1 mol % and less than or equal to 0.25 mol %, or any and all sub-ranges formed from any of these endpoints. In embodiments, the glass composition and the resultant colored glass article may be substantially free or free of $Sb_2O_3$.

In embodiments, the concentration of $Bi_2O_3$ in the glass composition and the resultant colored glass article may be greater than or equal to 0 mol %, greater than or equal to 0.01 mol %, greater than or equal to 0.05 mol %, or even greater than or equal to 0.1 mol %. In embodiments, the concentration of $Bi_2O_3$ in the glass composition and the resultant colored glass article may be less than or equal to 1 mol %, less than or equal to 0.75 mol %, less than or equal to 0.5 mol %, or even less than or equal to 0.25 mol %. In embodiments, the concentration of $Bi_2O_3$ in the glass composition and the resultant colored glass article may be greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0 mol % and less than or equal to 0.25 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.01 mol % and less than or equal to 0.25 mol %, greater than or equal to 0.05 mol % and less than or equal to 1 mol %, greater than or equal to 0.05 mol % and less than or equal to 0.75 mol %, greater than or equal to 0.05 mol % and less than or equal to 0.5 mol %, greater than or equal to 0.05 mol % and less than or equal to 0.25 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, or even greater than or equal to 0.1 mol % and less than or equal to 0.25 mol %, or any and all sub-ranges formed from any of these endpoints. In embodiments, the glass composition and the resultant colored glass article may be substantially free or free of $Bi_2O_3$.

The glass compositions and the resultant colored glass articles described herein may further comprise a reduced concentration or be substantially free or free of $P_2O_5$. An increased concentration (i.e., greater than 1 mol %) of $P_2O_5$ may reduce Au retention. While not wishing to be bound by theory, it is believed that $P_2O_5$ may be more volatile than other glass network formers, such as $SiO_2$, which may contribute to reduced Au retention. In embodiments, the glass composition and the resultant colored glass article may comprise greater than or equal to 0.1 mol % and less than or equal to 1 mol % $P_2O_5$. In embodiments, the concentration of $P_2O_5$ in the glass composition and the resultant colored glass article may be greater than or equal to 0 mol %, greater than or equal to 0.1 mol %, greater than or equal to 0.25 mol %, or even greater than or equal to 0.5 mol %. In embodiments, the concentration of $P_2O_5$ in the glass composition and the resultant colored glass article may be less than or equal to 1 mol % or even less than or equal to 0.75 mol %. In embodiments, the concentration of $P_2O_5$ in the glass composition and the resultant colored glass article may be greater than or equal to 0 mol % and less than or equal to 1 mol %, greater than or equal to 0 mol % and less than or equal to 0.75 mol %, greater than or equal to 0.1 mol % and less than or equal to 1 mol %, greater than or equal to 0.1 mol % and less than or equal to 0.75 mol %, greater than or equal to 0.25 mol % and less than or equal to 1 mol %, greater than or equal to 0.25 mol % and less than or equal to 0.75 mol %, greater than or equal to 0.5 mol % and less than or equal to 1 mol %, or even greater than or equal to 0.5 mol % and less than or equal to 0.75 mol %, or any and all sub-ranges formed from any of these endpoints. In embodiments, the glass composition and the resultant colored glass article may be substantially free or free of $P_2O_5$.

The glass compositions and the resultant colored glass articles described herein further comprise Au as a colorant to achieve the desired color. As described herein, the glass compositions and the resultant colored glass articles described herein improve the retention of Au, thereby expanding the color gamut achievable by the resultant colored glass articles.

In embodiments, the glass composition and the resultant colored glass article may comprise greater than 0.0005 mol % and less than or equal to 1 mol % Au. In embodiments, the glass composition and the resultant colored glass article may comprise greater than 0.001 mol % and less than or equal to 0.5 mol % Au. In embodiments, the concentration of Au in the glass composition and the resultant colored glass article may be greater than or equal to 0.0005 mol %, greater than or equal to 0.001 mol %, greater than or equal to 0.002 mol % Au, greater than or equal to 0.005 mol %, or even greater than or equal to 0.01 mol %. In embodiments, the concentration of Au in the glass composition and the resultant colored glass article may be less than or equal to 1 mol %, less than or equal to 0.75 mol %, less than or equal to 0.5 mol %, less than or equal to 0.25 mol %, less than or equal to 0.1 mol %, or even less than or equal to 0.05 mol %. In embodiments, the concentration of Au in the glass composition and the resultant colored glass article may be greater than or equal to 0.0005 mol % and less than or equal to 1 mol %, greater than or equal to 0.0005 mol % and less than or equal to 0.75 mol %, greater than or equal to 0.0005 mol % and less than or equal to 0.5 mol %, greater than or equal to 0.0005 mol % and less than or equal to 0.25 mol %, greater than or equal to 0.0005 mol % and less than or equal to 0.1 mol %, greater than or equal to 0.0005 mol % and less than or equal to 0.05 mol %, greater than or equal to 0.001 mol % and less than or equal to 1 mol %, greater than or equal to 0.001 mol % and less than or equal to 0.75 mol %, greater than or equal to 0.001 mol % and less than or equal to 0.5 mol %, greater than or equal to 0.001 mol % and less than or equal to 0.25 mol %, greater than or equal to 0.001 mol % and less than or equal to 0.1 mol %, greater than or equal to 0.001 mol % and less than or equal to 0.05 mol %, greater than or equal to 0.002 mol % and less than or equal to 1 mol %, greater than or equal to 0.002 mol % and less than or equal to 0.75 mol %, greater than or equal to 0.002 mol % and less than or equal to 0.5 mol %, greater than or equal to 0.002 mol % and less than or equal to 0.25 mol %, greater than or equal to 0.002 mol % and less than or equal to 0.1 mol %, greater than or equal to 0.002 mol % and less than or equal to 0.05 mol %, greater than or equal to 0.005 mol % and less than or equal to 1 mol %, greater than or equal to 0.005 mol % and less than or equal to 0.75 mol %, greater than or equal to 0.005 mol % and less than or equal to 0.5 mol %, greater than or equal to 0.005 mol % and less than or equal to 0.25 mol %, greater than or equal to 0.005 mol % and less than or equal to 0.1 mol %, greater than or equal to 0.005 mol % and less than or equal to 0.05 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.01 mol % and less than or equal to 0.25 mol %, greater than or equal to 0.01 mol % and less than or equal to 0.1 mol %, or even greater than or equal to 0.01 mol % and less than or equal to 0.05 mol %, or any and all sub-ranges formed from any of these endpoints.

In embodiments, the glass composition and the resultant colored glass article may comprise greater than or equal to $1\times10^{-6}$ mol % and less than or equal to 1 mol % Au. In embodiments, the glass composition and the resultant colored glass article may comprise greater than or equal to $1\times10^{-6}$ mol % and less than or equal to 0.01 mol % Au. In embodiments, the concentration of Au in the glass composition and the resultant colored glass article may be greater than or equal to $1\times10^{-6}$ mol %, greater than or equal to $1\times10^{-5}$ mol %, greater than or equal to 0.0001 mol %, greater than or equal to 0.0005 mol %, or even greater than or equal to 0.001 mol %. In embodiments, the concentration of Au in the glass composition and the resultant colored glass article may be less than or equal to 1 mol %, less than or equal to 0.75 mol %, less than or equal to 0.5 mol %, less than or equal to 0.25 mol %, less than or equal to 0.1 mol %, less than or equal to 0.05 mol %, or even less than or equal to 0.01. In embodiments, the concentration of Au in the glass composition and the resultant colored glass article may be greater than or equal to $1\times10^{-6}$ mol % and less than or equal to 0.75 mol %, greater than or equal to $1\times10^{-6}$ mol % and less than or equal to 0.5 mol %, greater than or equal to $1\times10^{-6}$ mol % and less than or equal to 0.25 mol %, greater than or equal to $1\times10^{-6}$ mol % and less than or equal to 0.1 mol %, greater than or equal to $1\times10^{-6}$ mol % and less than or equal to 0.05 mol %, greater than or equal to $1\times10^{-6}$ mol % and less than or equal to 0.01 mol %, greater than or equal to $1\times10^{-5}$ mol % and less than or equal to 1 mol %, greater than or equal to $1\times10^{-5}$ mol % and less than or equal to 0.75 mol %, greater than or equal to $1\times10^{-5}$ mol % and less than or equal to 0.5 mol %, greater than or equal to $1\times10^{-5}$ mol % and less than or equal to 0.25 mol %, greater than or equal to $1\times10^{-5}$ mol % and less than or equal to 0.1 mol %, greater than or equal to $1\times10^{-5}$ mol % and less than or equal to 0.05 mol %, greater than or equal to $1\times10^{-5}$ mol % and less than or equal to 0.01 mol %, greater than or equal to 0.0001 mol % and less than or equal to 1 mol %, greater than or equal to 0.0001 mol % and less than or equal to 0.75 mol %, greater than or equal to 0.0001 mol % and less than or equal to 0.5 mol %, greater than or equal to 0.0001 mol % and less than or equal to 0.25 mol %, greater than or equal to 0.0001 mol % and less than or equal to 0.1 mol %, greater than or equal to 0.0001 mol % and less than or equal to 0.05 mol %, greater than or equal to 0.0001 mol % and less than or equal to 0.01 mol %, greater than or equal to 0.0005 mol % and less than or equal to 1 mol %, greater than or equal to 0.0005 mol % and less than or equal to 0.75 mol %, greater than or equal to 0.0005 mol % and less than or equal to 0.5 mol %, greater than or equal to 0.0005 mol % and less than or equal to 0.25 mol %, greater than or equal to 0.0005 mol % and less than or equal to 0.1 mol %, greater than or equal to 0.0005 mol % and less than or equal to 0.05 mol %, greater than or equal to 0.0005 mol % and less than or equal to 0.01 mol %, greater than or equal to 0.001 mol % and less than or equal to 1 mol %, greater than or equal to 0.001 mol % and less than or equal to 0.75 mol %, greater than or equal to 0.001 mol % and less than or equal to 0.5 mol %, greater than or equal to 0.001 mol % and less than or equal to 0.25 mol %, greater than or equal to 0.001 mol % and less than or equal to 0.1 mol %, greater than or equal to 0.001 mol % and less than or equal to 0.05 mol %, or even greater than or equal to 0.001 mol % and less than or equal to 0.01 mol %, or any and all sub-ranges formed from any of these endpoints.

A different color gamut may be achieved by including other colorants in addition to Au. Accordingly, in embodiments, the glass composition and resultant colored glass article may comprise the glass composition comprises greater than or equal to 0 mol % and less than or equal to 1 mol % of a cation "M", wherein "M" is at least one of F, Cl, Br, Ti, V, Cr, Mn, Fe, Co, Ni, Cu, Se, Nb, Mo, Ru, Rh, Pd, Ag, Cd, In, Te, W, Ir, Pt, Ce, Pr, Nd, Sm, Eu, Gd, Tb, Dy, Ho, and Er.

In embodiments, the glass compositions and the resultant colored glass articles described herein may further include tramp materials such as $TiO_2$, MnO, $MoO_3$, $WO_3$, $Y_2O_3$, CdO, $As_2O_3$, sulfur-based compounds, such as sulfates, halogens, or combinations thereof. In embodiments, the glass composition and the resultant colored glass article may be substantially free or free of tramp materials such as $TiO_2$, MnO, $MoO_3$, $WO_3$, $Y_2O_3$, CdO, $As_2O_3$, sulfur-based compounds, such as sulfates, halogens, or combinations thereof. In embodiments, antimicrobial components, chemical fining agents, or other additional components may be included in the glass compositions and the resultant colored glass articles.

As described herein, decreasing the melting point of the glass composition may help improve Au retention because the glass compositions may be melted at relatively lower temperatures and Au evaporation may be reduced. Accordingly, the glass compositions and the resultant colored glass articles described herein include MgO and/or ZnO, which help lower the melting point of the glass composition. $B_2O_3$, $Li_2O$, and $Na_2O$ also decrease the melting point of the glass composition. As described herein, other components may be added to the glass composition to lower the melting point thereof, such as $SnO_2$, $Sb_2O_3$, and $Bi_2O_3$. In embodiments, the glass composition may have a melting point less than or equal to 1550° C. In embodiments, the glass composition may have a melting point greater than or equal to 1300° C., greater than or equal to 1325° C., greater than or equal to 1350° C., greater than or equal to 1375° C., or even greater than or 1400° C. In embodiments, the glass composition may have a melting point less than or equal to 1550° C., less than or equal to 1525° C., less than or equal 1500° C., less than or equal to 1475° C., or even less than or equal to 1450° C. In embodiments, the melting point of the glass composition may be greater than or equal to 1300° C. and less than or equal to 1550° C., greater than or equal to 1300° C. and less than or equal to 1525° C., greater than or equal to 1300° C. and less than or equal to 1500° C., greater than or equal to 1300° C. and less than or equal to 1475° C., greater than or equal to 1300° C. and less than or equal to 1450° C., greater than or equal to 1325° C. and less than or equal to 1550° C., greater than or equal to 1325° C. and less than or equal to 1525° C., greater than or equal to 1325° C. and less than or equal to 1500° C., greater than or equal to 1325° C. and less than or equal to 1475° C., greater than or equal to 1325° C. and less than or equal to 1450° C., greater than or equal to 1350° C. and less than or equal to 1550° C., greater than or equal to 1350° C. and less than or equal to 1525° C., greater than or equal to 1350° C. and less than or equal to 1500° C., greater than or equal to 1350° C. and less than or equal to 1475° C., greater than or equal to 1350° C. and less than or equal to 1450° C., greater than or equal to 1375° C. and less than or equal to 1550° C., greater than or equal to 1375° C. and less than or equal to 1525° C., greater than or equal to 1375° C. and less than or equal to 1500° C., greater than or equal to 1375° C. and less than or equal to 1475° C., greater than or equal to 1375° C. and less than or equal to 1450° C., greater than or equal to 1400° C. and less than or equal to 1550° C., greater than or equal to 1400° C. and less than or equal to 1525° C., greater than or equal to 1400° C. and less than or equal to 1500° C., greater than or equal to 1400° C. and less than or equal to 1475° C., or even greater than or equal to 1400° C. and less than or equal to 1450° C., or any and all sub-ranges formed from any of these endpoints.

In embodiments, a liquidus temperature of the glass composition may be greater than or equal to 1000° C., greater than or equal to 1050° C., or even greater than or equal to 1100° C. In embodiments, a liquidus temperature of the precursor glass composition may be less than or equal to 1400° C., less than or equal to 1350° C. or even less than or equal to 1300° C. In embodiments, a liquidus temperature of the glass composition may be greater than or equal to 1000° C. and less than or equal to 1400° C., greater than or equal to 1000° C. and less than or equal to 1350° C., greater than or equal to 1000° C. and less than or equal to 1300° C., greater than or equal to 1050° C. and less than or equal to 1400° C., greater than or equal to 1050° C. and less than or equal to 1350° C., greater than or equal to 1000° C. and less than or equal to 1300° C., greater than or equal to 1100° C. and less than or equal to 1400° C., greater than or equal to 1100° C. and less than or equal to 1350° C., or even greater than or equal to 1100° C. and less than or equal to 1300° C., or any and all sub-ranges formed from any of these endpoints.

In embodiments, the viscosity of the glass composition may be adjusted to prevent devitrification of the glass composition and formation of Au particles before melting. Formation of Au particles before melting may limit the color gamut that may be achieved by heat treatment. Accordingly, in embodiments, to achieve the desired viscosity and thereby prevent formation of Au particles before melting, the glass compositions and the resultant glass articles described herein may satisfy the relationship $5.72*Al_2O_3$ (mol %)-$21.4*ZnO$ (mol %)-$2.5*P_2O_5$ (mol %)-$35*Li_2O$ (mol %)-$16.6*B_2O_3$ (mol %)-$20.5*MgO$ (mol %)-$23.3*Na_2O$ (mol %)-$27.9*SrO$ (mol %)-$18.5*K_2O$ (mol %)-$26.3*CaO$ (mol %) is greater than −609 mol %. In embodiments, the glass compositions and the resultant glass articles described herein may satisfy the relationship $5.72*Al_2O_3$ (mol %)-$21.4*ZnO$ (mol %)-$2.5*P_2O_5$ (mol %)-$35*Li_2O$ (mol %)-$16.6*B_2O_3$ (mol %)-$20.5*MgO$ (mol %)-$23.3*Na_2O$ (mol %)-$27.9*SrO$ (mol %)-$18.5*K_2O$ (mol %)-$26.3*CaO$ (mol %) is greater than −609 mol %, greater than or equal to −575 mol %, greater than or equal to −550 mol %, or even greater than or equal to −525 mol %. In embodiments, the glass compositions and the resultant glass articles described herein may satisfy the relationship $5.72*Al_2O_3$ (mol %)-$21.4*ZnO$ (mol %)-$2.5*P_2O_5$ (mol %)-$35*Li_2O$ (mol %)-$16.6*B_2O_3$ (mol %)-$20.5*MgO$ (mol %)-$23.3*Na_2O$ (mol %)-$27.9*SrO$ (mol %)-$18.5*K_2O$ (mol %)-$26.3*CaO$ (mol %) is less than or equal to −400 mol %, less than or equal to −425 mol %, or even less than or equal to −450 mol %. In embodiments, the glass compositions and the resultant glass articles described herein may satisfy the relationship $5.72*Al_2O_3$ (mol %)-$21.4*ZnO$ (mol %)-$2.5*P_2O_5$ (mol %)-$35*Li_2O$ (mol %)-$16.6*B_2O_3$ (mol %)-$20.5*MgO$ (mol %)-23.3*Na$_2$O (mol %)-27.9*SrO (mol %)-18.5*K$_2$O (mol %)-26.3*CaO (mol %) is greater than −609 mol % and less than or equal to −400 mol %, greater then −609 mol % and less than or equal to −425 mol %, greater than −609 mol % and less than or equal to −450 mol %, greater than or equal to −575 mol % and less than or equal to −400 mol %, greater than or equal to −575 mol % and less than or equal to −425 mol %, greater than or equal to −575 mol % and less than or equal to −450 mol %, greater than or equal to −550 mol % and less than or equal to −400 mol %, greater than or equal to −550 mol % and less than or equal to −425 mol %, greater than or equal to −550 mol % and less than or equal to −450 mol %, greater than or equal to −525 mol % and less than or equal to −400 mol %, greater than or equal to −525 mol % and less than or equal to −425 mol %, or even greater than or equal to −525 mol % and less than or equal to −450 mol %, or any and all sub-ranges formed from any of these endpoints.

In embodiments, the process for making a glass article includes heat treating a glass composition described herein at one or more preselected temperatures for one or more preselected times to induce glass homogenization. In embodiments, the heat treatment for making a glass article may include (i) heating a glass composition at a rate of 1-100° C./min to glass homogenization temperature; (ii) maintaining the glass composition at the glass homogenization temperature for a time greater than or equal to 0.25 hour and less than or equal to 4 hours to produce a glass article; and (iii) cooling the formed glass article to room temperature. In embodiments, the glass homogenization temperature may be greater than or equal to 300° C. and less than or equal to 700° C.

The colored glass articles formed from the glass compositions described herein may be any suitable thickness, which may vary depending on the particular application of the colored glass article. In embodiments, the colored glass articles may have a thickness greater than or equal to 250 μm and less than or equal to 6 mm, greater than or equal to 250 μm and less than or equal to 4 mm, greater than or equal to 250 μm and less than or equal to 2 mm, greater than or equal to 250 μm and less than or equal to 1 mm, greater than or equal to 250 μm and less than or equal to 750 μm, greater than or equal to 250 μm and less than or equal to 500 μm, greater than or equal to 500 μm and less than or equal to 6 mm, greater than or equal to 500 μm and less than or equal to 4 mm, greater than or equal to 500 μm and less than or equal to 2 mm, greater than or equal to 500 μm and less than or equal to 1 mm, greater than or equal to 500 μm and less than or equal to 750 μm, greater than or equal to 750 μm and less than or equal to 6 mm, greater than or equal to 750 μm and less than or equal to 4 mm, greater than or equal to 750 μm and less than or equal to 2 mm, greater than or equal to 750 μm and less than or equal to 1 mm, greater than or equal to 1 mm and less than or equal to 6 mm, greater than or equal to 1 mm and less than or equal to 4 mm, greater than or equal to 1 mm and less than or equal to 2 mm, greater than or equal to 2 mm and less than or equal to 6 mm, greater than or equal to 2 mm and less than or equal to 4 mm, or even greater than or equal to 4 mm and less than or equal to 6 mm, or any and all sub-ranges formed from any of these endpoints.

As discussed hereinabove, colored glass articles formed from the glass compositions described herein may have an increased fracture toughness such that the colored glass articles are more resistant to damage. In embodiments, the colored glass article may have a $K_{Ic}$ fracture toughness as measured by a double torsion method greater than or equal to 0.7 MPa·m$^{1/2}$. In embodiments, the colored glass article may have a $K_{Ic}$ fracture toughness as measured by a double torsion method greater than or equal to 0.7 MPa·m$^{1/2}$, greater than or equal to 0.8 MPa·m$^{1/2}$, greater than or equal to 0.9 MPa·m$^{1/2}$, or even greater than or equal to 1.0 MPa·m$^{1/2}$.

In embodiments, the glass compositions described herein are ion-exchangeable to facilitate strengthening the colored glass article made from the glass compositions. In typical ion-exchange processes, smaller metal ions in the glass compositions are replaced or "exchanged" with larger metal ions of the same valence within a layer that is close to the outer surface of the colored glass article made from the glass composition. The replacement of smaller ions with larger ions creates a compressive stress within the layer of the colored glass article made from the glass composition. In embodiments, the metal ions are monovalent metal ions (e.g., Li$^+$, Na$^+$, K$^+$, and the like), and ion-exchange is accomplished by immersing the glass article made from the glass composition in a bath comprising at least one molten salt of the larger metal ion that is to replace the smaller metal ion in the colored glass article. Alternatively, other monovalent ions such as Ag$^+$, Tl$^+$, Cu$^+$, and the like may be exchanged for monovalent ions. The ion-exchange process or processes that are used to strengthen the colored glass article made from the glass composition may include contacting the colored glass article with an ion-exchange medium. In embodiments, the ion-exchange medium may be a molten salt bath. For example, the ion-exchange process may include, but is not limited to, immersion in a single bath or multiple baths of like or different compositions with optional washing and/or annealing steps between immersions.

Upon exposure to the colored glass article, the ion-exchange solution (e.g., KNO$_3$ and/or NaNO$_3$ molten salt bath) may, according to embodiments, be at a temperature greater than or equal to 350° C. and less than or equal to 500° C., greater than or equal to 360° C. and less than or equal to 450° C., greater than or equal to 370° C. and less than or equal to 440° C., greater than or equal to 360° C. and less than or equal to 420° C., greater than or equal to 370° C. and less than or equal to 400° C., greater than or equal to 375° C. and less than or equal to 475° C., greater than or equal to 400° C. and less than or equal to 500° C., greater than or equal to 410° C. and less than or equal to 490° C., greater than or equal to 420° C. and less than or equal to 480° C., greater than or equal to 430° C. and less than or equal to 470° C., or even greater than or equal to 440° C. and less than or equal to 460° C., or any and all sub-ranges between the foregoing values. In embodiments, the colored glass article may be exposed to the ion-exchange solution for a duration greater than or equal to 2 hours and less than or equal to 24 hours, greater than or equal to 2 hours and less than or equal to 12 hours, greater than or equal to 2 hours and less than or equal to 6 hours, greater than or equal to 8 hours and less than or equal to 24 hours, greater than or equal to 6 hours and less than or equal to 24 hours, greater than or equal to 6 hours and less than or equal to 12 hours, greater than or equal to 8 hours and less than or equal to 24 hours, or even greater than or equal to 8 hours and less than or equal to 12 hours, or any and all sub-ranges formed from any of these endpoints.

In embodiments, a colored glass article made from a glass composition may be ion-exchanged to achieve a depth of compression of 10 μm or greater, 20 μm or greater, 30 μm or greater, 40 μm or greater, 50 μm or greater, 60 μm or greater, 70 μm or greater, 80 μm or greater, 90 μm or greater, or 100 μm or greater. In embodiments, a colored glass article made from a glass composition may be ion-exchanged to achieve a depth of compression of 3 μm or greater or 5 μm or greater. In embodiments, the colored glass article made from the glass composition may have a thickness "t" and may be ion-exchanged to achieve a depth of compression greater than or equal to 0.15 t, greater than or equal to 0.17 t, or even greater than or equal to 0.2 t. In embodiments, the colored glass article made from the glass composition may have a thickness "t" and may be ion-exchanged to achieve a depth of compression less than or equal to 0.3 t, less than or equal to 0.27 t, or even less than or equal to 0.25 t. In embodiments, the colored glass article made from the glass composition described herein may have a thickness "t" and may be ion-exchanged to achieve a depth of compression greater than or equal to 0.15 t and less than or equal to 0.3 t, greater than or equal to 0.15 t and less than or equal to 0.27 t, greater than or equal to 0.15 t and less than or equal to 0.25 t, greater than or equal to 0.17 t and less than or equal to 0.3 t, greater than or equal to 0.17 t and less than or equal to 0.27 t, greater than or equal to 0.17 t and less than or equal to 0.25 t, greater than or equal to 0.2 t and less than or equal to 0.3 t, greater than or equal to 0.2 t and less than or equal to 0.27 t, or even greater than or equal to 0.2 t and less than or equal to 0.25 t, or any and all sub-ranges formed from any of these endpoints.

The development of this surface compression layer is beneficial for achieving a better crack resistance and higher flexural strength compared to non-ion-exchanged materials. The surface compression layer has a higher concentration of the ions exchanged into the colored glass article in comparison to the concentration of the ions exchanged into the colored glass article for the body (i.e., the area not including the surface compression) of the colored glass article. In embodiments, the colored glass article made from the glass composition may have a surface compressive stress after ion-exchange strengthening greater than or equal to 300 MPa, greater than or equal to 400 MPa, greater than or equal to 500 MPa, or even greater than or equal to 600 MPa. In embodiments, the colored glass article made from the glass composition may have a surface compressive stress after ion-exchange strengthening less than or equal to 1 GPa, less than or equal to 900 MPa, or even less than or equal to 800 MPa. In embodiments, the colored glass article made from the glass composition may have a surface compressive stress after ion-exchange strengthening greater than or equal to 300 MPa and less than or equal to 1 GPa, greater than or equal to 300 MPa and less than or equal to 900 MPa, greater than or equal to 300 MPa and less than or equal to 800 MPa, greater than or equal to 400 MPa and less than or equal to 1 GPa, greater than or equal to 400 MPa and less than or equal to 900 MPa, greater than or equal to 400 MPa and less than or equal to 800 MPa, greater than or equal to 500 MPa and less than or equal to 1 GPa, greater than or equal to 500 MPa and less than or equal to 900 MPa, greater than or equal to 500 MPa and less than or equal to 800 MPa, greater than or equal to 600 MPa and less than or equal to 1 GPa, greater than or equal to 600 MPa and less than or equal to 900 MPa, greater than or equal to 600 MPa and less than or equal to 800 MPa, In embodiments, the colored glass articles made from the glass composition may have a central tension after ion-exchange strengthening greater than or equal to 40 MPa, greater than or equal to 60 MPa, greater than or equal to 80 MPa, or even greater than or equal to 100 MPa. In embodiments, the colored glass article made from the glass composition may have a central tension after ion-exchange strengthening less than or equal to 250 MPa, less than or equal to 200 MPa, or even less than or equal to 150 MPa. In embodiments, the colored glass article made from the glass composition may have a central tension after ion-exchange strengthening greater than or equal to 40 MPa and less than or equal to 250 MPa, greater than or equal to 40 MPa and less than or equal to 200 MPa, greater than or equal to 40 MPa and less than or equal to 150 MPa, greater than or equal to 60 MPa and less than or equal to 250 MPa, greater than or equal to 60 MPa and less than or equal to 200 MPa, greater than or equal to 60 MPa and less than or equal to 150 MPa, greater than or equal to 80 MPa and less than or equal to 250 MPa, greater than or equal to 80 MPa and less than or equal to 200 MPa, greater than or equal to 80 MPa and less than or equal to 150 MPa, greater than or equal to 100 MPa and less than or equal to 250 MPa, greater than or equal to 100 MPa and less than or equal to 200 MPa, or even greater than or equal to 100 MPa and less than or equal to 150 MPa, or any and all sub-ranges formed from any of these endpoints. As utilized herein, central tension refers to a maximum central tension value unless otherwise indicated.

As described herein, the glass compositions described herein increase the retention of Au, which increases the concentration of Au in the resultant colored glass articles, thereby expanding the color gamut achievable by the colored glass articles. In embodiments, a colored glass article having greater than or equal to 0.01 mol % and less than or equal to 1 mol % Au may have a transmittance color coordinate in the CIELAB color space, as measured at an article thickness of 1.5 mm under F2 illumination and a 10° standard observer angle, of L* greater than or equal to 65 and less than or equal to 97, a* greater than or equal to −5 and less than or equal to 25, and b* greater than or equal to −20 and less than or equal to 5. In embodiments, colored glass article having greater than or equal to $1\times10^{-6}$ mol % and less than or equal to 1 mol % Au may have a transmittance color coordinate in the CIELAB color space, as measured at an article thickness of 1.33 mm under F2 illumination and a 100 standard observer angle, of L* greater than or equal to 65 and less than or equal to 98, a* greater than or equal to −10 and less than or equal to 25, and b* greater than or equal to −20 and less than or equal to 5.

In embodiments, the glass composition and the resultant colored glass article may comprise greater than or equal to 60 mol % and less than or equal to 70 mol % $SiO_2$; greater than or equal to 11 mol % and less than or equal to 17 mol % $Al_2O_3$; greater than or equal to 2 mol % and less than or equal to 8 mol % $B_2O_3$; greater than or equal to 9 mol % and less than or equal to 14 mol % $Li_2O$; greater than or equal to 2 mol % and less than or equal to 6 mol % $Na_2O$; greater than or equal to 0.1 mol % and less than or equal to 2 mol % MgO; greater than or equal to 0.1 mol % and less than or equal to 2 mol % ZnO; and greater than or equal to $1\times10^{-6}$ mol % and less than or equal to 0.01 mol % Au. In these embodiments, MgO+ZnO is greater than or equal to 0.1 mol % and less than or equal to 4.5 mol %.

Different color coordinates within the color gamut may be achieved by altering the heat treatment cycle of the glass composition used to produce the resultant colored glass articles. The heat treatment cycle is characterized by the temperature of the environment (i.e., the oven) and the duration of the cycle (i.e., time exposed to the heated environment). As used herein, the phrase "temperature of the heat treatment cycle" refers to the temperature of the environment (i.e., the oven). In embodiments, glass articles formed from the glass compositions described herein are heat treated in an isothermal oven to produce the resultant colored glass articles.

In embodiments, the temperature of the heat treatment cycle is greater than or equal to 550° C., greater than or equal to 575° C., greater than or equal to 600° C., greater than or equal to 625° C., or even greater than or equal to 650° C. In embodiments, the temperature of the heat treatment cycle is less than or equal to 800° C., less than or equal to 775° C., less than or equal to 750° C., less than or equal to 725° C., or even less than or equal to 700° C. embodiments, the temperature of the heat treatment cycle is greater than or equal to 550° C. and less than or equal to 800° C., greater than or equal to 550° C. and less than or equal to 775° C., greater than or equal to 550° C. and less than or equal to 750° C., greater than or equal to 550° C. and less than or equal to 725° C., greater than or equal to 550° C. and less than or equal to 700° C., greater than or equal to 575° C. and less than or equal to 800° C., greater than or equal to 575° C. and less than or equal to 775° C., greater than or equal to 575° C. and less than or equal to 750° C., greater than or equal to 575° C. and less than or equal to 725° C., greater than or equal to 575° C. and less than or equal to 700° C., greater than or equal to 600° C. and less than or equal to 800° C., greater than or equal to 600° C. and less than or equal to 775° C., greater than or equal to 600° C. and less than or equal to 750° C., greater than or equal to 600° C. and less than or equal to 725° C., greater than or equal to 600° C. and less than or equal to 700° C., greater than or equal to 625° C. and less than or equal to 800° C., greater than or equal to 625° C. and less than or equal to 775° C., greater than or equal to 625° C. and less than or equal to 750° C., greater than or equal to 625° C. and less than or equal to 725° C., greater than or equal to 625° C. and less than or equal to 700° C., greater than or equal to 650° C. and less than or equal to 800° C., greater than or equal to 650° C. and less than or equal to 775° C., greater than or equal to 650° C. and less than or equal to 750° C., greater than or equal to 650° C. and less than or equal to 725° C., or even greater than or equal to 650° C. and less than or equal to 700° C., or any and all sub-ranges formed from any of these endpoints.

In embodiments, the duration of the heat treatment cycle is greater than or equal to 0.25 hour, greater than or equal to 0.5 hour, greater than or equal 1 hour, or even greater than or equal to 2 hours. In embodiments, the durations of the heat treatment cycle is less than or equal to 24 hours, less than or equal to 16 hours, less than or equal to 8 hours, or even less than or equal to 4 hours. In embodiments, the duration of the heat treatment cycle is greater than or equal to 0.25 hour and less than or equal to 24 hours, greater than or equal to 0.25 hour and less than or equal to 16 hours, greater than or equal to 0.25 hour and less than or equal to 8 hours, greater than or equal to 0.25 hour and less than or equal to 4 hours, greater than or equal to 0.5 hour and less than or equal to 24 hours, greater than or equal to 0.5 hour and less than or equal to 16 hours, greater than or equal to 0.5 hour and less than or equal to 8 hours, greater than or equal to 0.5 hour and less than or equal to 4 hours, greater than or equal to 1 hour and less than or equal to 24 hours, greater than or equal to 1 hour and less than or equal to 16 hours, greater than or equal to 1 hour and less than or equal to 8 hours, greater than or equal to 1 hour and less than or equal to 4 hours, greater than or equal to 2 hours and less than or equal to 24 hours, greater than or equal to 2 hours and less than or equal to 16 hours, greater than or equal to 2 hours and less than or equal to 8 hours, or even greater than or equal to 2 hours and less than or equal to 4 hours, or any and all sub-ranges formed from any of these endpoints.

In embodiments, the heat treatment may comprise ramping up to a heat treatment temperature at a heating rate and cooling down from the heat treatment temperature at a cooling rate. In embodiments, the selected heating rate and cooling down rate may effect the color coordinates of the resultant colored glass articles.

In embodiments, the heating rate of the heat treatment may be greater than or equal to 2° C./min or even greater than or equal to 3° C./min. In embodiments, the heating rate of the heat treatment may be less than equal to 10° C./min, less than or equal to 7° C./min, or even less than or equal to 5° C./min. In embodiments, the heating rate of the heat treatment may be greater than or equal to 2° C./min and less than or equal to 10° C./min, greater than or equal to 2° C./min and less than or equal to 7° C./min, greater than or equal to 2° C./min and less than or equal to 5° C./min, greater than or equal to 3° C./min and less than or equal to 10° C./min, greater than or equal to 3° C./min and less than or equal to 7° C./min, or even greater than or equal to 3° C./min and less than or equal to 5° C./min, or any and all sub-ranges formed from any of these endpoints.

In embodiments, the cooling rate of the heat treatment may be greater than or equal to 1° C./min or even greater than or equal to 2° C./min. In embodiments, the cooling rate of the heat treatment may be less than or equal to 10° C./min, less than or equal to 8° C./min, less than or equal to 6° C./min, or even less than or equal to 4° C./min. In embodiments, the cooling rate of the heat treatment may be greater than or equal to 1° C./min and less than or equal to 10° C./min, greater than or equal to 1° C./min and less than or equal to 8° C./min, greater than or equal to 1° C./min and less than or equal to 6° C./min, greater than or equal to 1° C./min and less than or equal to 4° C./min, greater than or equal to 2° C./min and less than or equal to 10° C./min, greater than or equal to 2° C./min and less than or equal to 8° C./min, greater than or equal to 2° C./min and less than or equal to 6° C./min, or even greater than or equal to 2° C./min and less than or equal to 4° C./min, or any and all sub-ranges formed from any of these endpoints.

In embodiments, the glass compositions are heat treated in an isothermal oven to produce the resultant colored glass articles.

Figure 2:
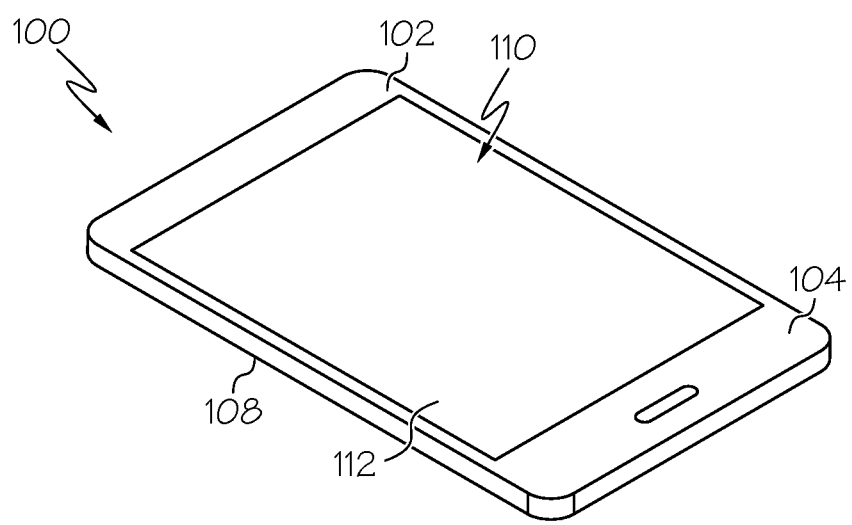
FIG. 2 is a perspective view of the electronic device of FIG. 1.
Figure 3A:
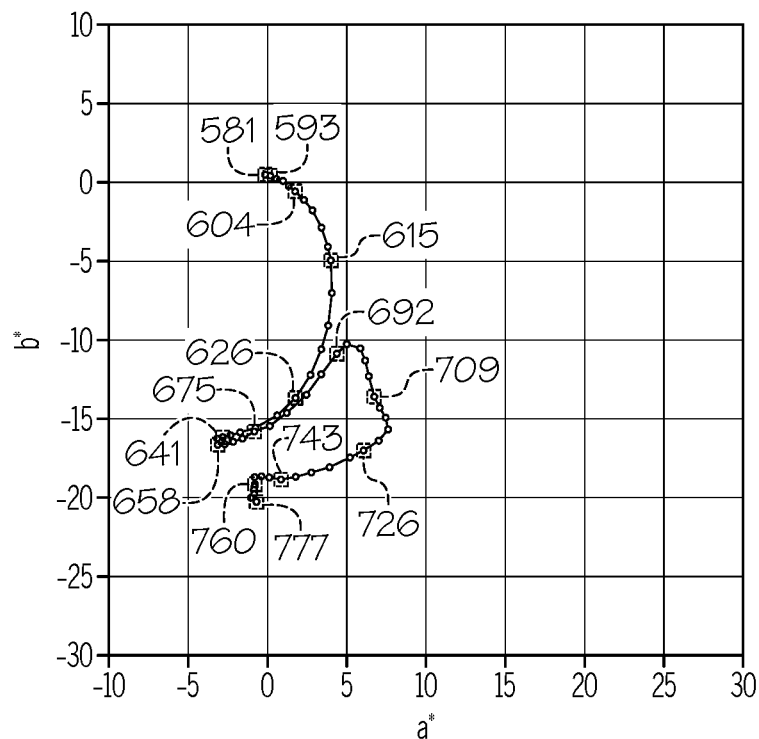
FIG. 3A is a plot of a* vs. b* CIELAB space (x-axis: a*; y-axis: b*) as a function of a heat treatment temperature of a colored glass article made from a glass composition according to one or more embodiments described herein.
Figure 3B:
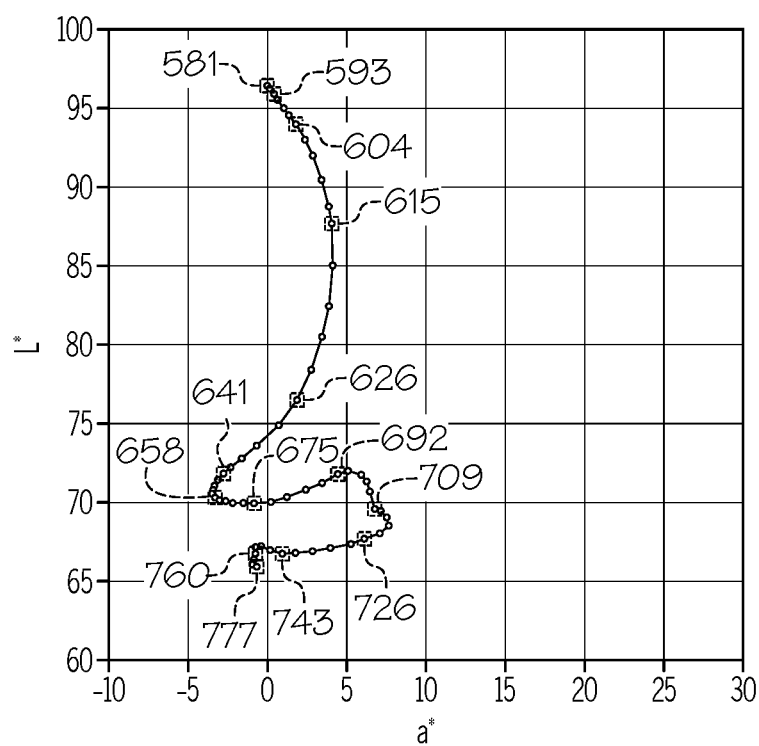
FIG. 3B is a plot of a projected a* vs. L* CIELAB space (x-axis: a*; y-axis: L*) of the colored glass article of FIG. 3A.
Figure 3C:
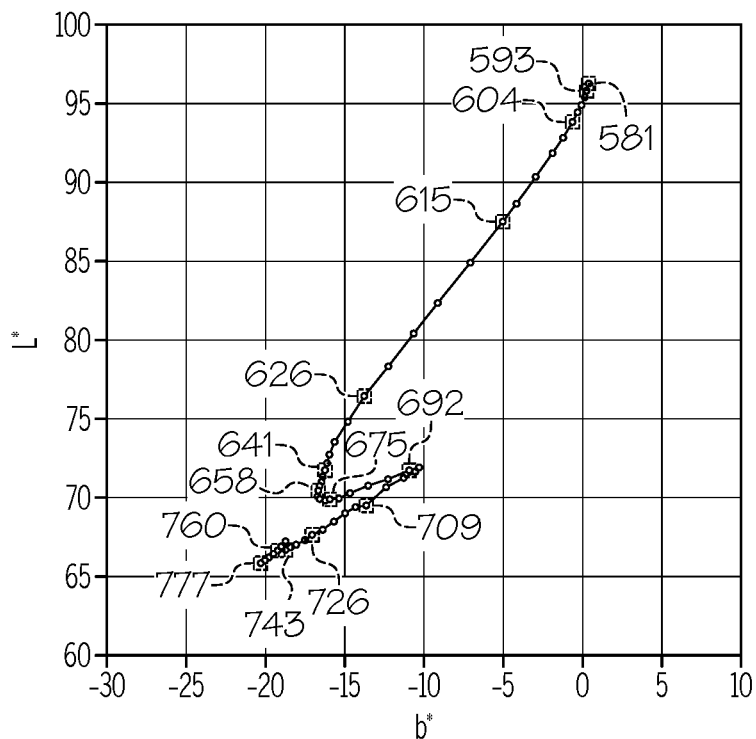
FIG. 3C is a plot of a projected b* vs. L* CIELAB space (x-axis: b*; y-axis: L*) of the colored glass article of FIG. 3A.
Figure 4A:
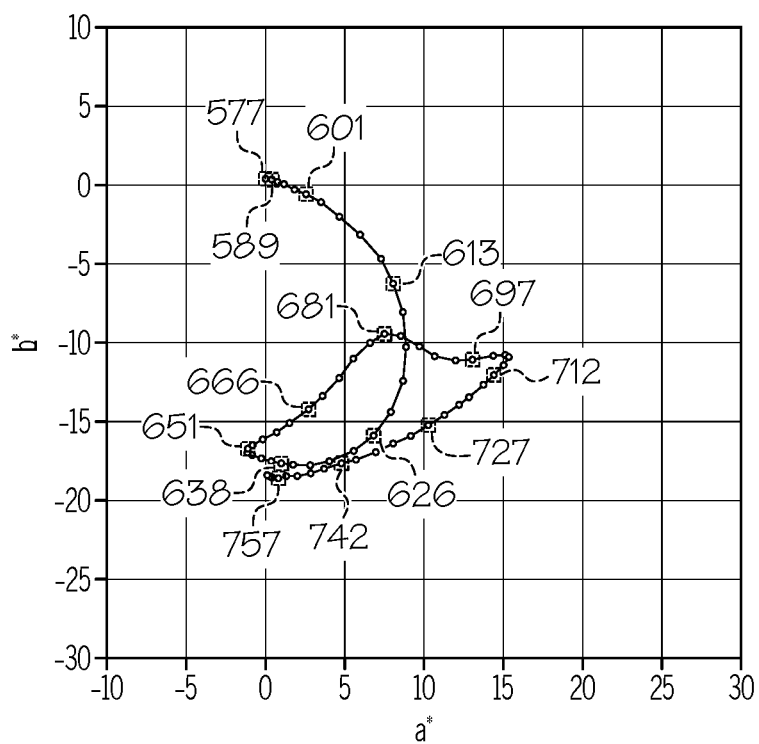
FIG. 4A is a plot of a* vs. b* CIELAB space (x-axis: a*; y-axis: b*) as a function of a heat treatment temperature of a colored glass article made from a glass composition according to one or more embodiments described herein.
Figure 4B:
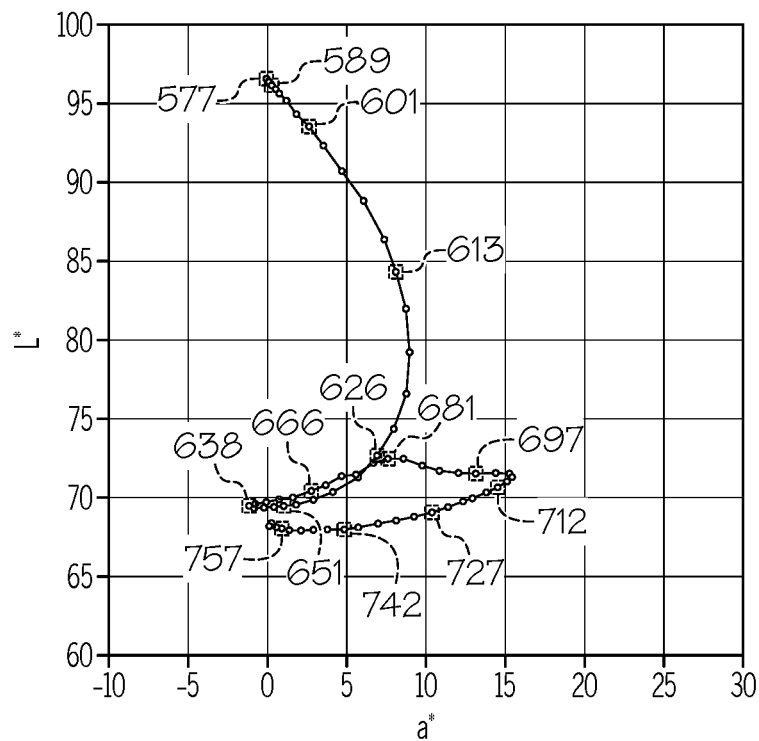
FIG. 4B is a plot of a projected a* vs. L* CIELAB space (x-axis: a*; y-axis: L*) of the colored glass article of FIG. 4A.
Figure 4C:
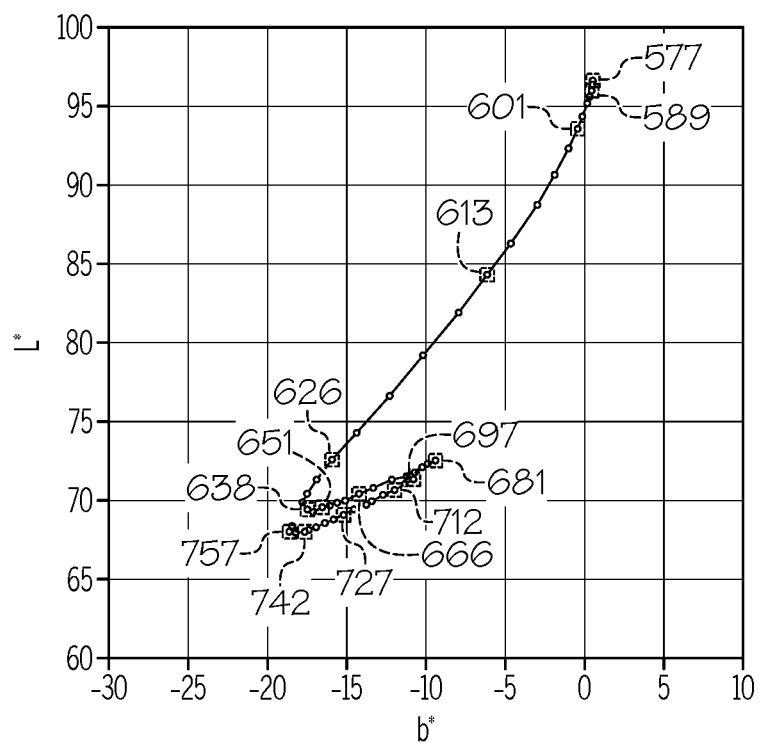
FIG. 4C is a plot of a projected b* vs. L* CIELAB space (x-axis: b*; y-axis: L*) of the colored glass article of FIG. 4A.
Figure 5A:
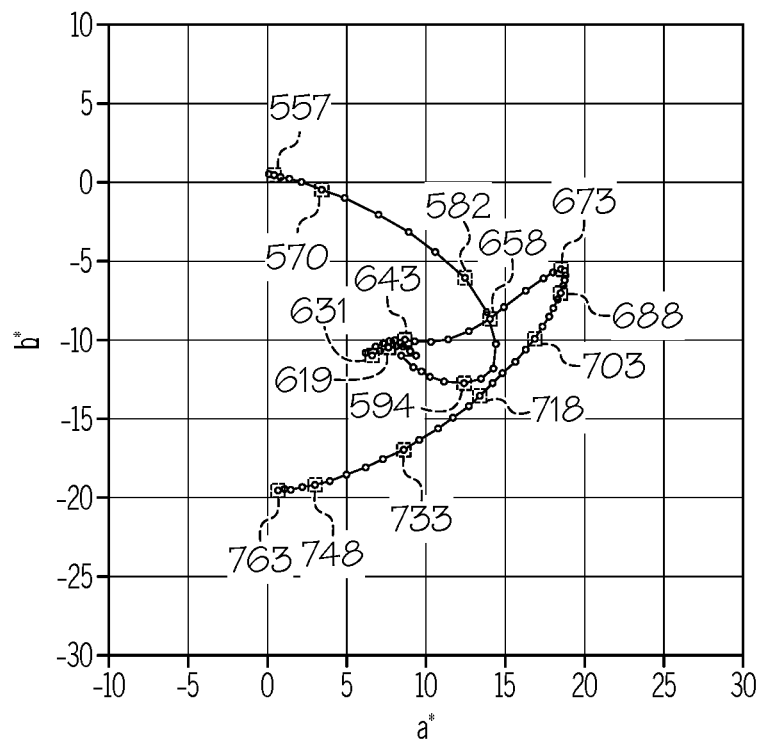
FIG. 5A is a plot of a* vs. b* CIELAB space (x-axis: a*; y-axis: b*) as a function of a heat treatment temperature of a colored glass article made from a glass composition according to one or more embodiments described herein.
Figure 5B:
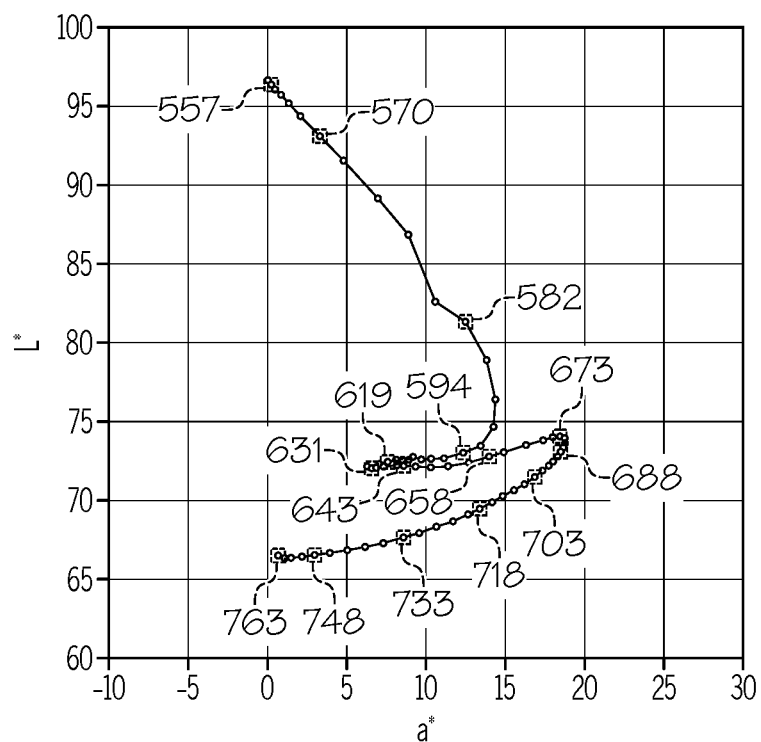
FIG. 5B is a plot of a projected a* vs. L* CIELAB space (x-axis: a*; y-axis: L*) of the colored glass article of FIG. 5A.
Figure 5C:
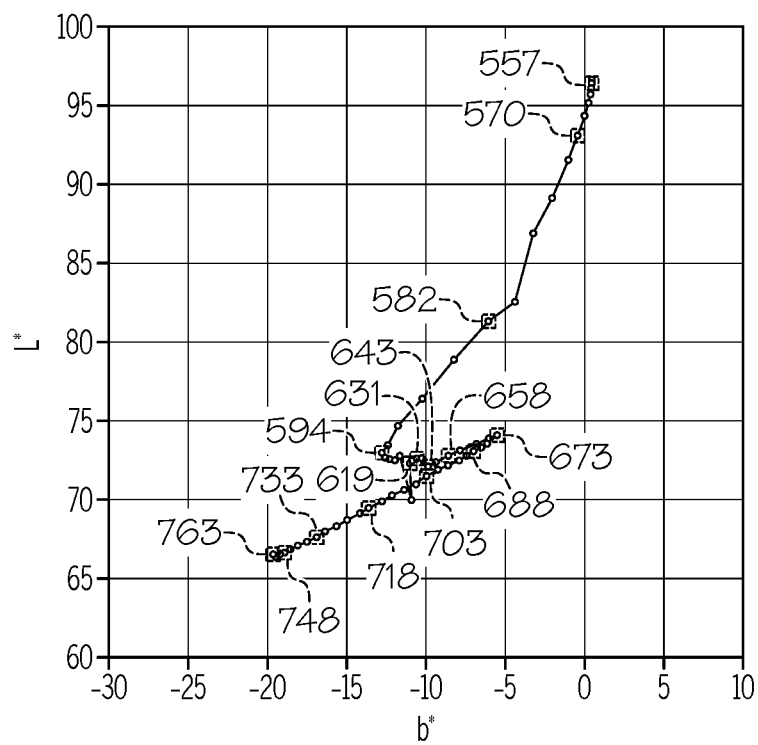
FIG. 5C is a plot of a projected b* vs. L* CIELAB space (x-axis: b*; y-axis: L*) of the colored glass article of FIG. 5A.

The colored glass articles described herein may be used for a variety of applications including, for example, back cover applications in consumer or commercial electronic devices such as smartphones, tablet computers, personal computers, ultrabooks, televisions, and cameras. An exemplary article incorporating any of the colored glass articles disclosed herein is shown in FIGS. 1 and 2. Specifically, FIGS. 1 and 2 show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In embodiments, at least a portion of housing 102, such as the back 106, may include any of the colored glass articles disclosed herein.

EXAMPLES

In order that various embodiments be more readily understood, reference is made to the following examples, which illustrate various embodiments of the colored glass articles described herein.

Heat Treatment—The heat treatment of the Examples below included placing the glass articles between a SiC setter, heating to the indicated heat treatment temperature at a rate of 4° C./min, and cooling from the heat treatment temperature after the heat treatment time had lapsed at a cooling rate of 3° C./min.

Table 1 shows comparative examples C1 and C2 and examples 1-30, with the batch compositions utilized to form each example reported (in terms of mol %). Table 1 also reports the heat treatment used to produce colored glass articles from the batch compositions and the analyzed Au concentration (in terms of mol %) of the resultant colored glass articles.

TABLE 1

| Example | 1 | 2 | 3 | C1 | C2 | 4 |
|---|---|---|---|---|---|---|
| $SiO_2$ | 58.8 | 58.8 | 58.8 | 58.5 | 58.5 | 58.5 |
| $Al_2O_3$ | 16.5 | 16.5 | 16.5 | 16.5 | 16.5 | 16.5 |
| $B_2O_3$ | 6.0 | 6.0 | 6.0 | 6.0 | 6.0 | 6.0 |
| $Li_2O$ | 10.0 | 10.0 | 10.0 | 12.0 | 12.0 | 10.0 |
| $Na_2O$ | 4.5 | 4.5 | 4.5 | 6.5 | 6.5 | 4.5 |
| $K_2O$ | 0.2 | 0.2 | 0.2 | 0.5 | 0.5 | 0.5 |
| MgO | 3.0 | 3.0 | 3.0 | — | — | 3.0 |
| ZnO | 1.0 | 1.0 | 1.0 | — | — | 1.0 |
| $ZrO_2$ | — | — | — | — | — | — |
| $P_2O_5$ | — | — | — | — | — | — |
| $SnO_2$ | — | — | — | — | — | — |
| $Fe_2O_3$ | — | — | — | — | — | — |
| Au | 0.005 | 0.005 | 0.005 | 0.010 | 0.020 | 0.010 |
| $R_2O$ | 14.7 | 14.7 | 14.7 | 19.0 | 19.0 | 15.0 |
| MgO + ZnO | 4.0 | 4.0 | 4.0 | 0.0 | 0.0 | 4.0 |
| $R_2O - Al_2O_3$ | −1.8 | −1.8 | −1.8 | 2.5 | 2.5 | −1.5 |
| $5.72*Al_2O_3 - 21.4*ZnO - 2.5*P_2O_5 - 35*Li_2O - 16.6*B_2O_3 - 20.5*MgO - 23.3*Na_2O - 27.9*SrO - 18.5*K_2O - 26.3*CaO$ | −546.7 | −546.7 | −546.7 | −585.9 | −585.9 | −552.2 |
| HEAT TREATMENT | | | | | | |
| Melting temperature (° C.) | 1550 | 1500 | 1450 | 1450 | 1450 | 1450 |
| Melting time (hours) | 18 | 18 | 18 | 18 | 18 | 18 |
| Analyzed Au (mol %) | 0.0009 | 0.0017 | 0.0018 | 0.0013 | 0.0023 | 0.0030 |
| % of Au retained | 18.0 | 34.0 | 36.0 | 13.0 | 11.5 | 30.0 |

| Example | 5 | 6 | 7 | 8 | 9 | 10 |
|---|---|---|---|---|---|---|
| $SiO_2$ | 58.5 | 60.7 | 60.7 | 60.7 | 60.7 | 60.7 |
| $Al_2O_3$ | 16.5 | 14.5 | 14.5 | 14.5 | 14.5 | 14.5 |
| $B_2O_3$ | 6.0 | 6.0 | 6.0 | 6.0 | 6.0 | 6.0 |
| $Li_2O$ | 10.0 | 10.0 | 10.0 | 10.0 | 10.0 | 10.0 |
| $Na_2O$ | 4.5 | 4.5 | 4.5 | 4.5 | 4.5 | 4.5 |
| $K_2O$ | 0.5 | 0.5 | 0.5 | 0.5 | 0.5 | 0.2 |
| MgO | 3.0 | 3.0 | 3.0 | 3.0 | 3.0 | 3.0 |
| ZnO | 1.0 | 1.0 | 1.0 | 1.0 | 1.0 | 1.0 |
| $ZrO_2$ | — | — | 0.5 | — | 0.5 | 0.5 |
| $P_2O_5$ | — | — | — | 1.0 | 1.0 | — |
| $SnO_2$ | — | 0.10 | 0.10 | 0.10 | 0.10 | 0.05 |
| $Fe_2O_3$ | — | — | — | — | — | — |
| Au | 0.020 | 0.005 | 0.005 | 0.005 | 0.005 | 0.005 |
| $R_2O$ | 15.0 | 15.0 | 15.0 | 15.0 | 15.0 | 14.7 |
| MgO + ZnO | 4.0 | 4.0 | 4.0 | 4.0 | 4.0 | 4.0 |
| $R_2O - Al_2O_3$ | −1.5 | 0.5 | 0.5 | 0.5 | 0.5 | 0.2 |
| $5.72*Al_2O_3 - 21.4*ZnO - 2.5*P_2O_5 - 35*Li_2O - 16.6*B_2O_3 - 20.5*MgO - 23.3*Na_2O - 27.9*SrO - 18.5*K_2O - 26.3*CaO$ | −552.2 | −563.7 | −563.7 | −566.2 | −566.2 | −558.1 |

TABLE 1-continued

| HEAT TREATMENT | | | | | | |
|---|---|---|---|---|---|---|
| Melting temperature (° C.) | 1450 | 1550 | 1550 | 1550 | 1550 | 1550 |
| Melting time (hours) | 18 | 18 | 18 | 18 | 18 | 18 |
| Analyzed Au (mol %) | 0.0043 | 0.0013 | 0.0018 | 0.0006 | 0.0007 | 0.0019 |
| % of Au retained | 21.5 | 26.0 | 36.0 | 12.0 | 14.0 | 38.0 |

| Example | 11 | 12 | 13 | 14 | 15 | 16 |
|---|---|---|---|---|---|---|
| $SiO_2$ | 60.7 | 60.7 | 60.7 | 61.8 | 61.8 | 61.8 |
| $Al_2O_3$ | 14.5 | 14.5 | 14.5 | 14.5 | 14.5 | 14.5 |
| $B_2O_3$ | 6.0 | 6.0 | 6.0 | 6.0 | 6.0 | 6.0 |
| $Li_2O$ | 10.0 | 10.0 | 10.0 | 6.5 | 6.5 | 6.5 |
| $Na_2O$ | 4.5 | 4.5 | 4.5 | 8.0 | 8.0 | 8.0 |
| $K_2O$ | 0.2 | 0.2 | 0.2 | 0.2 | 0.2 | 0.2 |
| MgO | 3.0 | 3.0 | 3.0 | 2.0 | 2.0 | 2.0 |
| ZnO | 1.0 | 1.0 | 1.0 | 1.0 | 1.0 | 1.0 |
| $ZrO_2$ | 0.2 | 0.3 | 0.5 | — | — | 0.2 |
| $P_2O_5$ | — | — | — | — | — | — |
| $SnO_2$ | 0.01 | 0.03 | 0.05 | — | 0.05 | 0.05 |
| $Fe_2O_3$ | — | — | — | — | — | — |
| Au | 0.005 | 0.005 | 0.005 | 0.005 | 0.005 | 0.005 |
| $R_2O$ | 14.7 | 14.7 | 14.7 | 14.7 | 14.7 | 14.7 |
| MgO + ZnO | 4.0 | 4.0 | 4.0 | 3.0 | 3.0 | 3.0 |
| $R_2O - Al_2O_3$ | 0.2 | 0.2 | 0.2 | 0.2 | 0.2 | 0.2 |
| $5.72*Al_2O_3 - 21.4*ZnO - 2.5*P_2O_5 - 35*Li_2O - 16.6*B_2O_3 - 20.5*MgO - 23.3*Na_2O - 27.9*SrO - 18.5*K_2O - 26.3*CaO$ | −558.1 | −558.1 | −558.1 | −496.7 | −496.7 | −496.7 |

| HEAT TREATMENT | | | | | | |
|---|---|---|---|---|---|---|
| Melting temperature (° C.) | 1550 | 1550 | 1550 | 1500 | 1500 | 1500 |
| Melting time (hours) | 18 | 18 | 18 | 18 | 18 | 18 |
| Analyzed Au (mol %) | 0.0013 | 0.0016 | 0.0017 | 0.0009 | 0.0010 | 0.0012 |
| % of Au retained | 26.0 | 32.0 | 34.0 | 18.0% | 20.0% | 24.0% |

| Example | 17 | 18 | 19 | 20 | 21 | 22 |
|---|---|---|---|---|---|---|
| $SiO_2$ | 61.8 | 61.8 | 61.8 | 60.8 | 60.8 | 60.8 |
| $Al_2O_3$ | 14.5 | 14.5 | 14.5 | 15.5 | 15.5 | 15.5 |
| $B_2O_3$ | 6.0 | 6.0 | 6.0 | 6.0 | 6.0 | 6.0 |
| $Li_2O$ | 6.5 | 6.5 | 6.5 | 6.5 | 6.5 | 6.5 |
| $Na_2O$ | 8.0 | 8.0 | 8.0 | 8.0 | 8.0 | 8.0 |
| $K_2O$ | 0.2 | 0.2 | 0.2 | 0.2 | 0.2 | 0.2 |
| MgO | 2.0 | 2.0 | 2.0 | 2.0 | 2.0 | 2.0 |
| ZnO | 1.0 | 1.0 | 1.0 | 1.0 | 1.0 | 1.0 |
| $ZrO_2$ | — | — | 0.2 | — | — | 0.2 |
| $P_2O_5$ | — | — | — | — | — | — |
| $SnO_2$ | — | 0.05 | 0.05 | — | 0.05 | 0.05 |
| $Fe_2O_3$ | — | — | — | — | — | — |
| Au | 0.005 | 0.005 | 0.005 | 0.005 | 0.005 | 0.005 |
| $R_2O$ | 14.7 | 14.7 | 14.7 | 14.7 | 14.7 | 14.7 |
| MgO + ZnO | 3.0 | 3.0 | 3.0 | 3.0 | 3.0 | 3.0 |
| $R_2O - Al_2O_3$ | 0.2 | 0.2 | 0.2 | −0.8 | −0.8 | −0.8 |
| $5.72*Al_2O_3 - 21.4*ZnO - 2.5*P_2O_5 - 35*Li_2O - 16.6*B_2O_3 - 20.5*MgO - 23.3*Na_2O - 27.9*SrO - 18.5*K_2O - 26.3*CaO$ | −496.7 | −496.7 | −496.7 | −490.9 | −490.9 | −490.9 |

TABLE 1-continued

| HEAT TREATMENT | | | | | | |
|---|---|---|---|---|---|---|
| Melting temperature (° C.) | 1500 | 1500 | 1500 | 1500 | 1500 | 1500 |
| Melting time (hours) | 18 | 18 | 18 | 18 | 18 | 18 |
| Analyzed Au (mol %) | 0.0010 | 0.0011 | 0.0014 | 0.0012 | 0.0012 | 0.0012 |
| % of Au retained | 20.0% | 22.0% | 28.0% | 24.0% | 24.0% | 24.0% |

| Example | 23 | 24 | 25 | 26 | 27 | 28 |
|---|---|---|---|---|---|---|
| $SiO_2$ | 61.2 | 61.2 | 60.7 | 60.7 | 60.7 | 60.7 |
| $Al_2O_3$ | 14.5 | 14.5 | 14.5 | 14.5 | 14.5 | 14.5 |
| $B_2O_3$ | 6.0 | 6.0 | 6.0 | 6.0 | 6.0 | 6.0 |
| $Li_2O$ | 6.5 | 6.5 | 8.0 | 9.0 | 9.0 | 9.0 |
| $Na_2O$ | 8.0 | 8.0 | 4.5 | 4.5 | 4.5 | 4.5 |
| $K_2O$ | 0.8 | 0.8 | 0.2 | 0.2 | 0.2 | 0.2 |
| MgO | 2.0 | 2.0 | 4.0 | 4.0 | 3.0 | 4.0 |
| ZnO | 1.0 | 1.0 | 2.0 | 1.0 | 2.0 | 1.0 |
| $ZrO_2$ | — | — | — | — | — | — |
| $P_2O_5$ | — | — | — | — | — | — |
| $SnO_2$ | 0.10 | 0.10 | 0.05 | 0.05 | 0.05 | 0.05 |
| $Fe_2O_3$ | 0.05 | 0.05 | 0.10 | 0.05 | 0.05 | 0.10 |
| Au | 0.005 | 0.005 | 0.005 | 0.005 | 0.005 | 0.005 |
| $R_2O$ | 15.3 | 15.3 | 12.7 | 13.7 | 13.7 | 13.7 |
| MgO + ZnO | 3.0 | 3.0 | 6.0 | 5.0 | 5.0 | 5.0 |
| $R_2O - Al_2O_3$ | 0.8 | 0.8 | -1.8 | -0.8 | -0.8 | -0.8 |
| $5.72*Al_2O_3 - 21.4*ZnO - 2.5*P_2O_5 - 35*Li_2O - 16.6*B_2O_3 - 20.5*MgO - 23.3*Na_2O - 27.9*SrO - 18.5*K_2O - 26.3*CaO$ | -506.8 | -506.8 | -530.0 | -543.6 | -544.5 | -543.6 |

| HEAT TREATMENT | | | | | | |
|---|---|---|---|---|---|---|
| Melting temperature (° C.) | 1500 | 1500 | 1500 | 1500 | 1500 | 1500 |
| Melting time (hours) | 16 | 16 | 18 | 18 | 18 | 18 |
| Analyzed Au (mol %) | 0.0016 | 0.0017 | 0.0005 | 0.0009 | 0.0005 | 0.0006 |
| % of Au retained | 32.0% | 34.0% | 10.0% | 18.0% | 10.0% | 12.0% |

| Example | 29 | 30 |
|---|---|---|
| $SiO_2$ | 61.2 | 61.2 |
| $Al_2O_3$ | 14.5 | 14.5 |
| $B_2O_3$ | 6.0 | 6.0 |
| $Li_2O$ | 6.5 | 6.5 |
| $Na_2O$ | 8.0 | 8.0 |
| $K_2O$ | 0.8 | 0.8 |
| MgO | 2.0 | 2.0 |
| ZnO | 1.0 | 1.0 |
| $ZrO_2$ | — | — |
| $P_2O_5$ | — | — |
| $SnO_2$ | 0.10 | 0.10 |
| $Fe_2O_3$ | 0.05 | 0.05 |
| Au | 0.005 | 0.005 |
| $R_2O$ | 15.3 | 15.3 |
| MgO + ZnO | 3.0 | 3.0 |
| $R_2O - Al_2O_3$ | -0.8 | -0.8 |
| $5.72*Al_2O_3 - 21.4*ZnO - 2.5*P_2O_5 - 35*Li_2O - 16.6*B_2O_3 - 20.5*MgO - 23.3*Na_2O - 27.9*SrO - 18.5*K_2O - 26.3*CaO$ | -544.5 | -544.5 |

TABLE 1-continued

HEAT TREATMENT

| | | |
|---|---|---|
| Melting temperature (° C.) | 1500 | 1500 |
| Melting time (hours) | 18 | 18 |
| Analyzed Au (mol %) | 0.0006 | 0.0013 |
| % of Au retained | 12.0% | 26.0% |

Referring to Table 1, Examples 1-3 were formed from the same glass composition, but melted at different temperatures. Example 1, which was melted at 1550° C., had an Au retention of 18.0%. Examples 2 and 3, which were melted at 1500° C. and 1450° C., respectively, had Au retentions of 34.0% and 36.0%, respectively. As indicated by Examples 1-3, a lower melting temperature favors Au retention. Therefore, it may be desirable to form a glass composition having a lower melting point such that Au retention during processing may be improved.

Comparative Examples C1 and C2 had an Au retention of 13.0% and 11.5%, respectively, after being melted at 1450° C. for 18 hours. Examples 4 and 5, which were similar to Comparative Examples C1 and C2, respectively, but included MgO and ZnO, had Au retentions of 30.0% and 21.5%, respectively, after being melted at 1450° C. for 18 hours. As indicated by Comparative Examples C1 and C2 and Examples 4 and 5, including MgO and ZnO in the glass composition improves Au retention of the resultant colored glass article.

Example 6 had an Au retention of 26.0% after being melted at 1550° C. for 18 hours. Example 7, which was similar to Example 3 but included $ZrO_2$, had an Au retention of 36.0% after being melted at 1550° C. for 18 hours. As indicated by Examples 6 and 7, including $ZrO_2$ in addition to MgO and ZnO in the glass composition improves Au retention of the resultant colored glass article.

Examples 8 and 9, which were similar to Examples 6 and 7, respectively, but included $P_2O_5$, had lower Au retentions of 12.0% and 14.0%, respectively, after being melted at 1550° C. for 18 hours. As indicated by Examples 6-9, including $P_2O_5$ in the glass composition impairs Au retention of the resultant colored glass article.

Examples 10-13, which included $ZrO_2$ and $SnO_2$, had relatively higher Au retentions of 38.0%, 26.0%, 32.0%, and 34%, respectively, after being melted at 1550° C. for 18 hours. As indicated by Examples 10-13, including $SnO_2$ in addition to MgO, ZnO, and $ZrO_2$ in the glass compositions improves Au retention of the resultant colored glass article.

Examples 14 and 17 had an Au retention of 18.0% and 20.0%, respectively, after being melted at 1550° C. for 18 hours. Examples 15 and 18, which were similar to Examples 14 and 17, but included $SnO_2$, had an Au retention of 20.0% and 22%, respectively, after being melted at 1550° C. for 18 hours. As indicated by Examples 15 and 18, including $SnO_2$ in addition to MgO and ZnO in the glass composition improves Au retention of the resultant colored glass article.

Examples 16 and 19, which included $ZrO_2$ and $SnO_2$, had relatively higher Au retentions of 24.0% and 28.0%, respectively, after being melted at 1550° C. for 18 hours. As indicated by Examples 16 and 19, including $SnO_2$ in addition to MgO, ZnO, and $ZrO_2$ in the glass compositions improves Au retention of the resultant colored glass article.

Examples 23 and 24, which included $Fe_2O_3$, had relatively higher Au retentions of 32.0% and 34.0%, respectively, after being melted at 1550° C. for 18 hours. As indicated by Examples 23 and 24, including $Fe_2O_3$ in addition to MgO, ZnO, and $ZrO_2$ in the glass compositions improves Au retention of the resultant colored glass article.

Figure 6A:
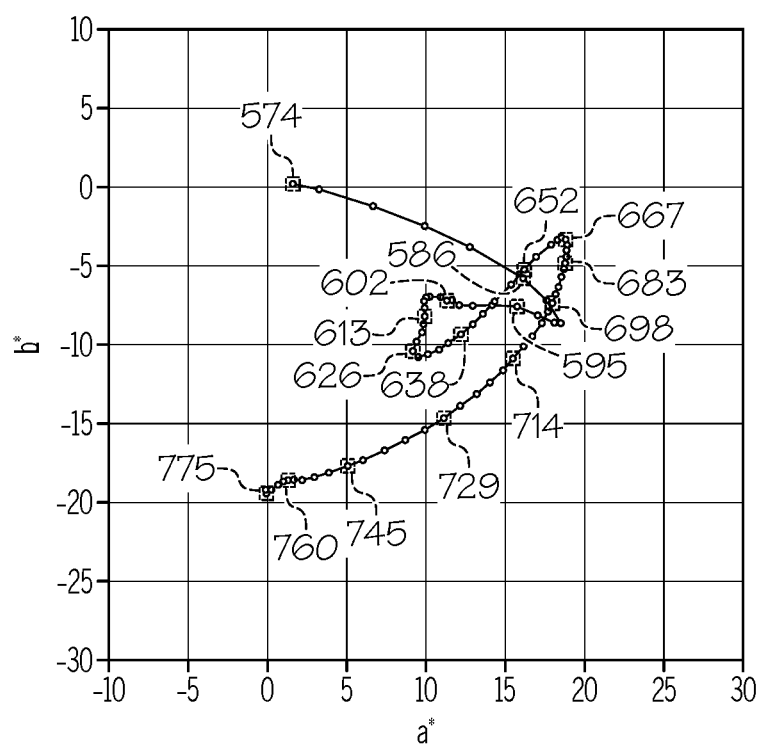
FIG. 6A is a plot of a* vs. b* CIELAB space (x-axis: a*; y-axis: b*) as a function of a heat treatment temperature of a colored glass article made from a glass composition according to one or more embodiments described herein.
Figure 6B:
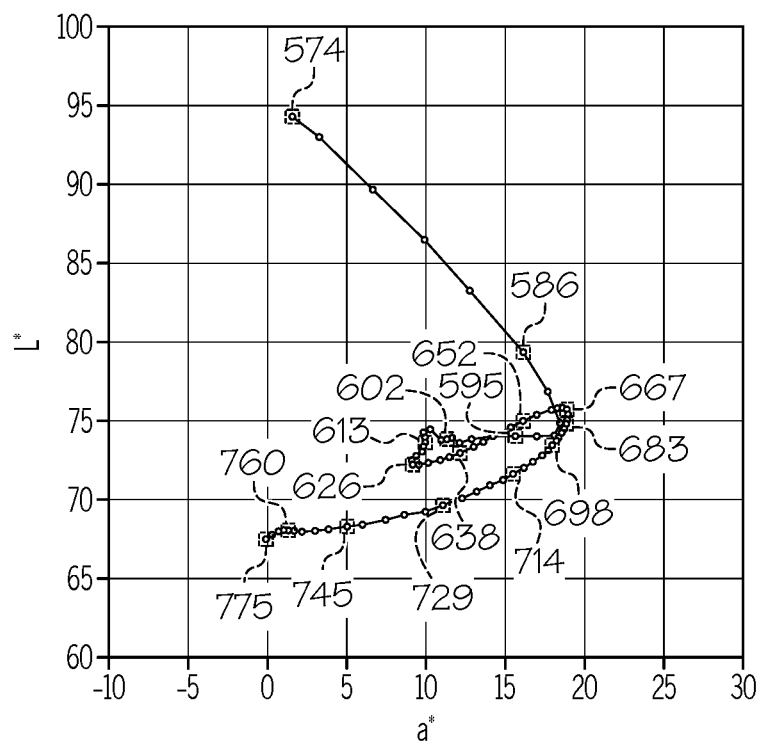
FIG. 6B is a plot of a projected a* vs. L* CIELAB space (x-axis: a*; y-axis: L*) of the colored glass article of FIG. 6A.
Figure 6C:
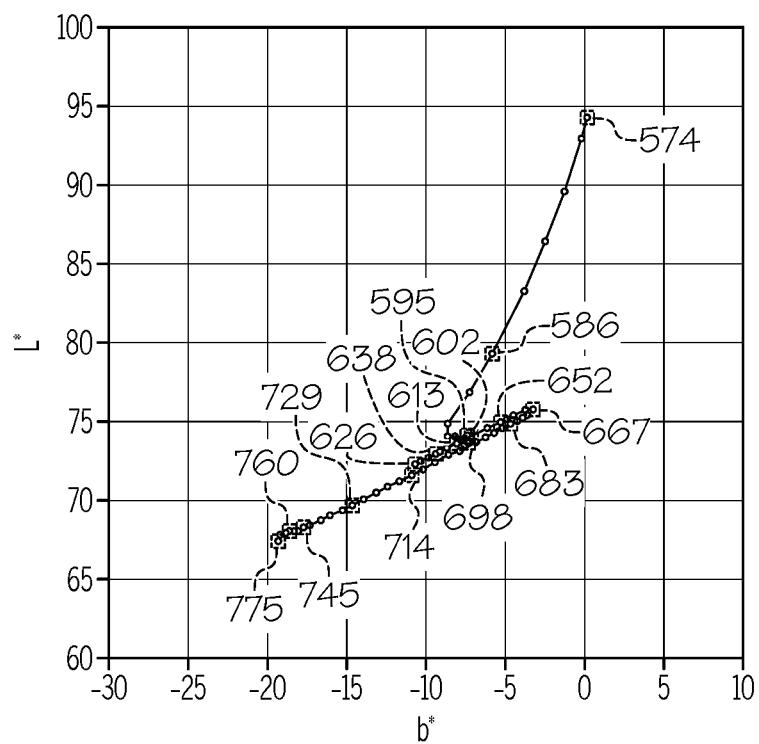
FIG. 6C is a plot of a projected b* vs. L* CIELAB space (x-axis: b*; y-axis: L*) of the colored glass article of FIG. 6A.

Referring now to FIGS. 3A-3C, 4A-4C, 5A-5C, and 6A-6C, a gradient-temperature approach was used to identify the heat treatment cycle parameters (i.e., temperature and duration) to achieve the desired color coordinates. Specifically, a 12 cm long and 1.5 mm thick sample formed from the glass composition of Example 11 was placed in a gradient-temperature oven and held at a heat treatment temperature, which varied along the length of the sample, for the prescribed duration. The sample was then rapidly cooled to quench the sample and the precipitated Au particles therein. Optical transmission spectra were then measured every 2 mm along the direction of the gradient. The coordinates in the CIELAB color space were plotted, as measured under F2 illumination and a 10° standard observer angle, in which the heat treatment temperature moved through the color space with separate plots for the four different heat treatment durations: 0.25 hour (FIGS. 3A-3C), 0.5 hour (FIGS. 4A-4C), 1 hour (FIGS. 5A-5C), and 1.5 hour (FIGS. 6A-6C). As indicated by FIGS. 3A-3C, 4A-4C, 5A-5C, and 6A-6C, different heat treatment temperatures and durations may be used to achieve the desired color.

Note that, as described herein, processing of the glass compositions to produce the resultant colored glass articles may occur in an isothermal oven. However, a gradient-temperature oven was used in these examples to investigate a range of temperatures simultaneously. A gradient-temperature oven produces similar results as an isothermal oven at the desired temperature.

Table 2 shows examples 31-65, with the analyzed concentration (in terms of mol %) of the resultant colored glass articles.

TABLE 2

| Example | 31 | 32 | 33 | 34 | 35 | 36 |
|---|---|---|---|---|---|---|
| $SiO_2$ | 61.09 | 61.03 | 61.08 | 60.99 | 60.87 | 60.73 |
| $Al_2O_3$ | 14.51 | 14.50 | 14.51 | 14.49 | 14.44 | 14.58 |
| $B_2O_3$ | 6.00 | 6.00 | 5.86 | 5.93 | 5.91 | 5.94 |
| $Li_2O$ | 9.94 | 9.94 | 10.07 | 10.10 | 10.01 | 10.10 |
| $Na_2O$ | 4.30 | 4.33 | 4.28 | 4.28 | 4.25 | 4.31 |
| $K_2O$ | 0.19 | 0.19 | 0.19 | 0.19 | 0.45 | 0.19 |
| MgO | 2.89 | 2.90 | 2.89 | 2.89 | 2.89 | 2.93 |
| ZnO | 1.00 | 1.00 | 0.99 | 0.99 | 0.99 | 1.05 |
| $ZrO_2$ | 0.22 | 0.30 | 0.45 | 0.50 | 0.03 | 0.00 |

TABLE 2-continued

| | | | | | | |
|---|---|---|---|---|---|---|
| P$_2$O$_5$ | — | — | — | — | — | — |
| SnO$_2$ | 0.02 | 0.03 | 0.05 | 0.07 | 0.11 | 0.11 |
| Fe$_2$O$_3$ | 0.02 | 0.02 | 0.02 | 0.02 | 0.02 | 0.00 |
| Au | 0.0013 | 0.0015 | 0.0017 | 0.0019 | 0.0013 | 0.0009 |
| R$_2$O | 14.43 | 14.46 | 14.54 | 14.57 | 14.71 | 14.60 |
| MgO + ZnO | 3.89 | 3.90 | 3.88 | 3.88 | 3.88 | 3.98 |
| R$_2$O − Al$_2$O$_3$ | −0.08 | −0.04 | 0.03 | 0.08 | 0.27 | 0.02 |
| 5.72*Al$_2$O$_3$ − 21.4*ZnO − 2.5*P$_2$O$_5$ − 35*Li$_2$O − 16.6*B$_2$O$_3$ − 20.5*MgO − 23.3 *Na$_2$O − 27.9*SrO − 18.5*K$_2$O − 26.3*CaO | −548.9 | −549.8 | −550.4 | −552.7 | −553.6 | −555.2 |

| Example | 37 | 38 | 39 | 40 | 41 | 42 |
|---|---|---|---|---|---|---|
| SiO$_2$ | 61.26 | 60.71 | 59.87 | 60.15 | 59.28 | 61.36 |
| Al$_2$O$_3$ | 14.38 | 14.65 | 14.86 | 15.43 | 15.07 | 15.72 |
| B$_2$O$_3$ | 5.89 | 5.95 | 5.95 | 5.88 | 5.70 | 6.00 |
| Li$_2$O | 10.00 | 10.05 | 10.14 | 10.01 | 9.80 | 10.21 |
| Na$_2$O | 4.28 | 4.30 | 4.31 | 4.27 | 6.03 | 4.34 |
| K$_2$O | 0.19 | 0.19 | 0.19 | 0.19 | 0.18 | 0.20 |
| MgO | 2.86 | 2.93 | 3.11 | 2.89 | 2.80 | 0.97 |
| ZnO | 1.01 | 1.06 | 1.09 | 1.02 | 0.99 | 1.05 |
| ZrO$_2$ | 0.00 | 0.00 | 0.32 | 0.00 | 0.00 | 0.00 |
| P$_2$O$_5$ | — | — | — | — | — | — |
| SnO$_2$ | 0.06 | 0.05 | 0.05 | 0.11 | 0.10 | 0.11 |
| Fe$_2$O$_3$ | 0.00 | 0.07 | 0.07 | 0.00 | 0.00 | 0.00 |
| Au | 0.0007 | 0.0005 | 0.0007 | 0.0008 | 0.0005 | 0.0010 |
| R$_2$O | 14.47 | 14.54 | 14.64 | 14.47 | 16.01 | 14.75 |
| MgO + ZnO | 3.87 | 3.99 | 4.20 | 3.91 | 3.79 | 2.02 |
| R$_2$O − Al$_2$O$_3$ | 0.09 | −0.11 | −0.22 | −0.96 | 0.94 | −0.97 |
| 5.72*Al$_2$O$_3$ − 21.4*ZnO − 2.5*P$_2$O$_5$ − 35*Li$_2$O − 16.6*B$_2$O$_3$ − 20.5*MgO − 23.3 *Na$_2$O − 27.9*SrO − 18.5*K$_2$O − 26.3*CaO | −549.0 | −553.2 | −559.7 | −543.8 | −573.8 | −514.2 |

| Example | 43 | 44 | 45 | 46 | 47 | 48 |
|---|---|---|---|---|---|---|
| SiO$_2$ | 60.94 | 59.36 | 60.40 | 60.59 | 60.56 | 60.64 |
| Al$_2$O$_3$ | 16.51 | 16.42 | 15.52 | 15.32 | 15.23 | 15.08 |
| B$_2$O$_3$ | 5.89 | 5.78 | 6.05 | 6.04 | 6.04 | 6.01 |
| Li$_2$O | 10.05 | 9.90 | 10.66 | 10.65 | 10.63 | 10.74 |
| Na$_2$O | 4.27 | 4.22 | 4.77 | 4.79 | 4.89 | 4.90 |
| K$_2$O | 0.19 | 0.19 | 0.19 | 0.19 | 0.20 | 0.20 |
| MgO | 0.97 | 2.94 | 0.97 | 0.97 | 0.98 | 0.97 |
| ZnO | 1.03 | 1.03 | 1.02 | 1.02 | 1.05 | 1.05 |
| ZrO$_2$ | 0.00 | 0.00 | 0.31 | 0.32 | 0.31 | 0.32 |
| P$_2$O$_5$ | — | — | — | — | — | — |
| SnO$_2$ | 0.10 | 0.11 | 0.05 | 0.06 | 0.06 | 0.05 |
| Fe$_2$O$_3$ | — | — | — | — | — | — |
| Au | 0.0010 | 0.0006 | 0.0008 | 0.0008 | 0.0008 | 0.0007 |
| R$_2$O | 14.51 | 14.31 | 15.62 | 15.63 | 15.72 | 15.84 |
| MgO + ZnO | 2.00 | 3.97 | 1.99 | 1.99 | 2.03 | 2.02 |
| R$_2$O − Al$_2$O$_3$ | −2.00 | −2.11 | 0.10 | 0.31 | 0.49 | 0.76 |
| 5.72*Al$_2$O$_3$ − 21.4*ZnO − 2.5*P$_2$O$_5$ − 35*Li$_2$O − 16.6*B$_2$O$_3$ − 20.5*MgO − 23.3 *Na$_2$O − 27.9*SrO − 18.5*K$_2$O − 26.3*CaO | −500.0 | −532.7 | −541.1 | −542.2 | −545.4 | −549.6 |

TABLE 2-continued

| Example | 49 | 50 | 51 | 52 | 53 | 54 |
|---|---|---|---|---|---|---|
| $SiO_2$ | 60.94 | 59.36 | 60.40 | 60.59 | 62.14 | 62.08 |
| $Al_2O_3$ | 16.51 | 16.42 | 15.52 | 15.32 | 14.95 | 14.98 |
| $B_2O_3$ | 5.89 | 5.78 | 6.05 | 6.04 | 6.06 | 5.93 |
| $Li_2O$ | 10.05 | 9.90 | 10.66 | 10.65 | 10.51 | 10.69 |
| $Na_2O$ | 4.27 | 4.22 | 4.77 | 4.79 | 4.29 | 4.31 |
| $K_2O$ | 0.19 | 0.19 | 0.19 | 0.19 | 0.14 | 0.14 |
| MgO | 0.97 | 2.94 | 0.97 | 0.97 | 0.50 | 0.50 |
| ZnO | 1.03 | 1.03 | 1.02 | 1.02 | 1.03 | 1.00 |
| $ZrO_2$ | 0.00 | 0.00 | 0.31 | 0.32 | 0.29 | 0.29 |
| $P_2O_5$ | — | — | — | — | — | — |
| $SnO_2$ | 0.10 | 0.11 | 0.05 | 0.06 | 0.04 | 0.04 |
| $Fe_2O_3$ | — | — | — | — | 0.04 | 0.04 |
| Au | 0.0008 | 0.0010 | 0.0012 | 0.0015 | 0.0014 | 0.0011 |
| $R_2O$ | 14.51 | 14.31 | 15.62 | 15.63 | 14.94 | 15.14 |
| MgO + ZnO | 2.00 | 3.97 | 1.99 | 1.99 | 1.54 | 1.51 |
| $R_2O - Al_2O_3$ | −2.00 | −2.11 | 0.10 | 0.31 | −0.01 | 0.16 |
| $5.72*Al_2O_3 - 21.4*ZnO - 2.5*P_2O_5 - 35*Li_2O - 16.6*B_2O_3 - 20.5*MgO - 23.3*Na_2O - 27.9*SrO - 18.5*K_2O - 26.3*CaO$ | −556.1 | −558.4 | −557.7 | −558.9 | −517.8 | −521.6 |

| Example | 55 | 56 | 57 | 58 | 59 | 60 |
|---|---|---|---|---|---|---|
| $SiO_2$ | 62.06 | 61.95 | 61.95 | 61.67 | 61.01 | 60.66 |
| $Al_2O_3$ | 14.92 | 14.87 | 14.88 | 14.88 | 14.96 | 15.03 |
| $B_2O_3$ | 5.92 | 5.91 | 5.92 | 5.93 | 6.04 | 6.06 |
| $Li_2O$ | 10.86 | 11.03 | 11.04 | 11.06 | 11.18 | 11.21 |
| $Na_2O$ | 4.25 | 4.24 | 4.24 | 4.25 | 4.26 | 4.28 |
| $K_2O$ | 0.14 | 0.14 | 0.14 | 0.14 | 0.14 | 0.14 |
| MgO | 0.50 | 0.50 | 0.49 | 0.50 | 0.50 | 0.50 |
| ZnO | 1.01 | 1.02 | 1.01 | 1.02 | 1.03 | 1.03 |
| $ZrO_2$ | 0.28 | 0.28 | 0.28 | 0.28 | 0.28 | 0.28 |
| $P_2O_5$ | — | — | — | 0.21 | 0.56 | 0.76 |
| $SnO_2$ | 0.04 | 0.04 | 0.04 | 0.04 | 0.04 | 0.04 |
| $Fe_2O_3$ | 0.02 | 0.01 | — | — | — | — |
| Au | 0.0010 | 0.0010 | 0.0011 | 0.0010 | 0.0010 | 0.0010 |
| $R_2O$ | 15.25 | 15.41 | 15.42 | 15.46 | 15.58 | 15.63 |
| MgO + ZnO | 1.51 | 1.52 | 1.50 | 1.52 | 1.53 | 1.54 |
| $R_2O - Al_2O_3$ | 0.33 | 0.54 | 0.55 | 0.58 | 0.62 | 0.60 |
| $5.72*Al_2O_3 - 21.4*ZnO - 2.5*P_2O_5 - 35*Li_2O - 16.6*B_2O_3 - 20.5*MgO - 23.3*Na_2O - 27.9*SrO - 18.5*K_2O - 26.3*CaO$ | −526.5 | −532.6 | −532.8 | −534.9 | −541.5 | −543.7 |

| Example | 61 | 62 | 63 | 64 | 65 |
|---|---|---|---|---|---|
| $SiO_2$ | 60.51 | 60.49 | 60.80 | 60.94 | 61.47 |
| $Al_2O_3$ | 15.06 | 15.02 | 14.76 | 14.61 | 14.60 |
| $B_2O_3$ | 6.06 | 6.07 | 6.05 | 5.97 | 5.91 |
| $Li_2O$ | 11.21 | 11.22 | 11.20 | 11.17 | 11.12 |
| $Na_2O$ | 4.30 | 4.30 | 4.29 | 4.29 | 4.27 |
| $K_2O$ | 0.14 | 0.14 | 0.14 | 0.15 | 0.15 |
| MgO | 0.51 | 0.51 | 0.51 | 0.51 | 0.50 |
| ZnO | 1.03 | 1.04 | 1.03 | 1.03 | 1.04 |
| $ZrO_2$ | 0.28 | 0.28 | 0.28 | 0.48 | 0.50 |
| $P_2O_5$ | 0.86 | 0.89 | 0.90 | 0.81 | 0.40 |
| $SnO_2$ | 0.04 | 0.04 | 0.04 | 0.04 | 0.04 |
| $Fe_2O_3$ | — | — | — | — | — |
| Au | 0.0009 | 0.0010 | 0.0009 | 0.0011 | 0.0010 |
| $R_2O$ | 15.65 | 15.67 | 15.63 | 15.61 | 15.53 |
| MgO + ZnO | 1.54 | 1.54 | 1.53 | 1.54 | 1.54 |
| $R_2O - Al_2O_3$ | 0.59 | 0.65 | 0.87 | 1.00 | 0.93 |

TABLE 2-continued

| | | | | | |
|---|---|---|---|---|---|
| 5.72*$Al_2O_3$ – 21.4*ZnO – 2.5*$P_2O_5$ – 35*$Li_2O$ – 16.6*$B_2O_3$ – 20.5*MgO – 23.3*$Na_2O$ – 27.9*SrO – 18.5*$K_2O$ – 26.3*CaO | −544.2 | −545.2 | −545.1 | −543.6 | −539.3 |

Referring now to Table 3, example glass articles 31-35 having the concentrations shown in Table 2 were subjected to isothermal heat treatment between 600° C. and 660° C. The observable colors of the resultant colored glass articles are shown in Table 3. Heat treating glass articles E31, E32, and E33 having an analyzed $R_2O$—$Al_2O_3$ of −0.08 mol %, −0.04 mol %, and 0.03 mol %, respectively, resulted in observably pink, purple, and red colored glass articles. Heat treating glass articles E34 and E35, having an analyzed $R_2O$—$Al_2O_3$ of 0.08 mol % and 0.27 mol %, respectively, resulted in observably red and orange colored glass articles. As indicated by Tables 2 and 3, the analyzed $R_2O$—$Al_2O_3$ of a glass article may be adjusted and the glass article may be subjected to a certain heat treatment to provide a desired colored glass article.

TABLE 3

| | Example | | | | |
|---|---|---|---|---|---|
| | 31 | 32 | 33 | 34 | 35 |
| Observable colors | pink, purple | pink, purple | pink, purple | pink, red, purple | orange, red |

Referring now to Table 4, example glass articles 36-48 having the analyzed concentrations shown in Table 2 were subjected to heat treatment at the temperature and for the period of time shown in Table 4. The observable colors of the resultant colored glass articles are shown in Table 4.

TABLE 4

| Heat treatment | 550° C. for 2 hrs. | 575° C. for 2 hrs. | 600° C. for 2 hrs. | 625° C. for 2 hrs. | 650° C. for 2 hrs. |
|---|---|---|---|---|---|
| 36 | purple | purple | purple | purple | — |
| 37 | clear, purple | purple | purple | red | — |
| 38 | pink | pink | pink | pink | — |
| 39 | red | red | red | red | — |
| 40 | clear, purple | purple | purple | purple | — |
| 41 | orange | orange | orange | orange | — |
| 42 | clear, purple | purple | purple | purple | — |
| 43 | clear | clear | purple | purple | — |
| 44 | clear | clear | purple | purple | — |
| 45 | purple | purple | purple | red | red |
| 46 | clear, purple | purple | purple | red | red |
| 47 | purple | purple | red | red | red |
| 48 | purple | purple | red | red | red |

Example glass article E41, having an analyzed $R_2O$—$Al_2O_3$ of 0.94 mol %, was the only glass article to result in an observably orange colored glass article after heat treatment. Example glass articles E36-E40 and E42-E48 had an $R_2O$—$Al_2O_3$ of 0.76 mol % or less. Heat treating glass article E38, including $Fe_2O_3$, resulted in an observably pink colored glass article. Heat treating glass articles E39 and E45-48, including $ZrO_2$, resulted in red colored glass articles. As indicated by Tables 2 and 4, the analyzed $R_2O$—$Al_2O_3$ may be adjusted, additional components may be added to the glass composition, and the glass article may be subjected to a certain heat treatment to provide a desired colored glass article.

Table 5 shows examples 66-75, with the analyzed concentration (in terms of mol %) of the resultant colored glass articles.

TABLE 5

| Example | 66 | 67 | 68 | 69 | 70 | 71 |
|---|---|---|---|---|---|---|
| $SiO_2$ | 62.15 | 62.27 | 62.22 | 62.19 | 62.08 | 61.95 |
| $Al_2O_3$ | 14.93 | 14.97 | 14.90 | 14.95 | 14.98 | 14.87 |
| $B_2O_3$ | 6.09 | 5.98 | 6.03 | 6.03 | 5.93 | 5.91 |
| $Li_2O$ | 10.50 | 10.45 | 10.53 | 10.50 | 10.69 | 11.03 |
| $Na_2O$ | 4.30 | 4.30 | 4.28 | 4.27 | 4.31 | 4.24 |
| $K_2O$ | 0.14 | 0.14 | 0.14 | 0.14 | 0.14 | 0.14 |
| MgO | 0.50 | 0.50 | 0.50 | 0.50 | 0.50 | 0.50 |
| ZnO | 1.03 | 1.00 | 1.03 | 1.04 | 1.00 | 1.02 |
| $ZrO_2$ | 0.28 | 0.29 | 0.28 | 0.29 | 0.29 | 0.28 |
| $P_2O_5$ | 0.00 | 0.00 | 0.00 | 0.00 | 0.00 | 0.00 |
| $SnO_2$ | 0.04 | 0.04 | 0.04 | 0.04 | 0.04 | 0.04 |
| $Fe_2O_3$ | 0.04 | 0.04 | 0.04 | 0.04 | 0.04 | 0.01 |

TABLE 5-continued

| Au | $6.0 \times 10^{-6}$ | $9.0 \times 10^{-6}$ | $1.2 \times 10^{-5}$ | $1.1 \times 10^{-5}$ | $8.0 \times 10^{-6}$ | $1.0 \times 10^{-5}$ |
|---|---|---|---|---|---|---|
| $R_2O$ | 14.94 | 14.89 | 14.95 | 14.91 | 15.14 | 15.41 |
| MgO + ZnO | 1.53 | 1.50 | 1.53 | 1.54 | 1.50 | 1.52 |
| $R_2O - Al_2O_3$ | 0.01 | −0.08 | 0.05 | −0.04 | 0.16 | 0.54 |
| $5.72*Al_2O_3 - 21.4*ZnO - 2.5*P_2O_5 - 35*Li_2O - 16.6*B_2O_3 - 20.5*MgO - 23.3 *Na_2O - 27.9*SrO - 18.5*K_2O - 26.3*CaO$ | −518.27 | −513.82 | −518.03 | −516.67 | −521.57 | −532.56 |

| Example | 72 | 73 | 74 | 75 |
|---|---|---|---|---|
| $SiO_2$ | 61.67 | 61.47 | 62.75 | 61.67 |
| $Al_2O_3$ | 14.88 | 14.60 | 14.47 | 14.88 |
| $B_2O_3$ | 5.93 | 5.91 | 5.88 | 5.93 |
| $Li_2O$ | 11.06 | 11.12 | 11.07 | 11.06 |
| $Na_2O$ | 4.25 | 4.27 | 4.27 | 4.25 |
| $K_2O$ | 0.14 | 0.15 | 0.15 | 0.14 |
| MgO | 0.50 | 0.50 | 0.29 | 0.50 |
| ZnO | 1.02 | 1.04 | 0.47 | 1.02 |
| $ZrO_2$ | 0.28 | 0.50 | 0.52 | 0.28 |
| $P_2O_5$ | 0.21 | 0.40 | 0.08 | 0.21 |
| $SnO_2$ | 0.04 | 0.04 | 0.04 | 0.04 |
| $Fe_2O_3$ | 0.00 | 0.00 | 0.00 | 0.00 |
| Au | $8.3 \times 10^{-6}$ | $8.3 \times 10^{-6}$ | $8.3 \times 10^{-6}$ | $8.3 \times 10^{-6}$ |
| $R_2O$ | 15.45 | 15.54 | 15.49 | 15.45 |
| MgO + ZnO | 1.52 | 1.54 | 0.76 | 1.52 |
| $R_2O - Al_2O_3$ | 0.57 | 0.94 | 1.02 | 0.57 |
| $5.72*Al_2O_3 - 21.4*ZnO - 2.5*P_2O_5 - 35*Li_2O - 16.6*B_2O_3 - 20.5*MgO - 23.3 *Na_2O - 27.9*SrO - 18.5*K_2O - 26.3*CaO$ | −534.64 | −539.57 | −520.76 | −534.64 |

Referring now to Table 6, example glass articles 66 and 68-75 having the analyzed concentrations shown in Table 5 were subjected to heat treatment at the temperature and for the period of time shown in Table 6. The observable colors of the resultant colored glass articles are shown in Table 6.

TABLE 6

| Heat treatment | 550° C. for 2 hrs. | 575° C. for 2 hrs. | 600° C. for 2 hrs. | 625° C. for 2 hrs. | 650° C. for 2 hrs. | 550° C. for 8 hrs. | 575° C. for 8 hrs. |
|---|---|---|---|---|---|---|---|
| 66 | — | blue | blue | blue | — | — | — |
| 68 | — | blue | blue | red | — | — | — |
| 69 | — | purple | purple | red | — | — | — |
| 70 | red | purple | blue | blue | — | — | — |
| 71 | clear, purple | blue | blue | purple | — | — | — |
| 72 | clear, purple | purple | purple | purple | — | — | — |
| 73 | clear, purple | purple | purple | purple | — | — | — |
| 74 | clear, purple | purple | purple | red | red | red | red |
| 75 | — | — | purple | red | red | purple | red |

Example glass articles 71-75, having an analyzed $R_2O$—$Al_2O_3$ of greater than or equal to 0.54 mol %, had a relatively limited achievable color gamut after being subjected to different heat treatments. As indicated by Table 6, a relatively increased $R_2O$—$Al_2O_3$ may limit the achievable color gamut of the colored glass article.

Referring now to Table 7, example glass article 66 having the analyzed concentrations shown in Table 5 and the thicknesses shown in Table 7 were subjected to heat treatment at the temperature and for the period of time shown in Table 7. The transmittance color coordinate in the CIELAB color space, as measured at the indicated article thickness under F2 illumination and a 10° standard observer angle, and the observable color of the resultant colored glass articles are shown in Table 7.

TABLE 7

| Thickness | | 525° C. for 6 hrs. | 535° C. for 6 hrs. | 535° C. for 10 hrs. | 545° C. for 10 hrs. | 57° C. for 2 hrs. |
|---|---|---|---|---|---|---|
| | L* | 96.39 | 95.09 | 92.01 | 91.06 | 92.75 |
| | a* | 0.15 | 1.68 | 4.21 | 2.53 | -0.60 |
| | b* | 0.27 | -0.12 | -2.12 | -3.64 | -2.62 |
| | Observable color | clear | pink | pink | purple | blue |
| 1.33 mm | L* | 96.14 | 94.18 | 86.80 | 84.96 | 87.95 |
| | a* | 0.31 | 2.60 | 8.81 | 3.50 | -1.67 |
| | b* | 0.42 | -0.09 | -4.55 | -7.99 | -5.86 |
| | Observable color | clear | pink | pink | purple | blue |
| 2.06 mm | L* | 95.69 | 90.65 | 83.19 | 78.95 | 83.25 |
| | a* | 0.55 | 6.37 | 13.52 | 6.58 | -3.01 |
| | b* | 0.63 | -0.97 | -4.53 | -11.46 | -8.40 |
| | Observable color | clear | pink | pink | purple | blue |
| 0.6 mm | L* | 93.60 | 92.21 | | | |
| | a* | -0.61 | -0.12 | | | |
| | b* | -0.60 | -1.91 | | | |
| | Observable color | blue | blue | | | |
| 1.33 mm | L* | 90.23 | 87.41 | | | |
| | a* | -1.34 | -0.15 | | | |
| | b* | -1.72 | -4.02 | | | |
| | Observable color | blue | blue | | | |
| 2.06 mm | L* | 86.49 | 82.29 | | | |
| | a* | -2.05 | -0.24 | | | |
| | b* | -2.30 | -5.93 | | | |
| | Observable color | blue | blue | | | |

Referring now to Table 8, example glass article 68 having the analyzed concentrations shown in Table 5 and the thicknesses shown in Table 8 were subjected to heat treatment at the temperature and for the period of time shown in Table 8. The transmittance color coordinate in the CIELAB color space, as measured at the indicated article thickness under F2 illumination and a 10° standard observer angle, and the observable color of the resultant colored glass articles are shown in Table 8.

TABLE 8

| Thickness | | 545° C. for 2 hrs. | 550° C. for 2 hrs. | 555° C. for 1.5 hrs. | 535° C. for 10 hrs. | 545° C. for 4 hrs. |
|---|---|---|---|---|---|---|
| 0.6 mm | L* | 93.11 | 92.14 | 91.56 | 91.16 | 90.79 |
| | a* | 3.74 | 4.82 | 4.74 | 6.02 | 5.90 |
| | b* | -0.62 | -1.31 | -2.06 | -0.27 | -1.33 |
| | Observable color | pink | pink | pink | red | pink |
| 1.33 mm | L* | 89.09 | 87.26 | 86.79 | 85.12 | 84.78 |
| | a* | 7.98 | 9.84 | 9.46 | 12.00 | 11.74 |
| | b* | -1.42 | -2.58 | -3.64 | -0.72 | -2.32 |
| | Observable color | pink | purple | pink | red | pink |
| 2.06 mm | L* | 84.41 | 81.51 | 81.40 | 79.52 | 78.50 |
| | a* | 12.63 | 15.29 | 14.09 | 17.14 | 17.21 |
| | b* | -2.25 | -4.01 | -5.39 | -0.26 | -3.16 |
| | Observable color | pink | purple | pink | red | red |
| 0.6 mm | L* | 92.14 | 89.13 | 88.96 | 88.74 | 89.18 |
| | a* | 4.61 | 5.00 | 4.90 | 2.75 | -1.05 |
| | b*-1.57 | | -1.57 | -3.95 | -4.51 | -4.49 | -4.32 |
| | Observable color | pink | purple | purple | purple | purple |
| 1.33 mm | L* | 85.56 | 81.32 | 79.76 | 80.41 | 79.58 |
| | a* | 10.56 | 10.79 | 7.38 | 5.66 | -2.04 |
| | b* | -4.34 | -7.51 | -10.45 | -9.10 | -9.85 |
| | Observable color | pink | purple | purple | purple | purple |
| 2.06 mm | L* | 77.01 | 74.55 | 70.91 | 71.91 | 71.33 |
| | a* | 16.22 | 16.05 | 8.60 | 8.16 | -2.76 |
| | b* | -8.50 | -9.19 | -15.68 | -13.36 | -14.14 |

TABLE 8-continued

| Thickness | | 545° C. for 2 hrs. | 550° C. for 2 hrs. | 555° C. for 1.5 hrs. | 535° C. for 10 hrs. | 545° C. for 4 hrs. |
|---|---|---|---|---|---|---|
| 0.6 mm | Observablev | pink | pink | purple | purple | purple |
| | L* | 88.09 | 88.92 | | | |
| | a* | −01.8 | 1.77 | | | |
| | b* | −5.64 | −4.80 | | | |
| | Observable color | blue | blue | | | |
| 1.33 mm | L* | 78.27 | 80.57 | | | |
| | a* | 0.17 | 3.42 | | | |
| | b* | −11.89 | −9.88 | | | |
| | Observable color | blue | blue | | | |
| 2.06 mm | L* | 70.17 | 72.06 | | | |
| | a* | −0.58 | 4.74 | | | |
| | b* | −16.48 | −14.79 | | | |
| | Observable color | blue | blue | | | |

Referring now to Table 9, example glass article 68 having the analyzed concentrations shown in Table 5 and the thicknesses shown in Table 9 were subjected to heat treatment at the temperature and for the period of time shown in Table 9. The transmittance color coordinate in the CIELAB color space, as measured at the indicated article thickness under F2 illumination and a 10° standard observer angle, and the observable color of the resultant colored glass articles are shown in Table 9.

TABLE 9

| Thickness | | 530° C. for 3 hrs. | 535° C. for 6 hrs. | 545° C. for 2 hrs. | 550° C. for 2 hrs. | 555° C. for 1.5 hrs. |
|---|---|---|---|---|---|---|
| 0.6 mm | L* | 94.72 | 90.50 | 89.99 | 88.79 | 88.58 |
| | a* | 1.96 | 6.78 | 7.30 | 7.58 | 7.50 |
| | b* | 0.34 | 0.18 | −0.85 | −1.80 | −2.57 |
| | Observable color | pink | pink | pink | pink | pink |
| 1.33 mm | L* | 92.64 | 84.15 | 83.50 | 80.52 | 79.57 |
| | a* | 3.99 | 13.49 | 14.01 | 14.51 | 14.41 |
| | b* | 0.62 | 0.67 | −0.95 | −3.71 | −5.60 |
| | Observable color | pink | red | red | pink | pink |
| 2.06 mm | L* | 90.49 | 77.92 | 74.81 | 72.37 | 71.79 |
| | a* | 6.07 | 19.65 | 21.74 | 20.56 | 21.07 |
| | b* | 0.97 | 1.59 | −1.98 | −5.27 | −6.54 |
| | Observable color | pink | red | pink | pink | pink |
| 0.6 mm | L* | 88.59 | 87.25 | 88.03 | 86.62 | 87.36 |
| | a* | 6.20 | 7.01 | 4.98 | 3.98 | 2.37 |
| | b* | −2.50 | −4.14 | −4.41 | −5.65 | −5.52 |
| | Observable color | purple | purple | purple | purple | purple |
| 1.33 mm | L* | 80.63 | 77.89 | 78.78 | 76.92 | 77.59 |
| | a* | 13.13 | 13.81 | 10.10 | 8.92 | 5.17 |
| | b* | −3.71 | −7.35 | −8.78 | −10.22 | −10.98 |
| | Observable color | purple | purple | purple | purple | purple |
| 2.06 mm | L* | 71.87 | 68.47 | 70.21 | 67.15 | 68.17 |
| | a* | 18.44 | 19.71 | 14.96 | 12.94 | 7.47 |
| | b* | −6.46 | −10.62 | −12.00 | −14.54 | −15.73 |
| | Observable color | purple | purple | purple | purple | purple |
| 0.6 mm | L* | 87.04 | 87.56 | | | |
| | a* | 0.99 | 1.39 | | | |
| | b* | −6.09 | −5.32 | | | |
| | Observable color | blue | blue | | | |
| 1.33 mm | L* | 77.03 | 77.57 | | | |
| | a* | 3.32 | 2.56 | | | |
| | b* | −11.99 | −10.84 | | | |
| | Observable color | blue | blue | | | |
| 2.06 mm | L* | 67.17 | 68.30 | | | |
| | a* | 3.12 | 4.07 | | | |
| | b* | −17.38 | −15.38 | | | |
| | Observable color | blue | blue | | | |

As indicated in Tables 7-9, colored glass articles including Au may be subjected to different heat treatment to achieve a desired observable color.

Table 10 shows the surface compressive stress CS, depth of layer DOL, and maximum central tension CT of example glass article 67 after being subjected to heat treatment at 545° C. for 2 hrs. and then being subjected to ion-exchange under the conditions listed in Table 10.

TABLE 10

| IOX temp. (° C.) | 400 | 400 | 400 | 400 | 400 | 400 | 400 |
|---|---|---|---|---|---|---|---|
| IOX time (hrs.) | 5 | 6 | 7 | 8 | 6 | 6.5 | 6.5 |
| $KNO_3$ in IOX bath (wt %) | 83.0 | 83.0 | 83.0 | 83.0 | 83.0 | 83.0 | 80.0 |
| $NaNO_3$ in IOX bath (wt %) | 15.4 | 15.4 | 15.4 | 15.4 | 15.6 | 15.0 | 18.0 |
| $LiNO_3$ in IOX bath (wt %) | 1.6 | 1.6 | 1.6 | 1.6 | 1.4 | 2.0 | 2.0 |
| CS (MPa) | 720 | 643 | 632 | 623 | 657 | 621 | 611 |
| DOC (μm) | 4.46 | 4.86 | 5.36 | 5.44 | 5.00 | 5.04 | 4.85 |
| CT (MPa) | 111.1 | 117.4 | 116.3 | 115.6 | 119.2 | 109.1 | 118.2 |

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass composition comprising:
    greater than or equal to 40 mol % and less than or equal to 70 mol % $SiO_2$;
    greater than or equal to 8 mol % and less than or equal to 20 mol % $Al_2O_3$;
    greater than or equal to 1 mol % and less than or equal to 10 mol % $B_2O_3$;
    greater than or equal to 1 mol % and less than or equal to 20 mol % $Li_2O$;
    greater than or equal to 1 mol % and less than or equal to 15 mol % $Na_2O$;
    greater than or equal to 0 mol % and less than or equal to 6 mol % MgO;
    greater than or equal to 0 mol % and less than or equal to 5 mol % ZnO; and
    A greater than or equal to $1\times10^{-6}$ mol % and less than or equal to 1 mol % Au, wherein:
        MgO+ZnO is greater than or equal to 0.1 mol % and less than or equal to 6 mol %.

2. The glass composition of claim 1, wherein the glass composition comprises greater than or equal to 0.1 mol % and less than or equal to 5 mol % MgO.

3. The glass composition of claim 1, wherein the glass composition comprises greater than or equal to $1\times10^{-6}$ mol % and less than or equal to 0.01 mol % Au.

4. The glass composition of claim 1, wherein the glass composition comprises greater than or equal to 0.1 mol % and less than or equal to 2 mol % $ZrO_2$.

5. The glass composition of claim 1, wherein the glass composition comprises greater than or equal to 0.01 mol % and less than or equal to 1 mol % $SnO_2$.

6. The glass composition of claim 1, wherein the glass composition comprises greater than or equal to 0.1 mol % and less than or equal to 1 mol % $K_2O$.

7. The glass composition of claim 1, wherein MgO+ZnO is greater than or equal to 0.5 mol % and less than or equal to 5.5 mol %.

8. The glass composition of claim 1, wherein $R_2O$ is greater than or equal to 2 mol % and less than or equal to 35 mol %, wherein $R_2O$ is the sum of $Li_2O$, $Na_2O$, and $K_2O$.

9. The glass composition of claim 1, wherein $R_2O$—$Al_2O_3$ is greater than or equal to −3 mol % and less than or equal to 2 mol %.

10. The glass composition of claim 1, wherein $5.72*Al_2O_3$ (mol %)-$21.4*ZnO$ (mol %)-$2.5*P_2O_5$ (mol %)-$35*Li_2O$ (mol %)-$16.6*B_2O_3$ (mol %)-$20.5*MgO$ (mol %)-$23.3*Na_2O$ (mol %)-$27.9*SrO$ (mol %)-$18.5*K_2O$ (mol %)-$26.3*CaO$ (mol %) is greater than −609 mol %.

11. A colored glass article comprising:
    greater than or equal to 40 mol % and less than or equal to 70 mol % $SiO_2$;
    greater than or equal to 8 mol % and less than or equal to 20 mol % $Al_2O_3$;
    greater than or equal to 1 mol % and less than or equal to 10 mol % $B_2O_3$;
    greater than or equal to 1 mol % and less than or equal to 20 mol % $Li_2O$;
    greater than or equal to 1 mol % and less than or equal to 15 mol % $Na_2O$;
    greater than or equal to 0 mol % and less than or equal to 6 mol % MgO;
    greater than or equal to 0 mol % and less than or equal to 5 mol % ZnO; and
    greater than or equal to $1\times10^{-6}$ mol % and less than or equal to 1 mol % Au, wherein:
        MgO+ZnO is greater than or equal to 0.1 mol % and less than or equal to 6 mol %.

12. The colored glass article of claim 11, wherein the colored glass article has a transmittance color coordinate in the CIELAB color space as measured at an article thickness of 1.33 mm under F2 illumination and a 10° standard observer angle of:
    L* greater than or equal to 65 and less than or equal to 98;
    a* greater than or equal to −10 and less than or equal to 25; and
    b* greater than or equal to −20 and less than or equal to 5.

13. The colored glass article of claim 11, wherein the colored glass article has a thickness greater than or equal to 250 μm and less than or equal to 6 mm.

14. A consumer electronic device, comprising:
    a housing having a front surface, a back surface, and side surfaces; and
    electrical components provided at least partially within the housing, the electrical components including at least a controller, a memory, and a display, the display being provided at or adjacent the front surface of the housing;

wherein the housing comprises the colored glass article of claim 11.

15. The colored glass article of claim 11, wherein the colored glass article is an ion-exchanged colored glass article.

16. The colored glass article of claim 15, wherein the ion-exchanged colored glass article has a depth of compression 3 μm or greater.

17. The colored glass article of claim 15, wherein the ion-exchanged colored glass article has a thickness "t" and a depth of compression greater than or equal to 0.15 t.

18. The colored glass article of claim 15, wherein the ion-exchanged colored glass article has a surface compressive stress greater than or equal to 300 MPa.

19. The colored glass article of claim 15, wherein the ion-exchanged colored glass article has a maximum central tension greater than or equal to 40 MPa.

20. A method of forming a colored glass article, the method comprising:

heat treating a glass composition to form a glass article, the glass composition comprising:

greater than or equal to 40 mol % and less than or equal to 70 mol % $SiO_2$;

greater than or equal to 8 mol % and less than or equal to 20 mol % $Al_2O_3$;

greater than or equal to 1 mol % and less than or equal to 10 mol % $B_2O_3$;

greater than or equal to 1 mol % and less than or equal to 20 mol % $Li_2O$;

greater than or equal to 1 mol % and less than or equal to 15 mol % $Na_2O$;

greater than or equal to 0 mol % and less than or equal to 6 mol % MgO;

greater than or equal to 0 mol % and less than or equal to 5 mol % ZnO; and greater than or equal to $1 \times 10^{-6}$ mol % and less than or equal to 1 mol % Au, wherein:

MgO+ZnO is greater than or equal to 0.1 mol % and less than or equal to 6 mol %; and subjecting the glass article to a heat treatment cycle at a temperature greater than or equal to 500° C. and less than or equal to 800° C. and a duration greater than or equal to 0.25 hour and less than or equal to 24 hours to produced the colored glass article.

* * * * *